US010791825B2

(12) United States Patent
Pringle-Iv et al.

(10) Patent No.: US 10,791,825 B2
(45) Date of Patent: *Oct. 6, 2020

(54) APPARATUSES FOR DISPENSING A BRUSHABLE SUBSTANCE ONTO A SURFACE

(71) Applicant: The Boeing Company, Chicago, IL (US)

(72) Inventors: John W. Pringle-Iv, Gardena, CA (US); Raul Tomuta, Stanton, CA (US); Chris J. Erickson, Garden Grove, CA (US)

(73) Assignee: The Boeing Company, Chicago, IL (US)

(*) Notice: Subject to any disclaimer, the term of this patent is extended or adjusted under 35 U.S.C. 154(b) by 336 days.

This patent is subject to a terminal disclaimer.

(21) Appl. No.: 15/849,759

(22) Filed: Dec. 21, 2017

(65) Prior Publication Data
US 2019/0191861 A1 Jun. 27, 2019

(51) Int. Cl.
A46B 11/06 (2006.01)
A46B 13/04 (2006.01)
(Continued)

(52) U.S. Cl.
CPC .............. A46B 11/06 (2013.01); A46B 13/04 (2013.01); B05C 5/02 (2013.01); B05C 5/0216 (2013.01);
(Continued)

(58) Field of Classification Search
USPC ......................................... 118/264, 214, 256
See application file for complete search history.

(56) References Cited

U.S. PATENT DOCUMENTS 10,099,240 B2 * 10/2018 Pringle, IV ............... B05C 5/02
2007/0226926 A1 10/2007 Hiraoka
(Continued)

FOREIGN PATENT DOCUMENTS

DE 298 12 213 10/1998
DE 20 2013005169 10/2013
(Continued)

OTHER PUBLICATIONS

European Patent Office, "Extended European Search Report," App. No. 18210149.3 (dated May 22, 2019).
(Continued)

Primary Examiner — Yewebdar T Tadesse
(74) Attorney, Agent, or Firm — Walters & Wasylyna LLC

(57) ABSTRACT

An apparatus for dispensing a brushable substance comprises a bracket and a sleeve, comprising an inner tubular sleeve wall and an outer tubular sleeve wall. The sleeve is coupled to the bracket and is rotatable relative to the bracket about a first axis. The apparatus also comprises a cartridge, comprising an inner tubular cartridge wall and an outer tubular cartridge wall. The cartridge is configured to be positioned between the inner tubular sleeve wall and the outer tubular sleeve wall. Apparatus additionally comprises a valve, configured to be communicatively coupled with the cartridge, a brush-arm assembly, coupled to the sleeve, a linear actuator to control flow of the brushable substance from the valve, an annular plunger, positioned between the inner tubular cartridge wall and the outer tubular cartridge wall and movable along the first axis, and a push-lock pressure cap, configured to be hermetically coupled with the cartridge.

20 Claims, 40 Drawing Sheets

(51) Int. Cl.
- *B05C 5/02* (2006.01)
- *B05C 11/10* (2006.01)
- *B25J 9/16* (2006.01)
- *B05B 13/04* (2006.01)
- *B05C 1/02* (2006.01)
- *B05C 1/06* (2006.01)

(52) U.S. Cl.
CPC ........ *B05C 5/0225* (2013.01); *B05C 11/1002* (2013.01); *B25J 9/1692* (2013.01); *B05B 13/0431* (2013.01); *B05C 1/027* (2013.01); *B05C 1/06* (2013.01)

(56) References Cited

U.S. PATENT DOCUMENTS

| | | | |
|---|---|---|---|
| 2009/0008398 A1* | 1/2009 | Nakatsuji | B05C 5/0216 220/737 |
| 2011/0289717 A1 | 12/2011 | Dhanvanthari | |
| 2016/0361734 A1 | 12/2016 | Routen et al. | |
| 2017/0105516 A1 | 4/2017 | Pringle, IV et al. | |
| 2017/0106401 A1 | 4/2017 | Pringle, IV et al. | |
| 2017/0106402 A1 | 4/2017 | Pringle, IV et al. | |
| 2018/0271484 A1 | 9/2018 | Whisler | |
| 2018/0272372 A1 | 9/2018 | Pringle, IV et al. | |
| 2018/0272373 A1 | 9/2018 | Pringle, IV et al. | |

FOREIGN PATENT DOCUMENTS

| | | |
|---|---|---|
| EP | 1 941 823 | 7/2008 |
| EP | 3 257 419 | 12/2017 |
| WO | WO 2017/106900 | 6/2017 |

OTHER PUBLICATIONS

European Patent Office, "Extended European Search Report," App. No. 18213401.5 (dated May 22, 2019).

European Patent Office, "Extended European Search Report," App. No. 18213396.7 (dated May 22, 2019).

European Patent Office, "Extended European Search Report," App. No. 18213381.9 (dated May 22, 2019).

European Patent Office: European Search Report, App. No. 18212960.1 (dated Jul. 9, 2019).

European Patent Office, "Communication pursuant to Article 94(3) EPC," App. No. 18 212 960.1 (dated Aug. 19, 2019).

\* cited by examiner (CONTINUED TO FIG.1B)

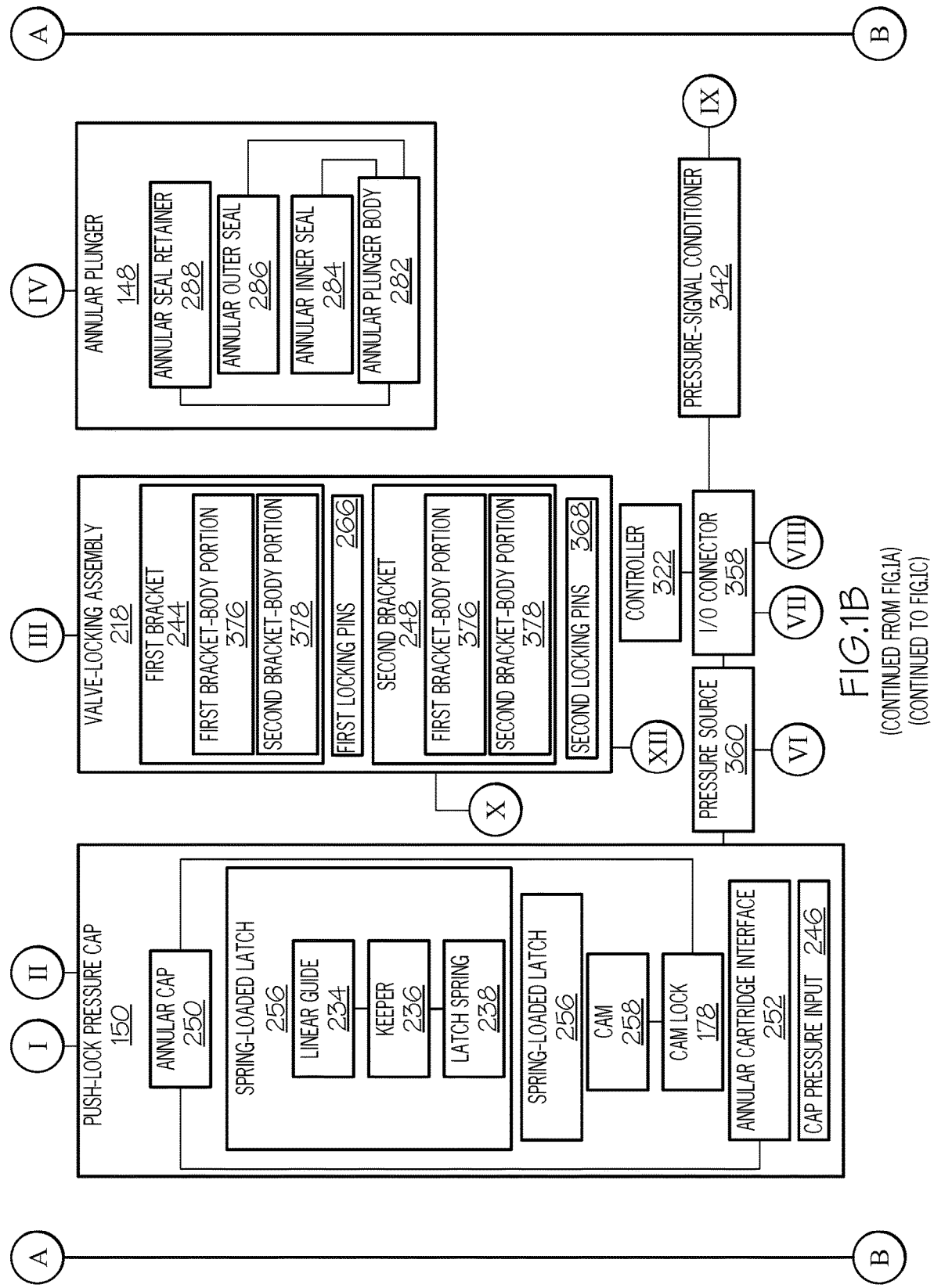
FIG.1B
(CONTINUED FROM FIG.1A)
(CONTINUED TO FIG.1C)

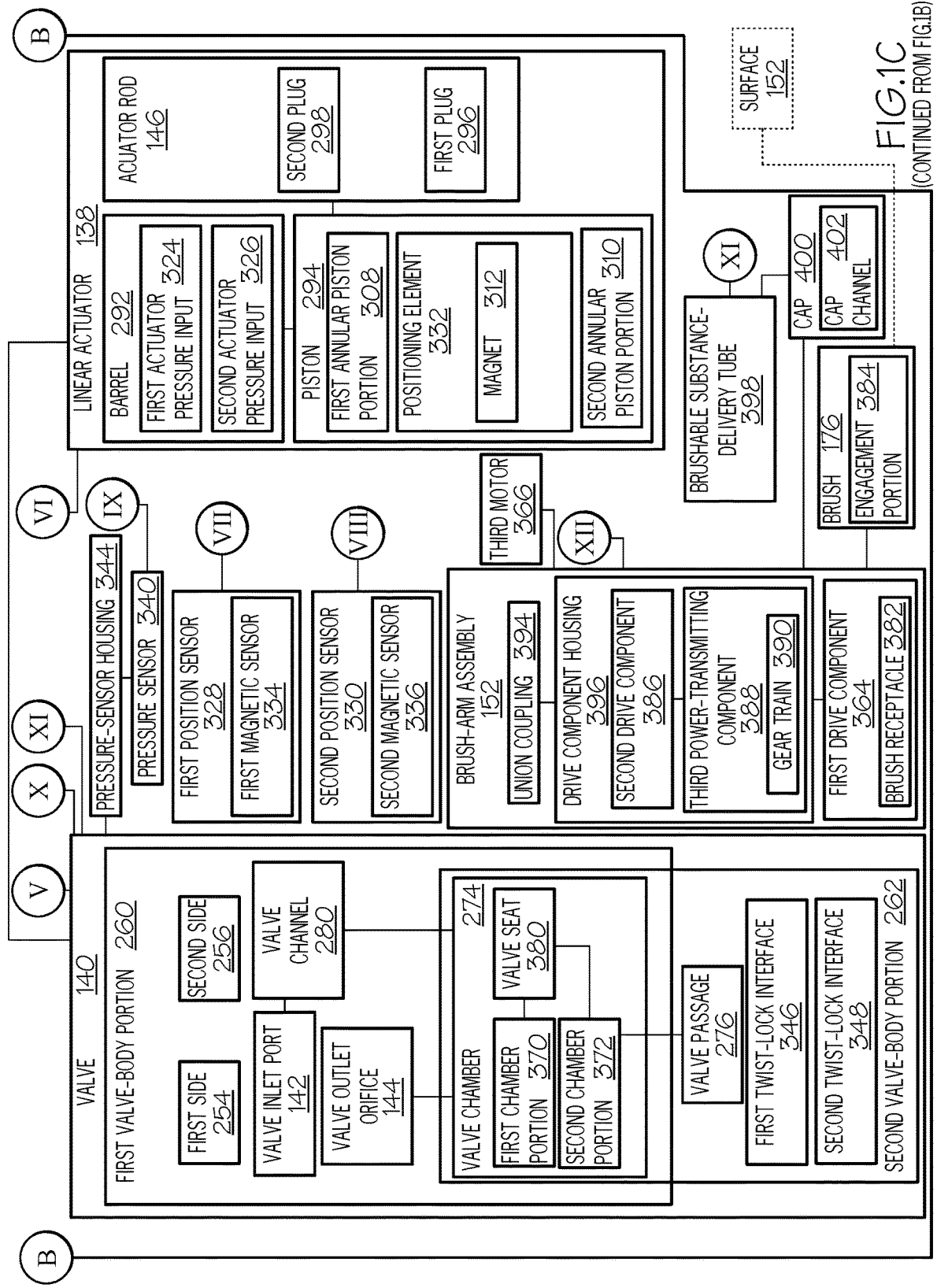

APPARATUSES FOR DISPENSING A BRUSHABLE SUBSTANCE ONTO A SURFACE

TECHNICAL FIELD

The present disclosure relates to apparatuses and methods for dispensing a brushable substance onto a surface.

BACKGROUND

During assembly of a structure, such as an aircraft or a component thereof, a brushable substance must often be dispensed onto a surface of the structure. It is desirable to fully automate such application of the brushable substance to reduce cost and manufacturing lead time. However, space constraints, in many instances imposed by the geometry of the structure, make automating the dispensing of brushable substances difficult. For example, a robot may need to dispense the brushable substance onto a surface, located in a confined space within the structure, such as inside an airplane wing box that, at the tip, is only several inches high. Automated dispensing of brushable substances is further complicated by the fact that the robot must often enter the confined space through a small access port and must navigate around obstacles while manipulating an end effector to dispense the brushable substance onto desired locations along the surface of the structure.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an apparatus for dispensing a brushable substance onto a surface. The apparatus comprises a bracket, configured to be removably coupled with a robot. The apparatus further comprises a sleeve, comprising an inner tubular sleeve wall and an outer tubular sleeve wall, circumscribing the inner tubular sleeve wall. The sleeve is coupled to the bracket and is rotatable relative to the bracket about a first axis. The apparatus also comprises a cartridge, comprising an inner tubular cartridge wall and an outer tubular cartridge wall, circumscribing the inner tubular cartridge wall. The cartridge is configured to be positioned between the inner tubular sleeve wall and the outer tubular sleeve wall. The apparatus additionally comprises a valve, configured to be communicatively coupled with the cartridge. The apparatus further comprises a brush-arm assembly, coupled to the sleeve. The apparatus 100 also comprises a linear actuator to control flow of the brushable substance from the valve. The apparatus additionally comprises an annular plunger, positioned between the inner tubular cartridge wall and the outer tubular cartridge wall and movable along the first axis. The apparatus further comprises a push-lock pressure cap, configured to be hermetically coupled with the cartridge. The cartridge is configured to be positioned between the push-lock pressure cap and the valve.

The apparatus provides for dispensing the brushable substance, from the cartridge, through the brush-arm assembly, to the surface of a workpiece, for example, located in a confined space. The configuration of the sleeve and the cartridge reduces the size requirements for storage of the brushable substance and allows the linear actuator and a portion of the valve to be located, or housed, within the sleeve. The push-lock pressure cap enables pressurization of an interior volume, located within the cartridge, which drives the annular plunger. Rotation of the sleeve controls an anugular orienation of the brush-arm assembly relative to the bracket and the surface during dispensing of the brushable substance. The valve being communicatively coupled directly to the cartridge enables a reduction of the brushable substance wasted, for example, during replacement of the cartridge and/or a purging operation.

Another example of the subject matter according to the invention relates to a method of dispensing a brushable substance onto a surface. The method comprises, (1) with a cartridge positioned inside a sleeve between an inner tubular sleeve wall and an outer tubular sleeve wall, circumscribing the inner tubular sleeve wall, and also positioned between a push-lock pressure cap, hermetically coupled with the cartridge, and a valve, communicatively coupled with the cartridge, linearly moving an annular plunger, received between an inner tubular cartridge wall and an outer tubular cartridge wall, circumscribing the inner tubular cartridge wall, toward the valve along a first axis to urge the brushable substance from the cartridge, through the valve, and to a brush that is communicatively coupled to the valve, and (2) controlling flow of the brushable substance from the valve to the brush.

The method provides for dispensing the brushable substance, from the cartridge, through the brush-arm assembly, to the surface of a workpiece, for example, located in confined space. The configuration of the sleeve and the cartridge reduces the size requirements for storage of the brushable substance and allows the linear actuator and a portion of the valve to be located within the sleeve. The push-lock pressure cap enables pressurization of an internal volume, located within the cartridge, which drives the annular plunger. Rotation of the sleeve controls an angular orientation of the brush-arm assembly relative to the bracket and the surface. The valve being communicatively coupled directly to the cartridge enables a reduction in the brushable substance wasted, for example, during replacement of the cartridge and/or a purging operation.

BRIEF DESCRIPTION OF THE DRAWINGS

Figure 1A:
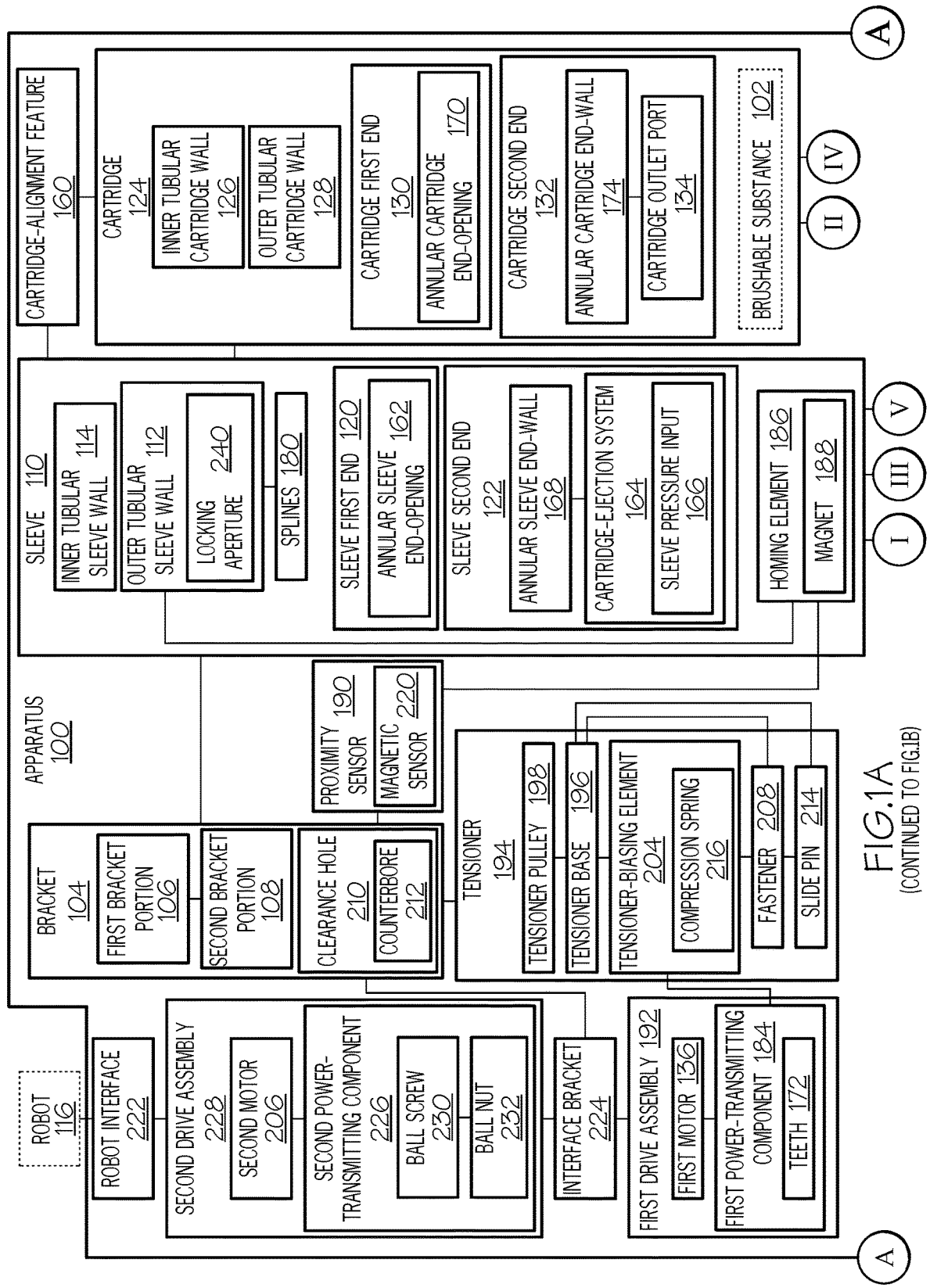
Figure 2:
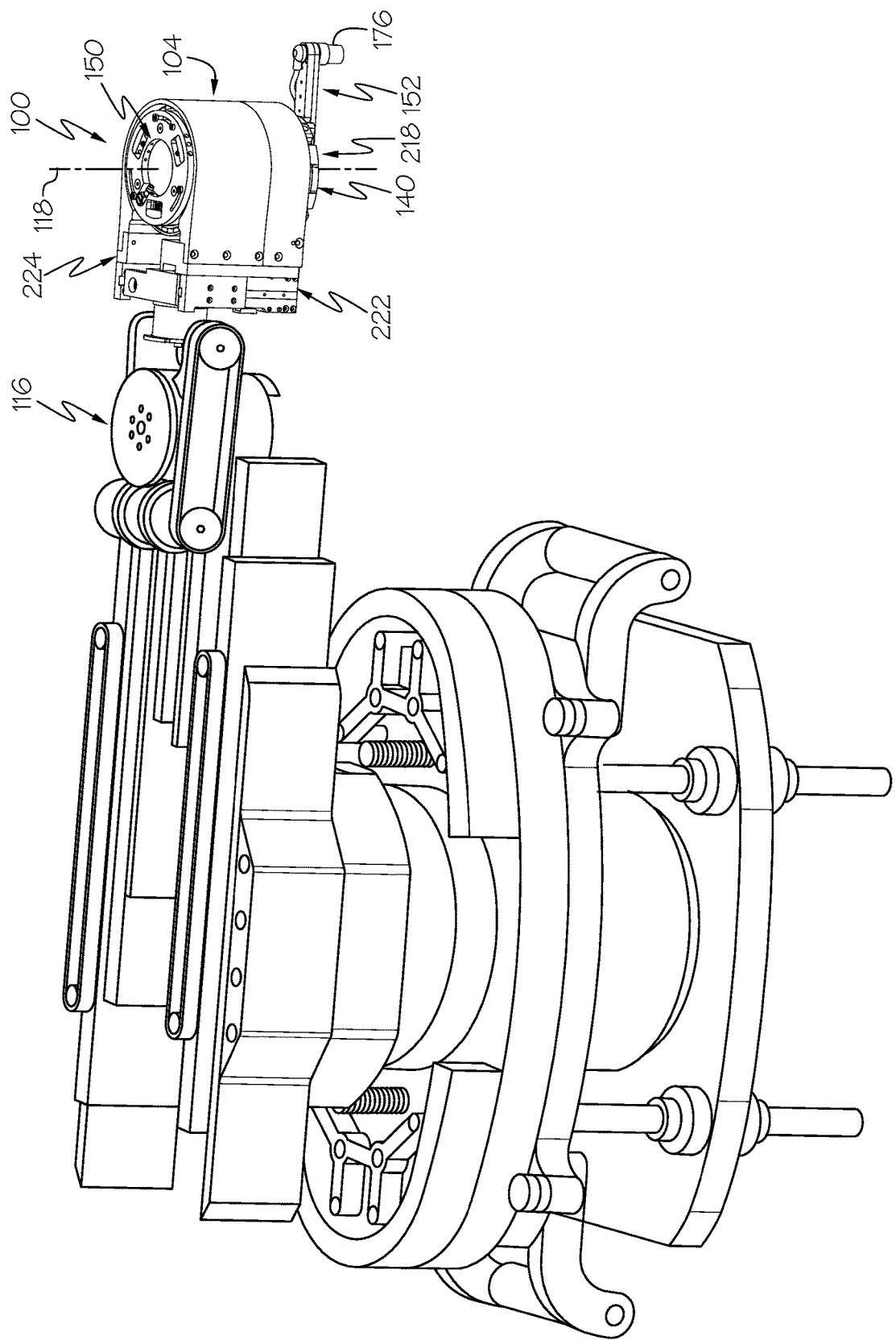
Figure 3:
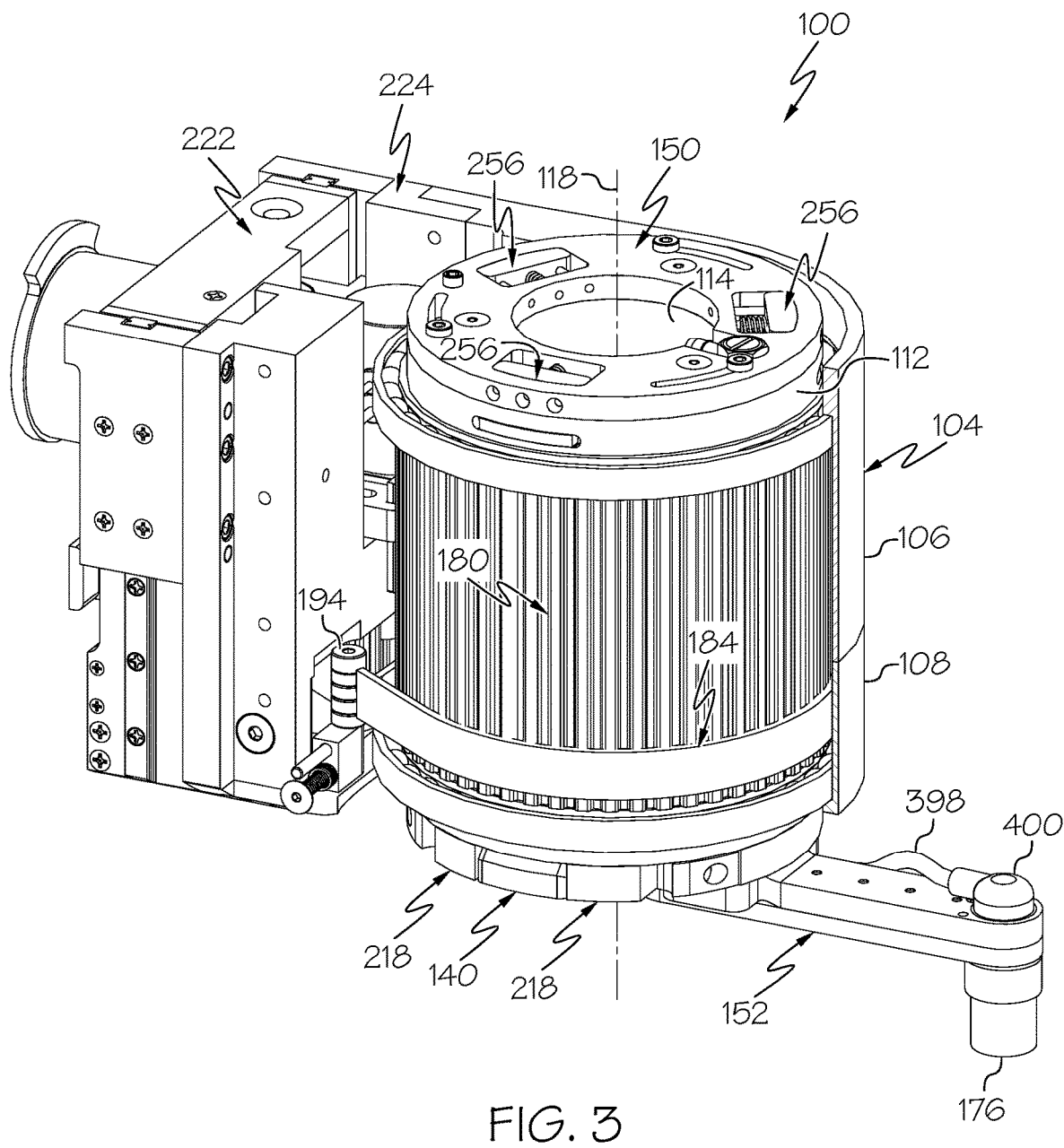
Figure 4:
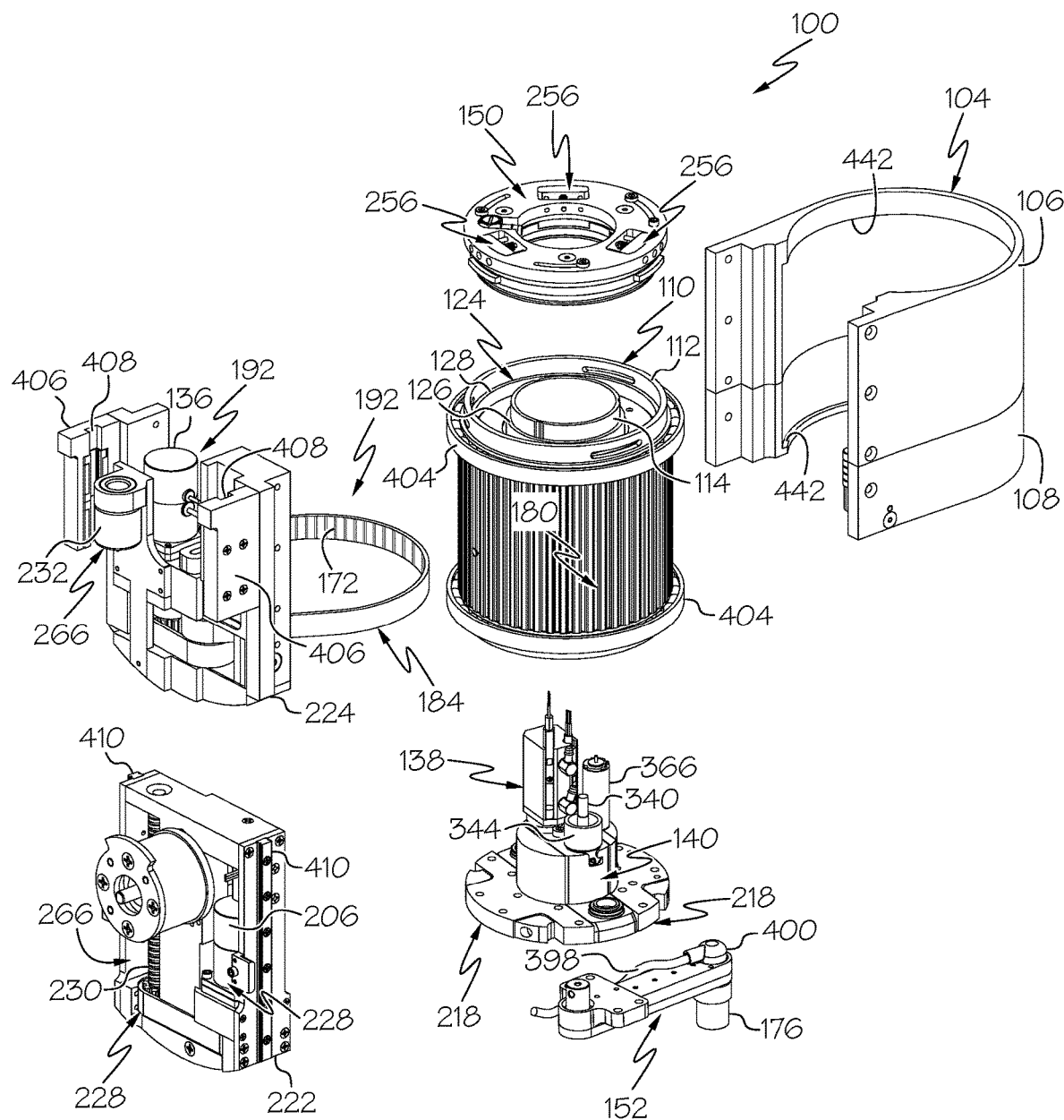
Figure 5:
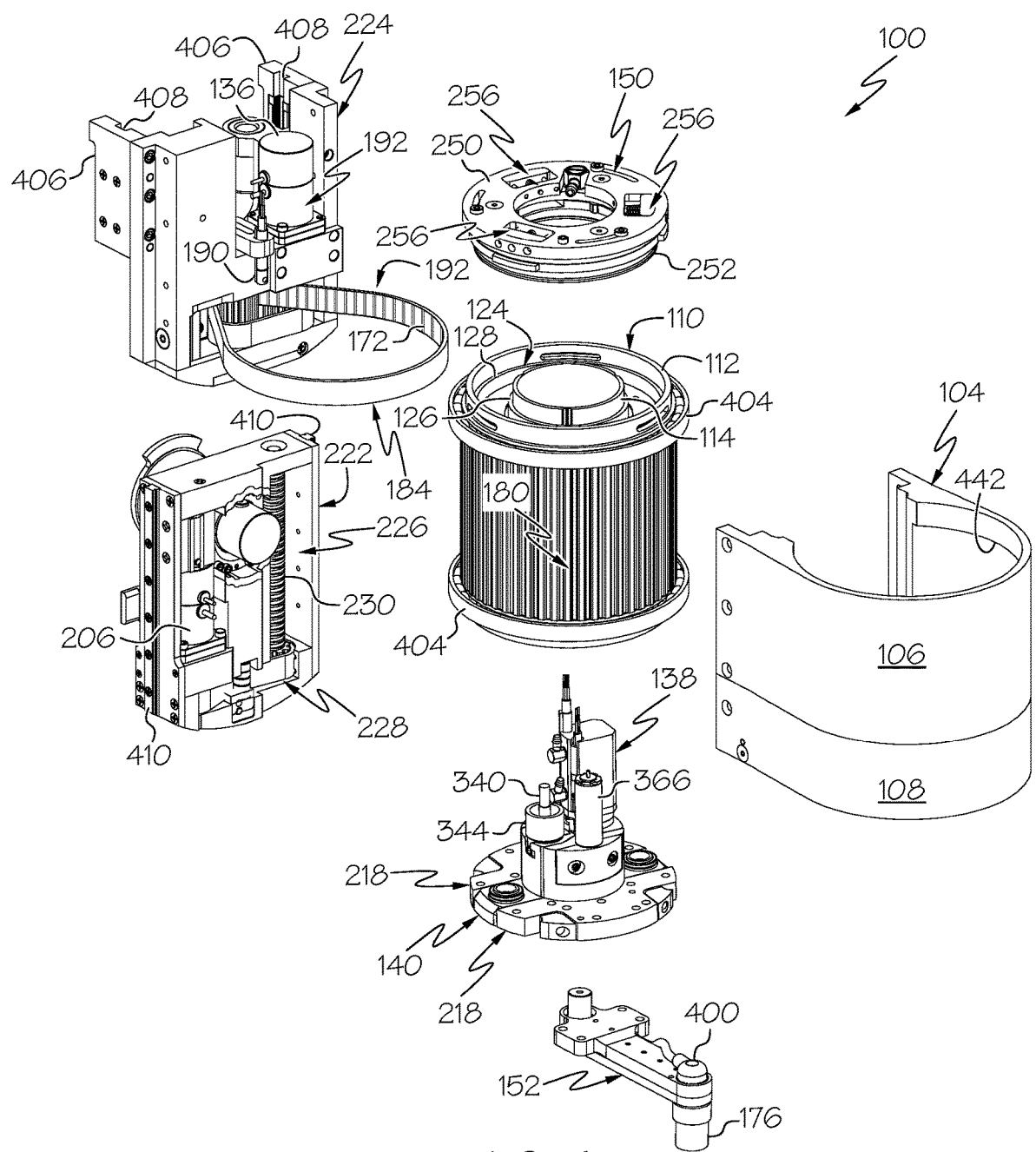
Figure 6:
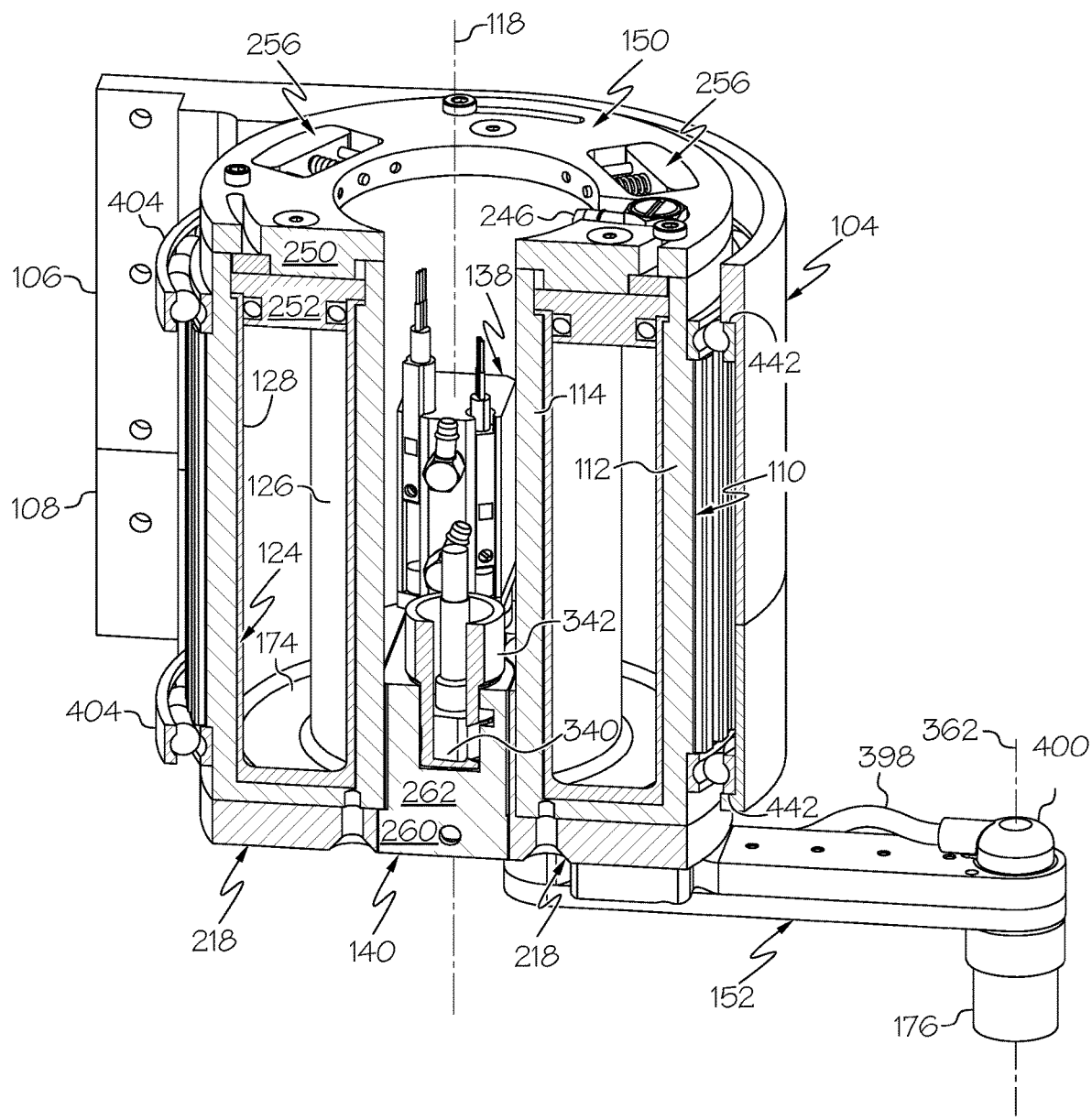
Figure 7:
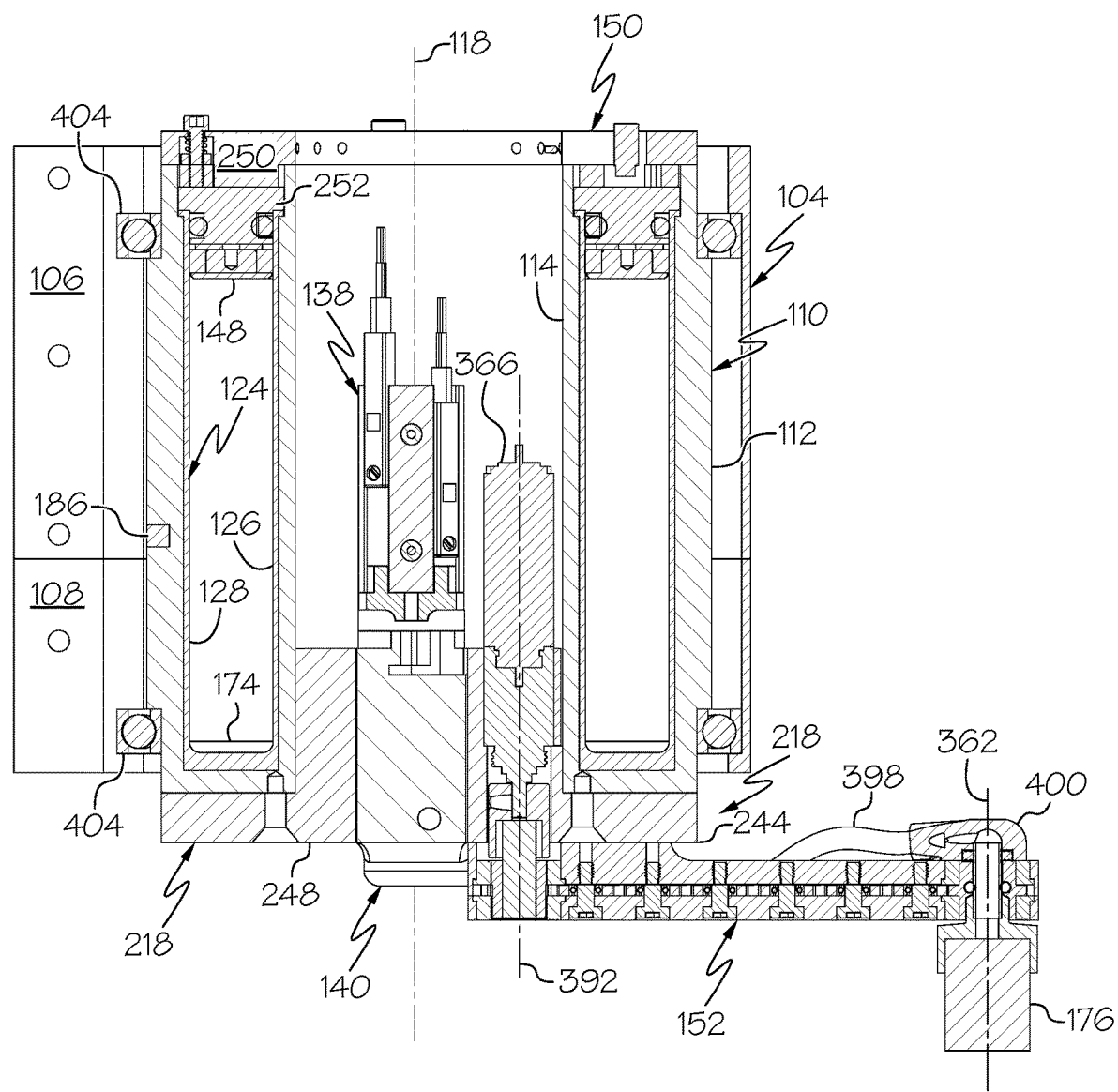
Figure 8:
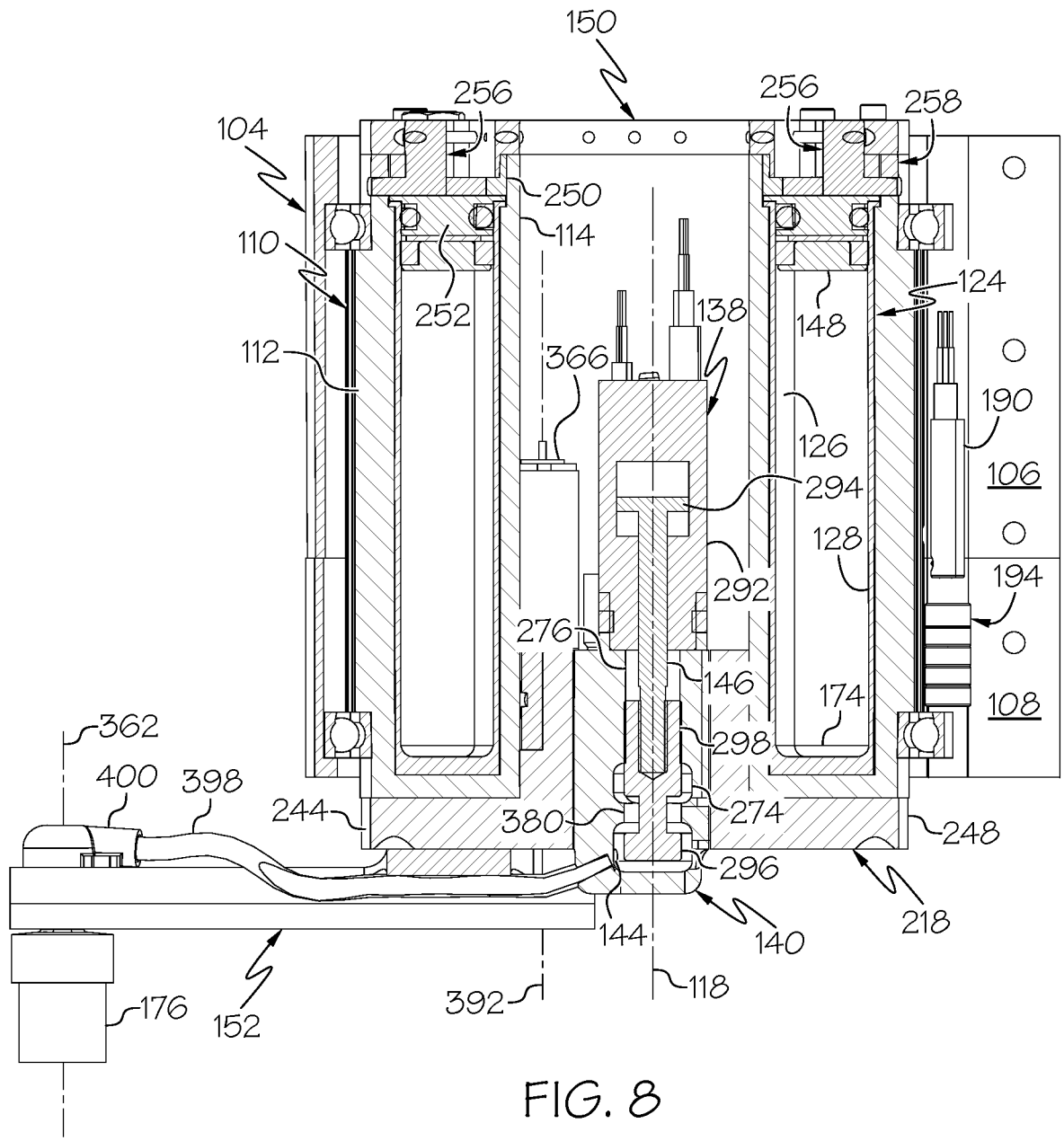
Figure 9:
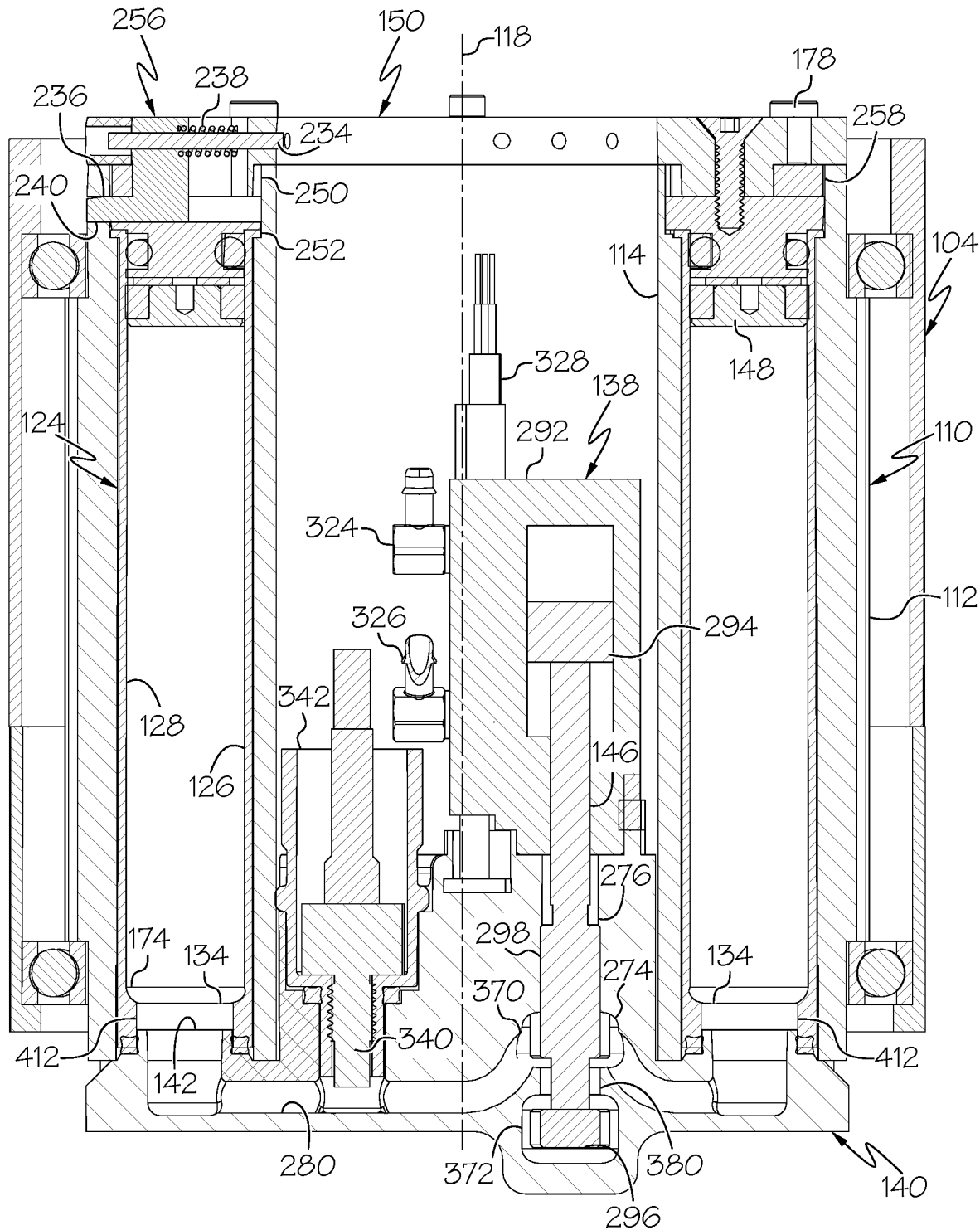
Figure 10:
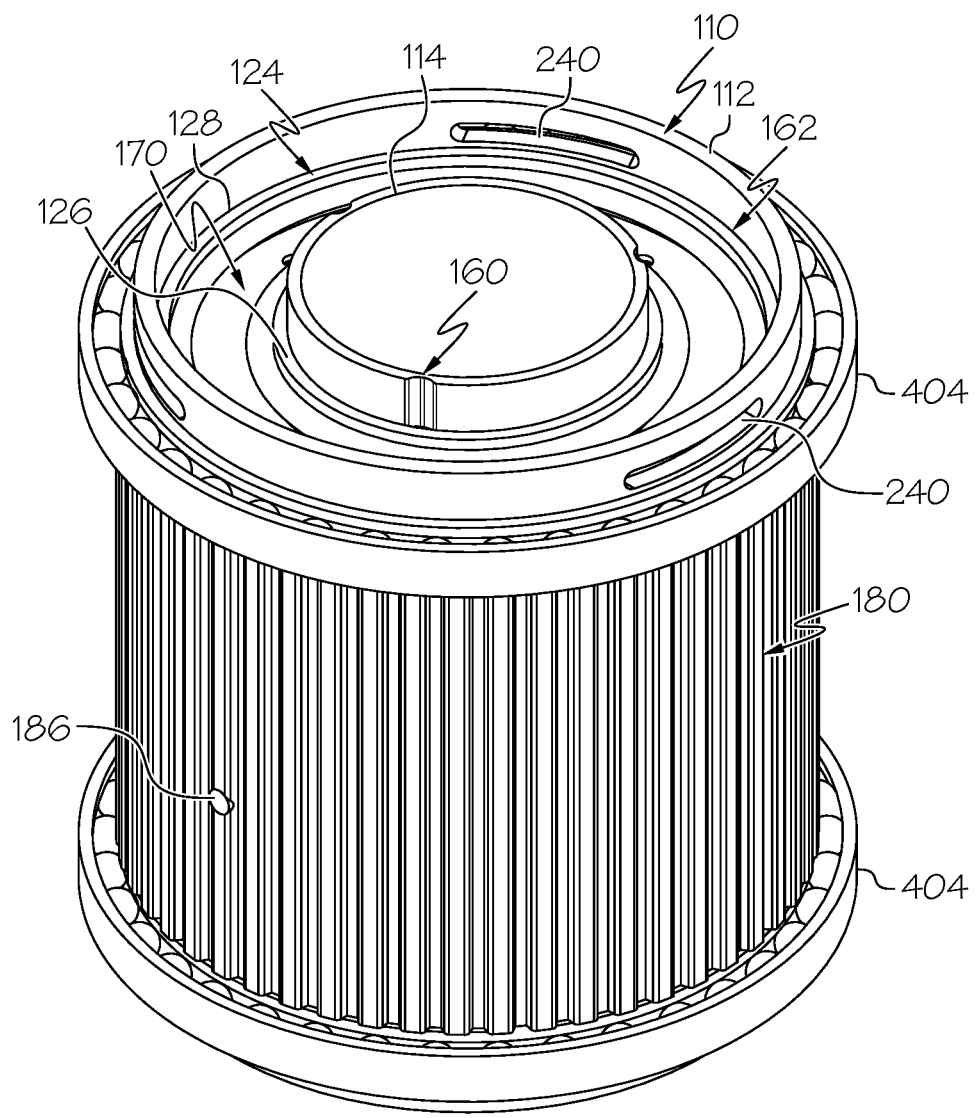
Figure 11:
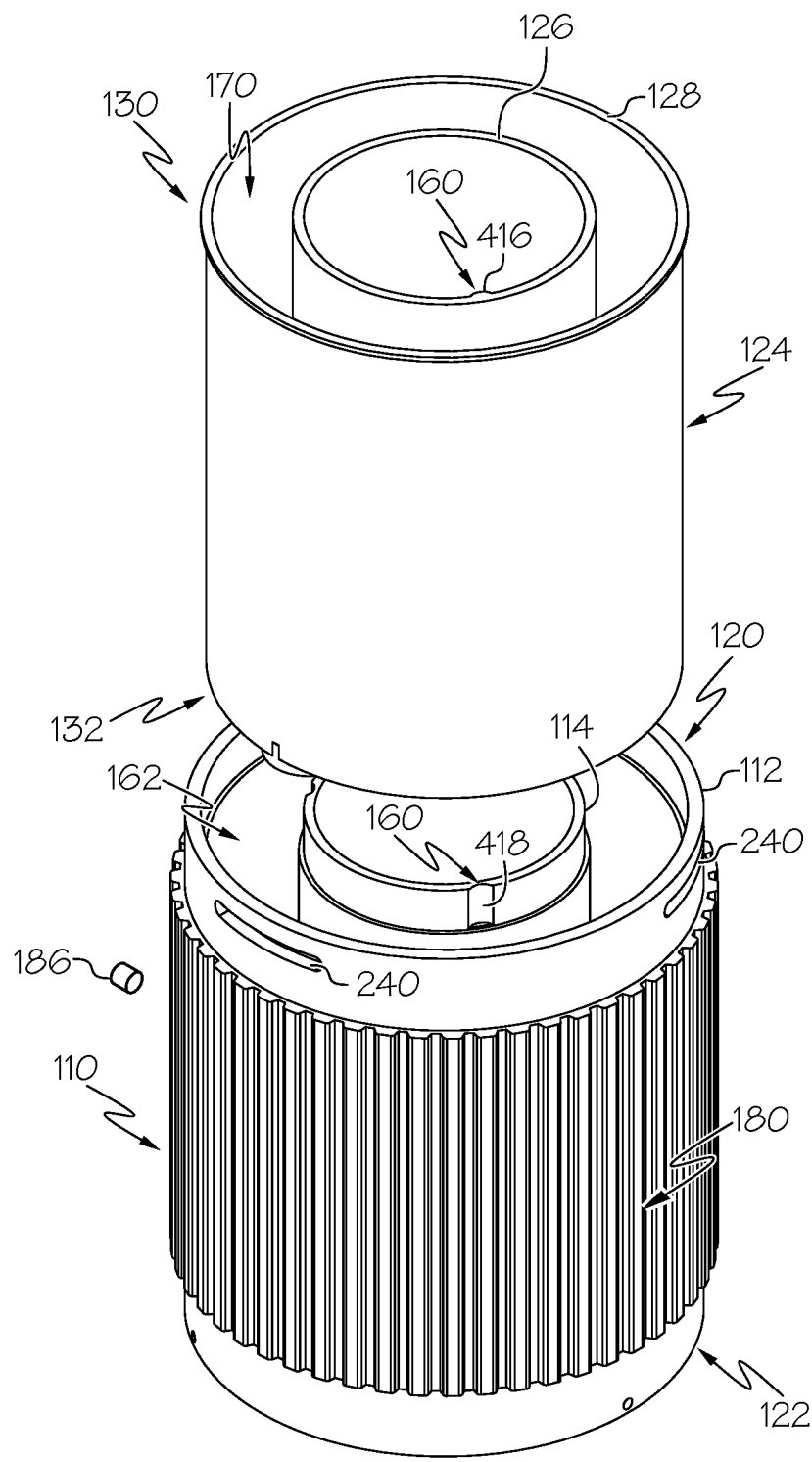
Figure 12:
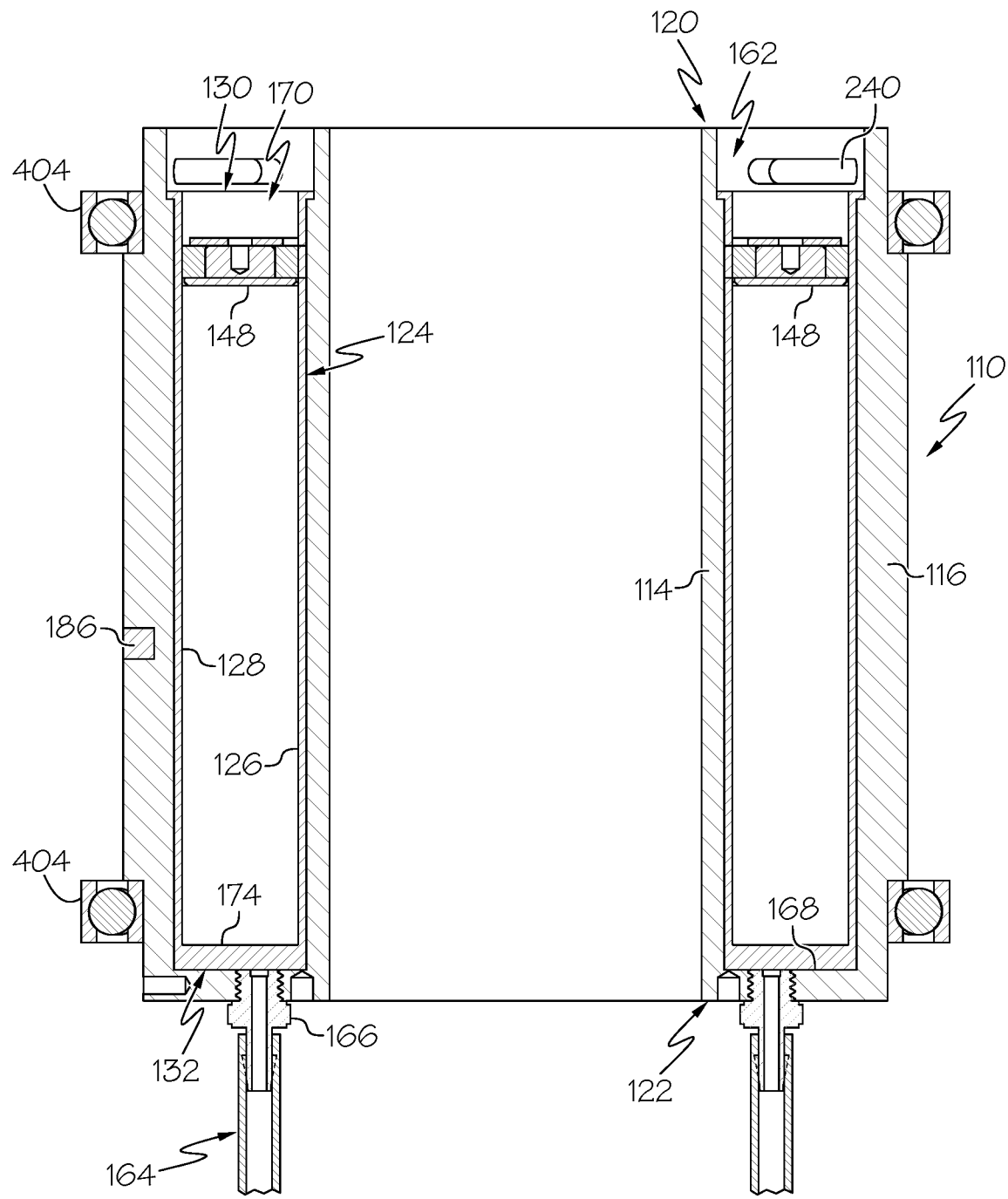
Figure 13:
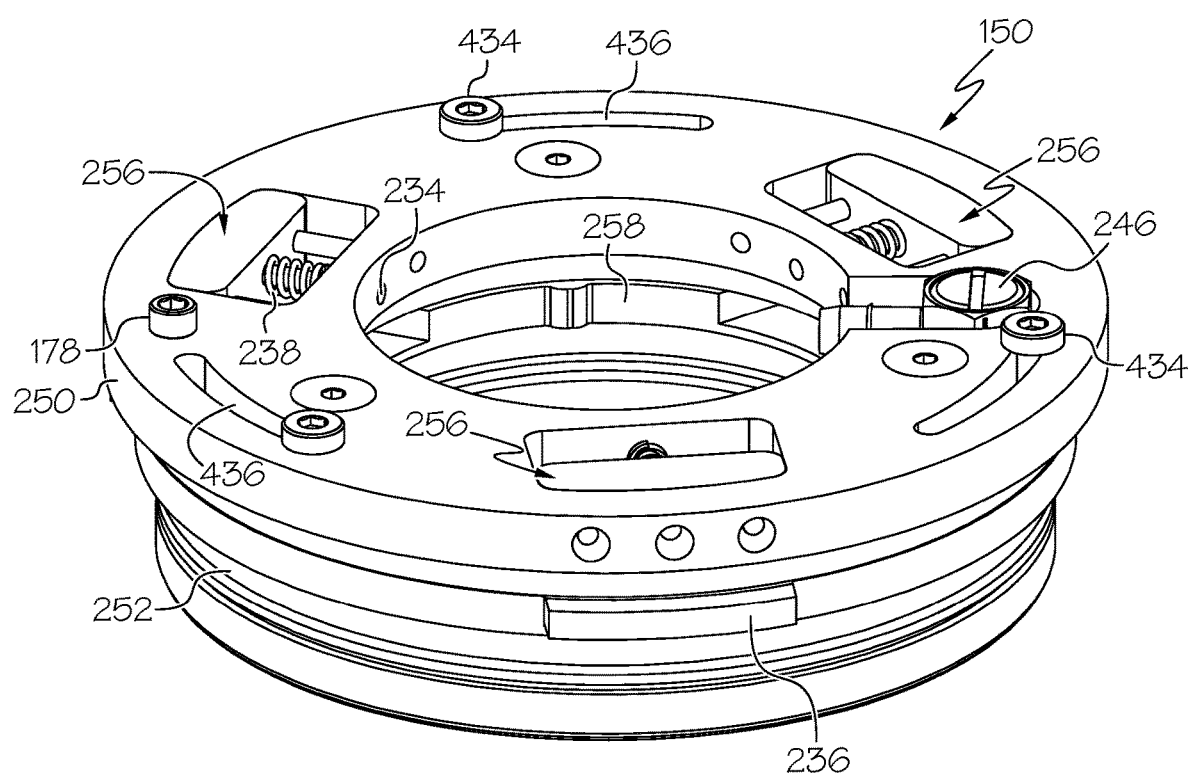
Figure 14:
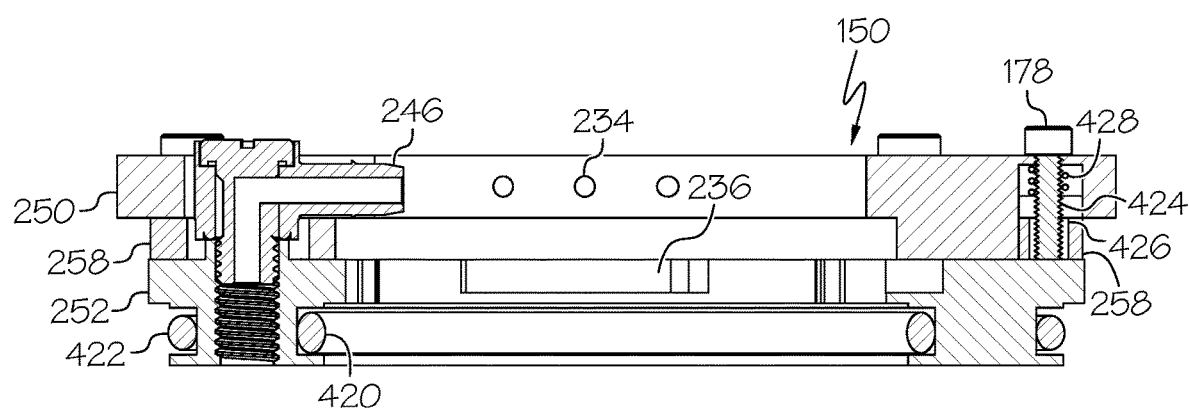
Figure 15:
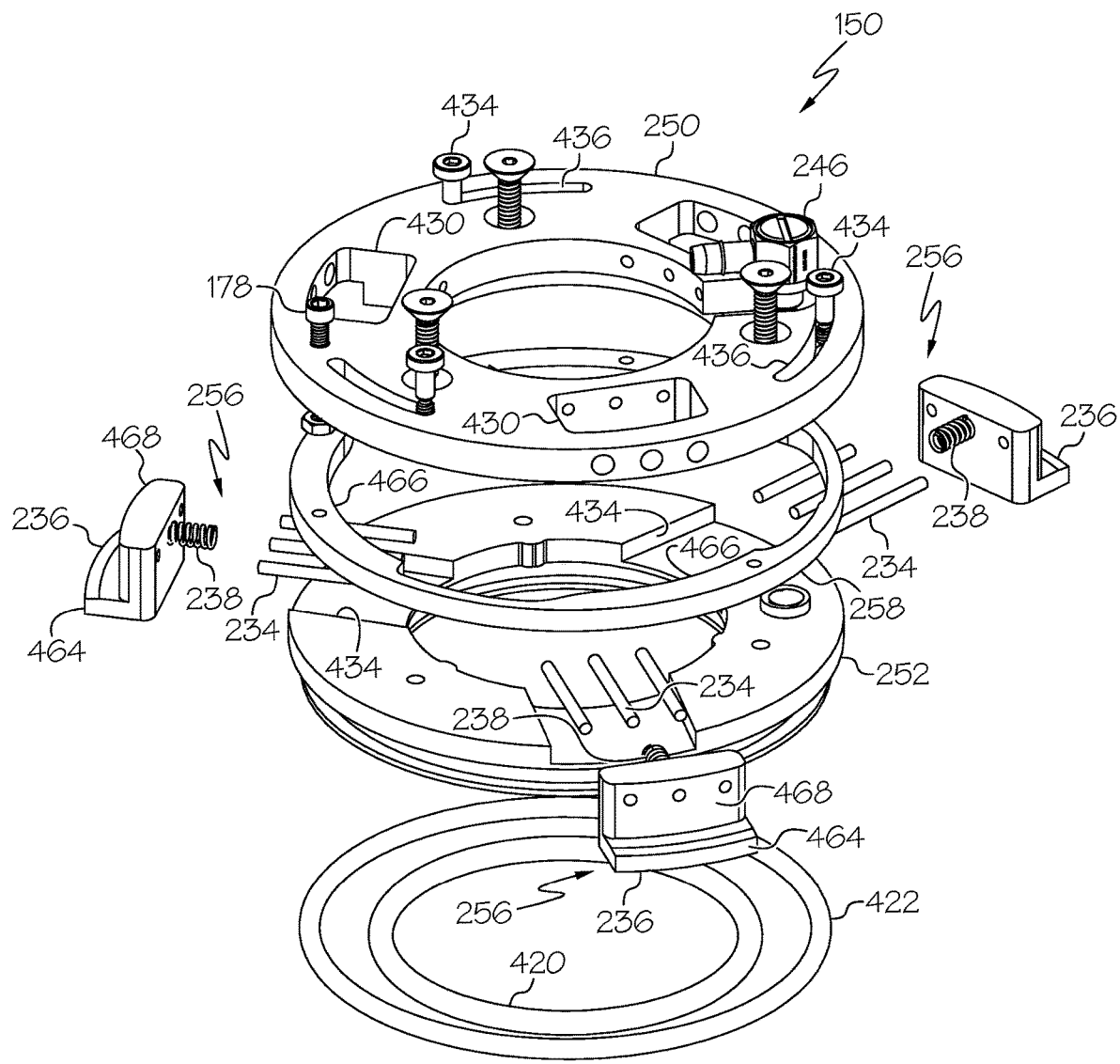
Figure 16:
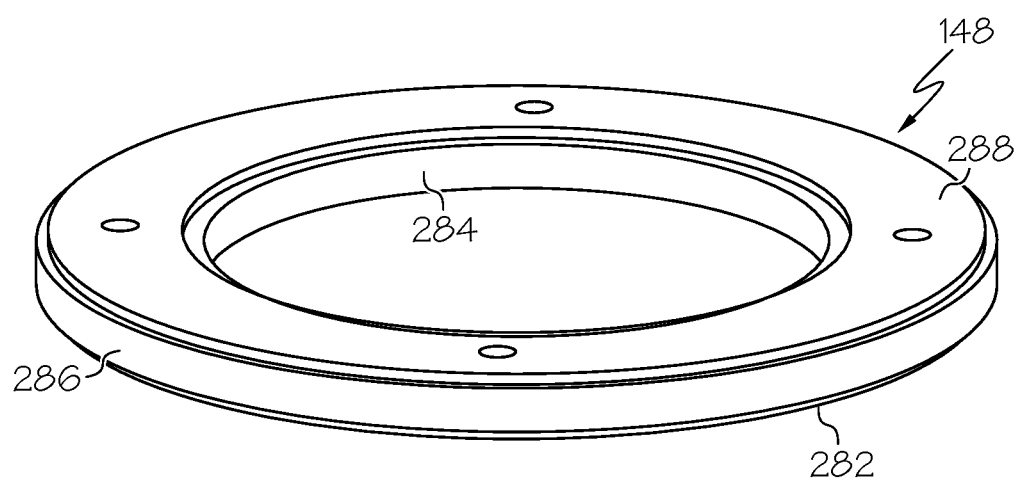
Figure 17:
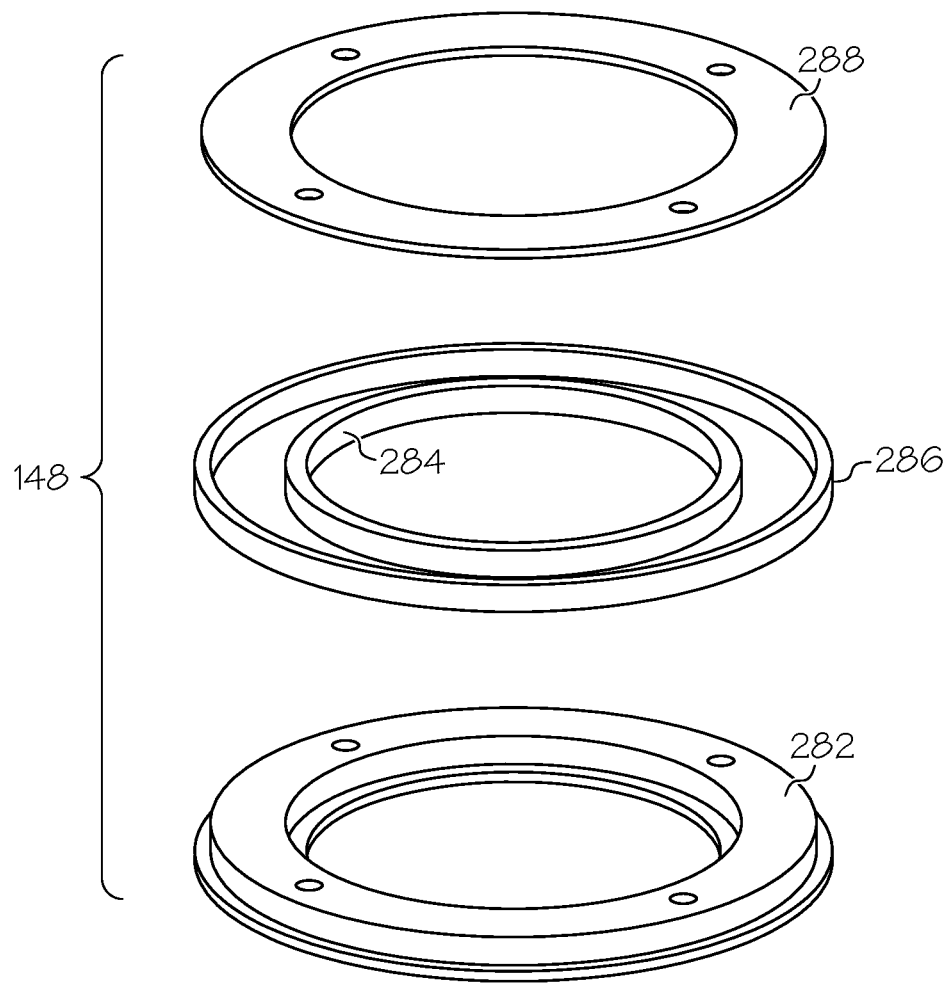
Figure 18:
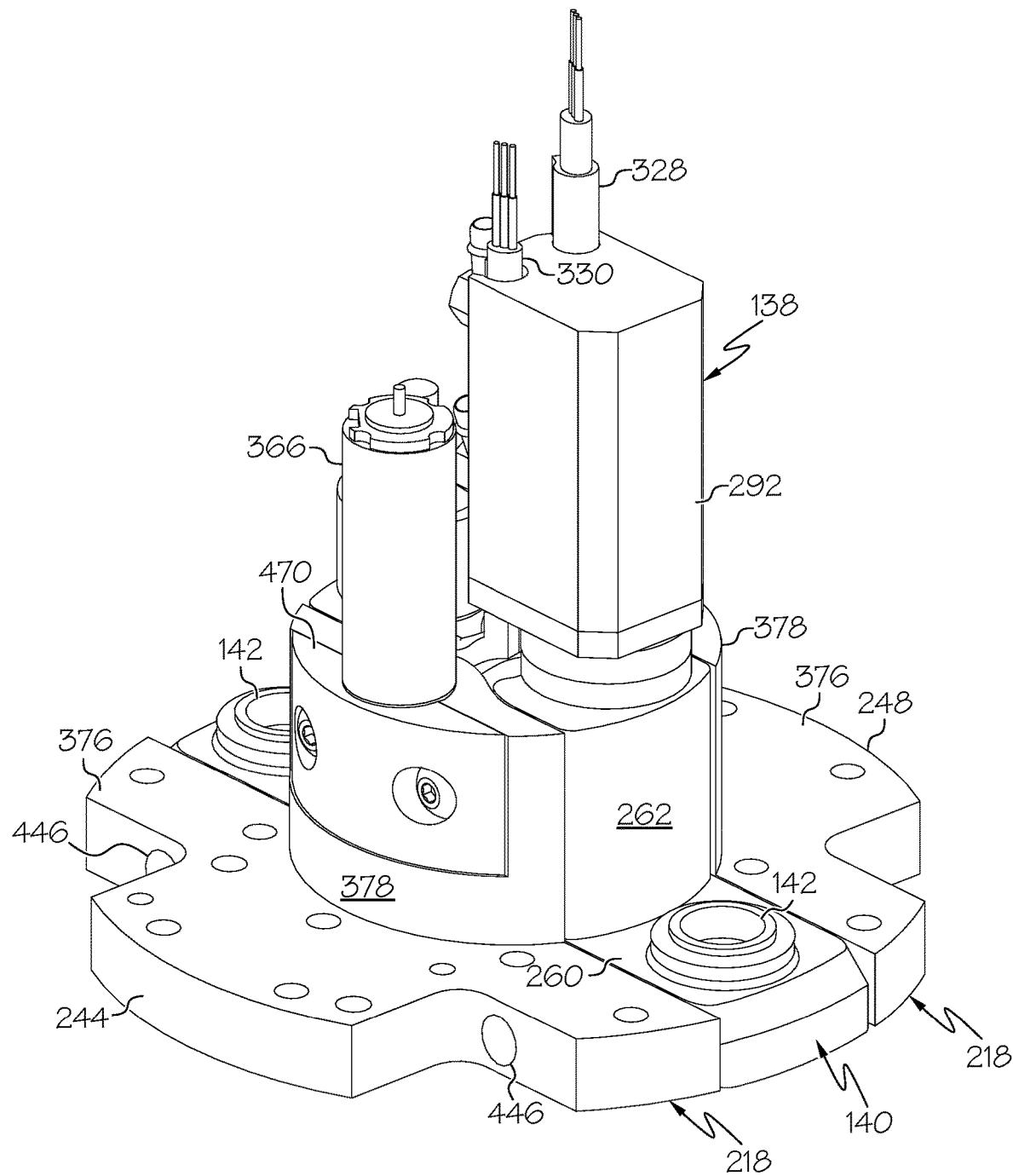
Figure 19:
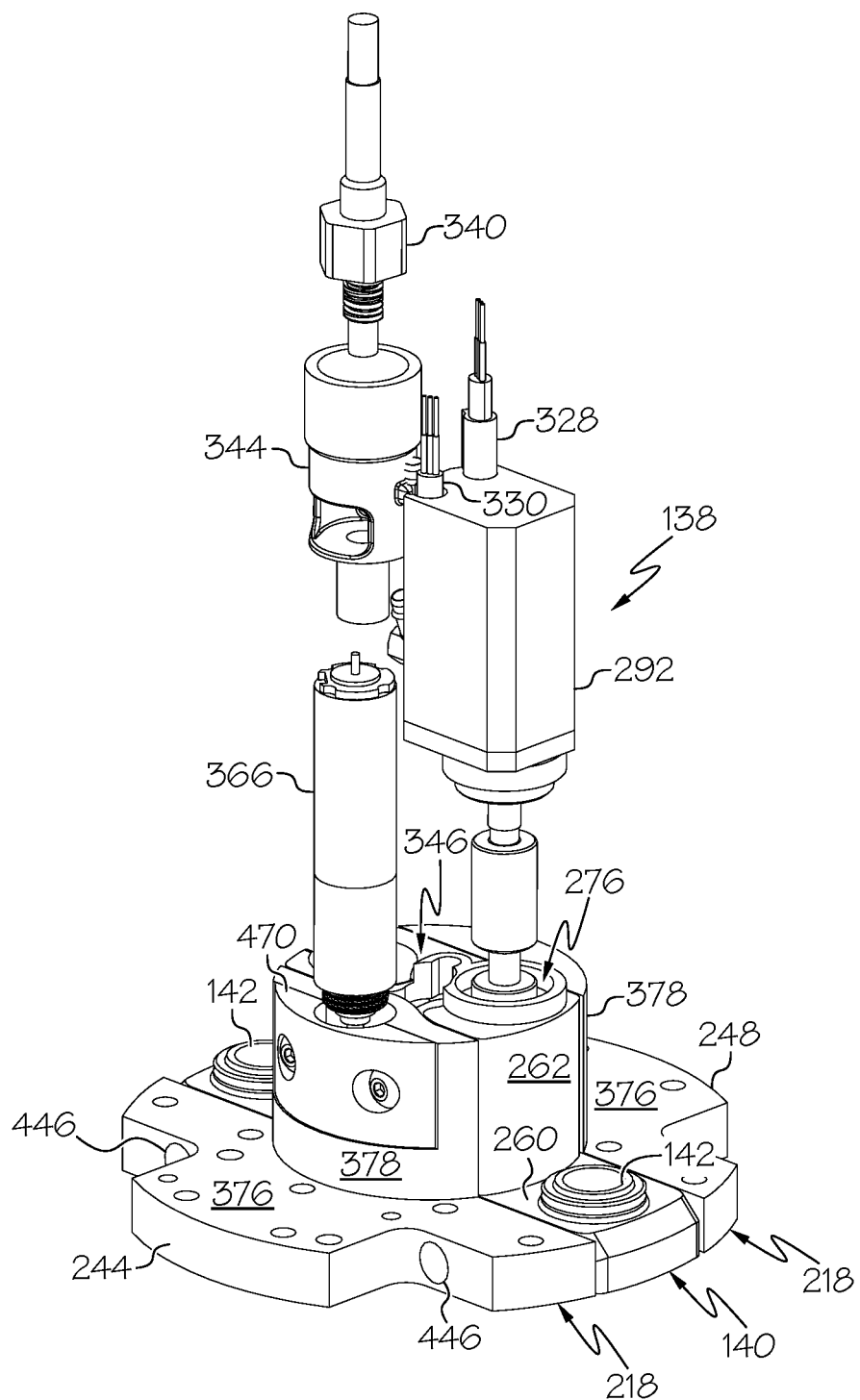
Figure 20:
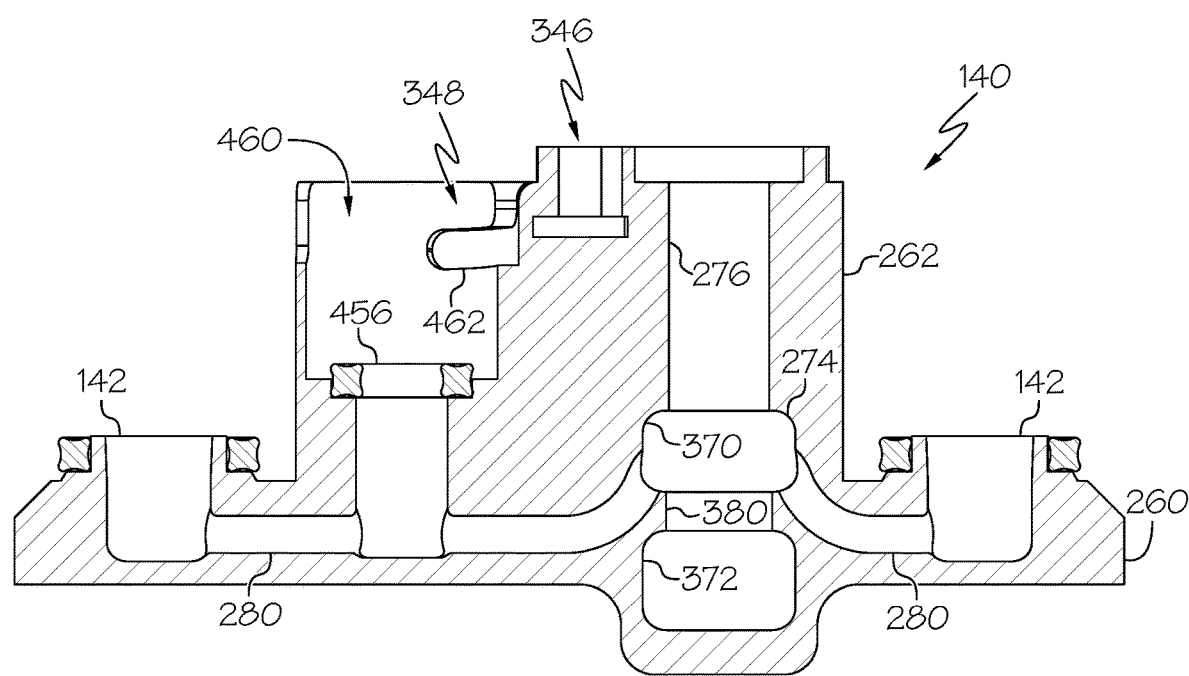
Figure 21:
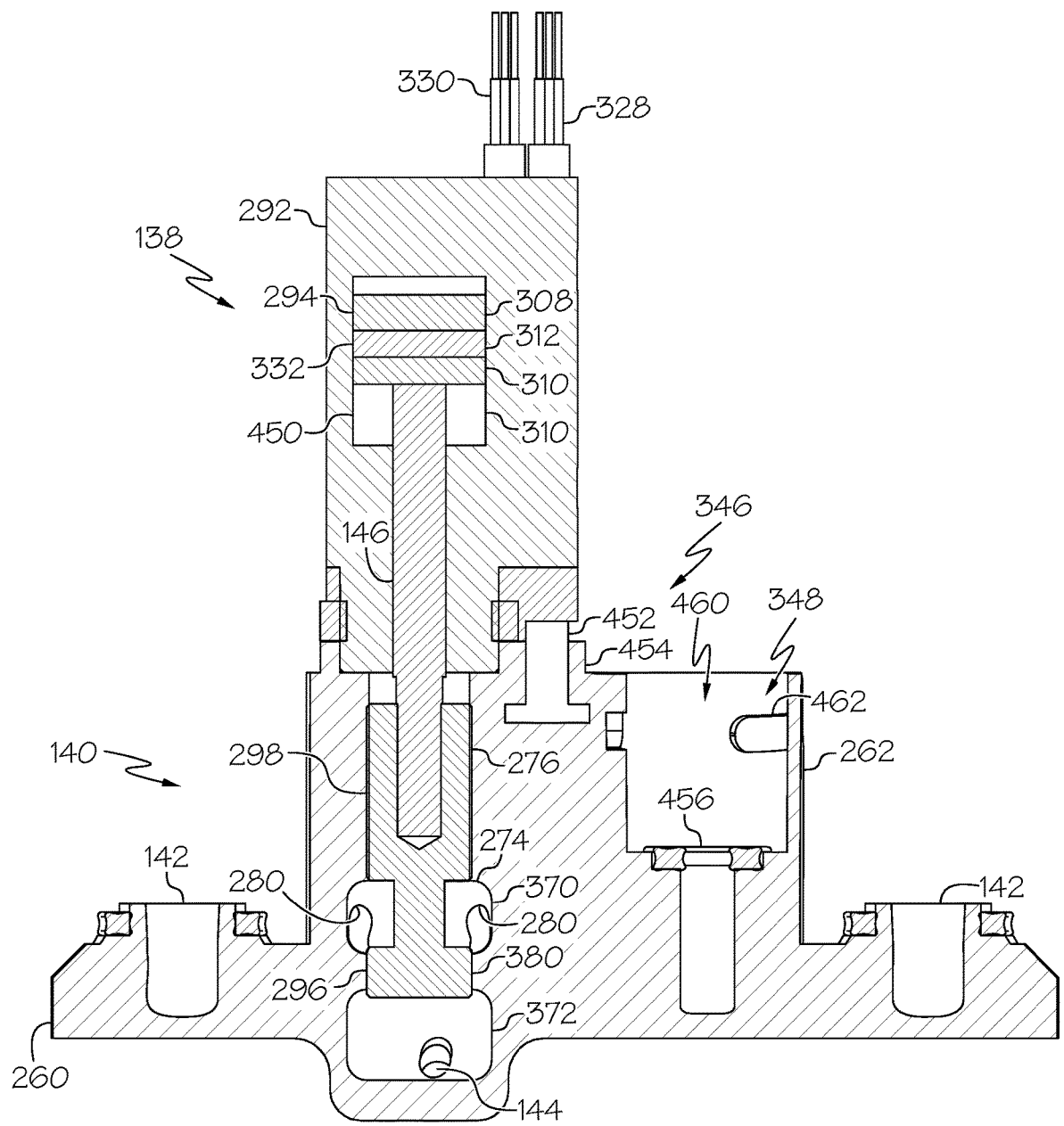
Figure 22:
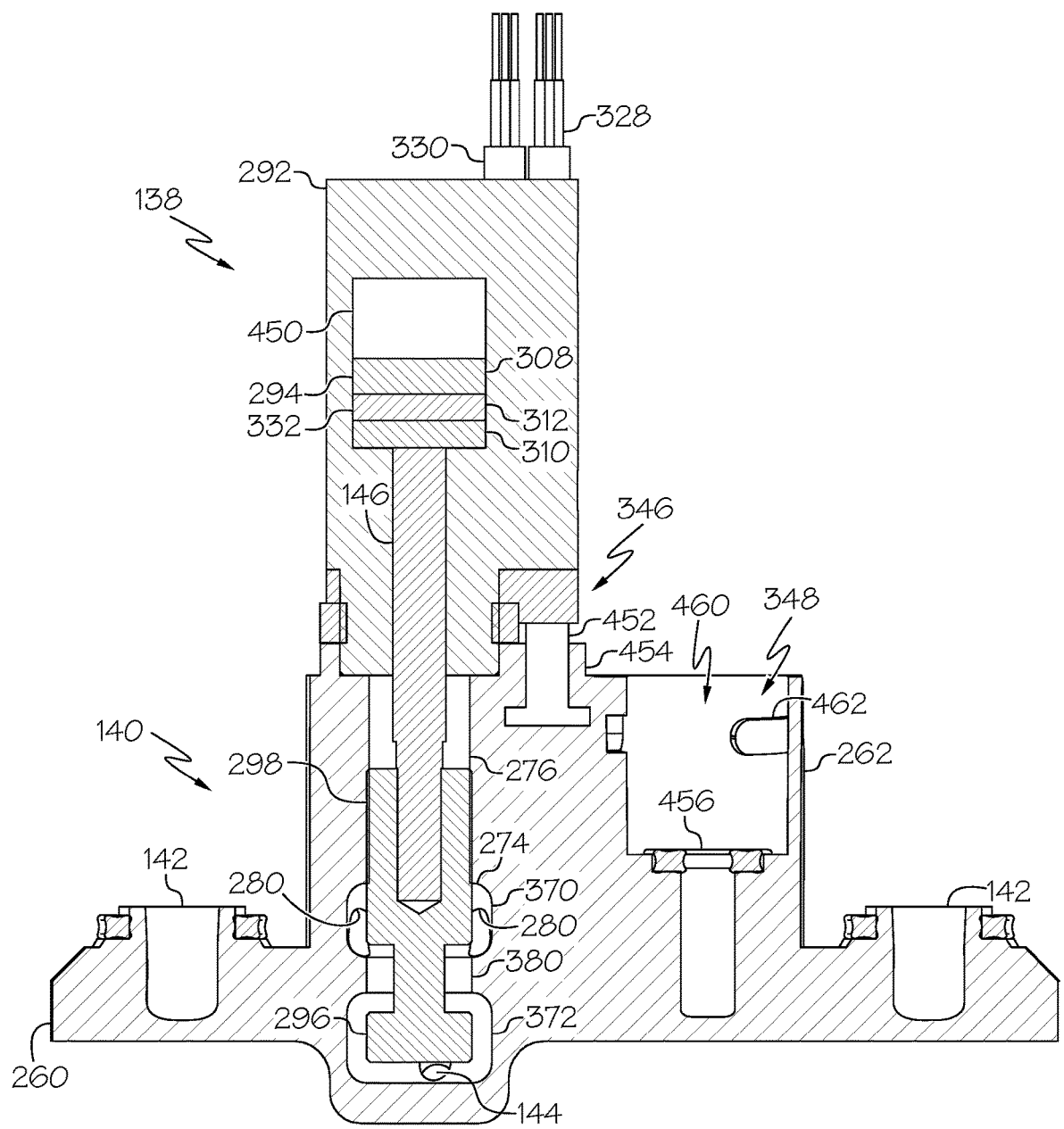
Figure 23:
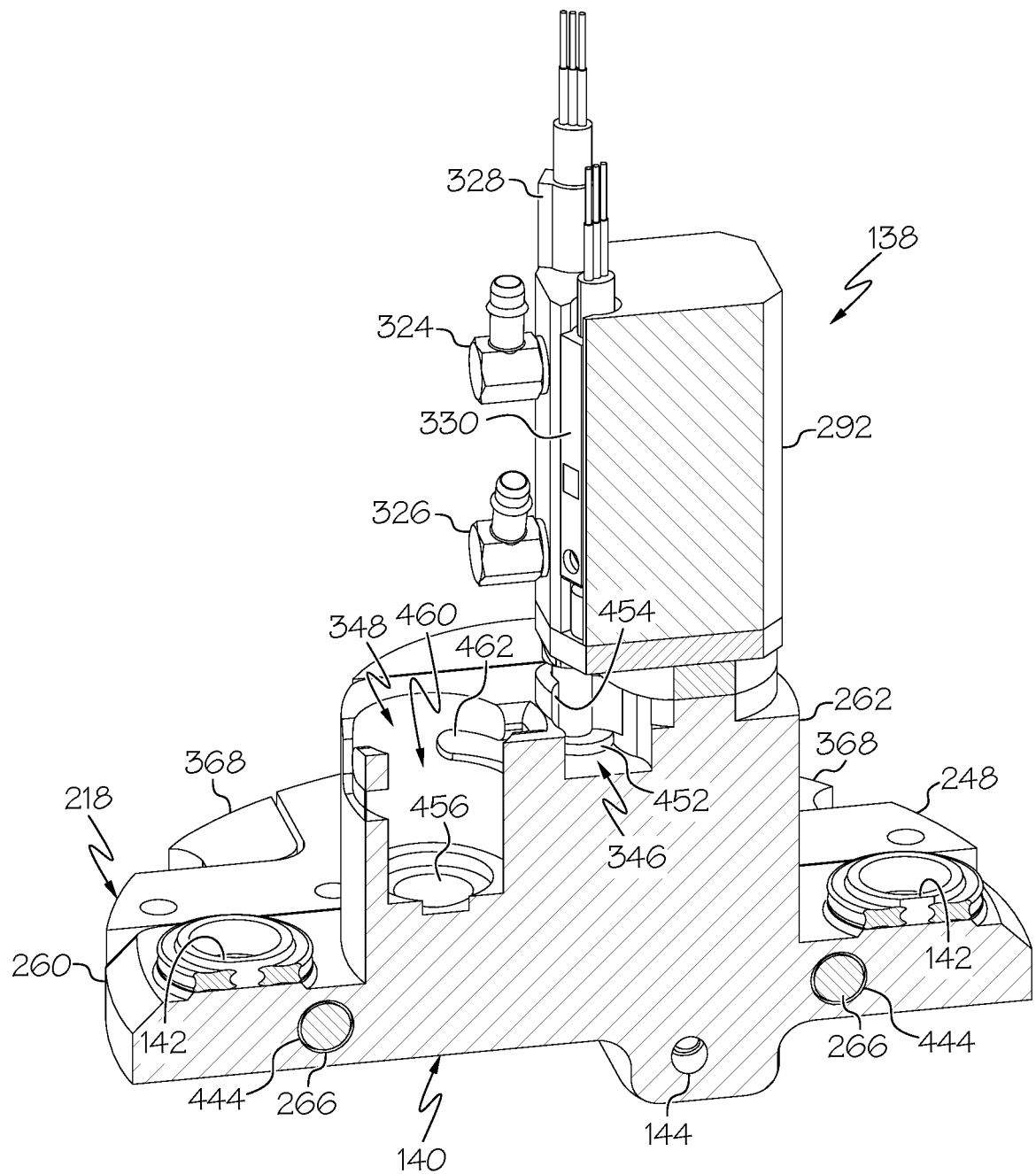
Figure 24:
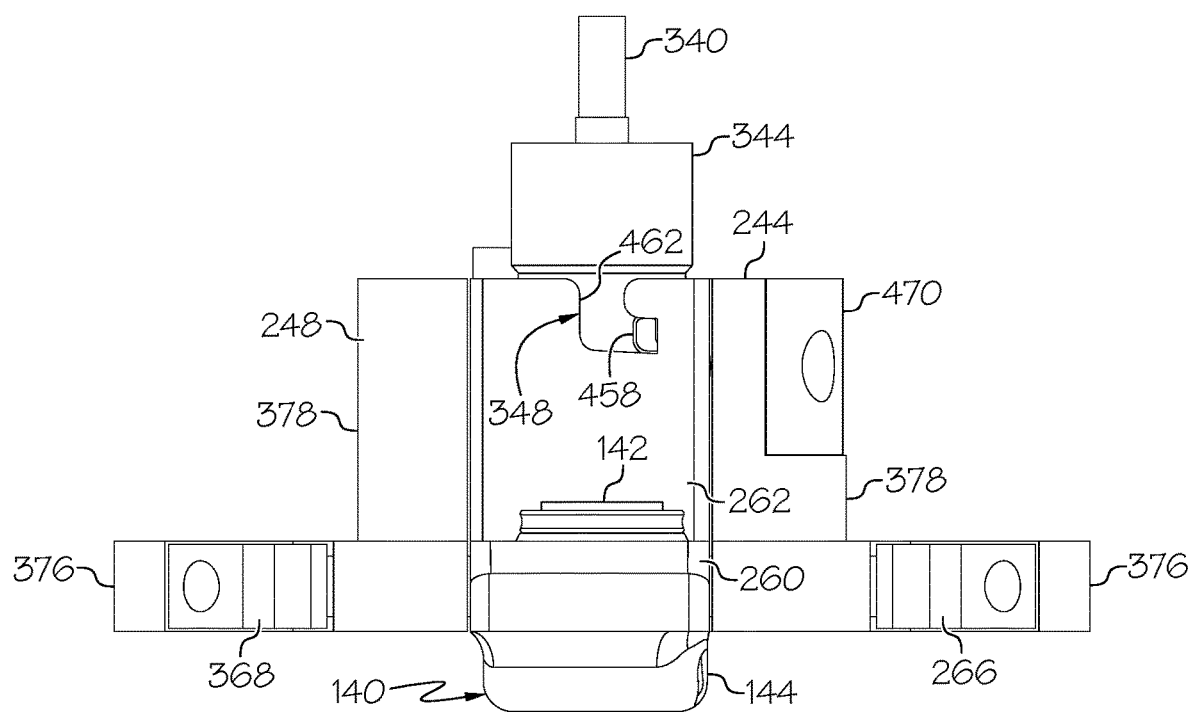
Figure 25:
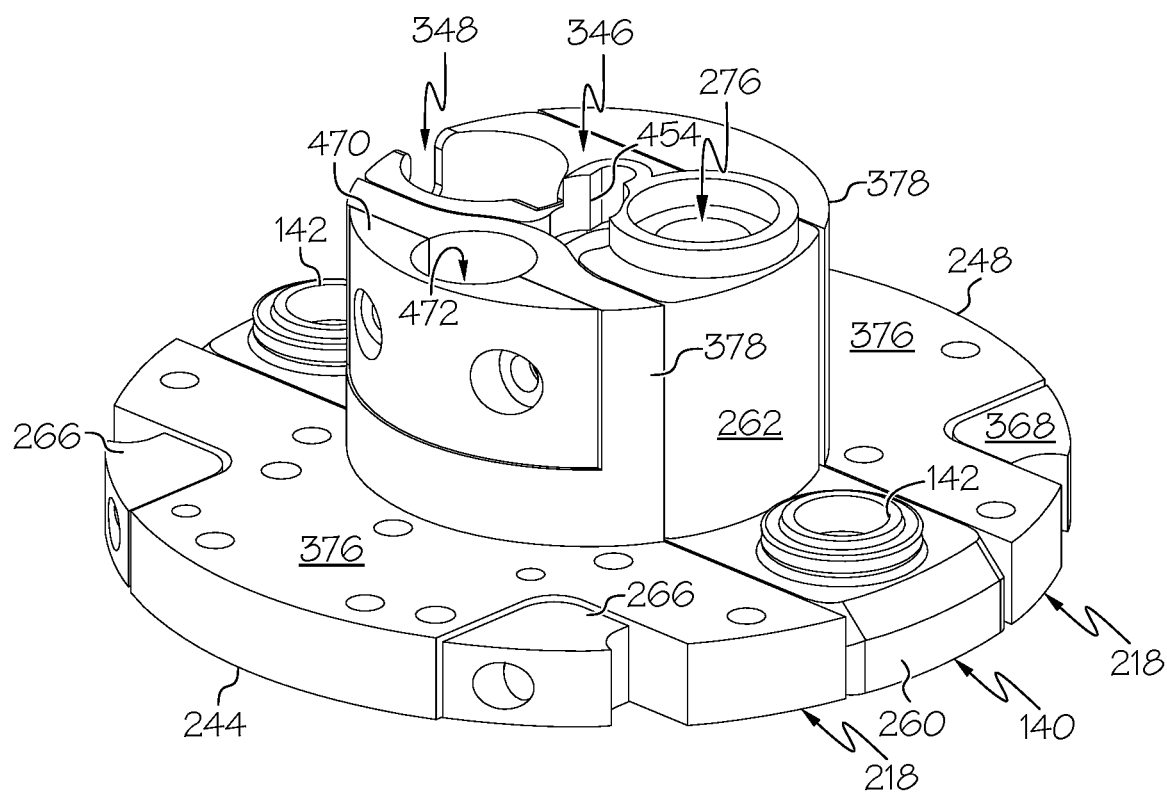
Figure 26:
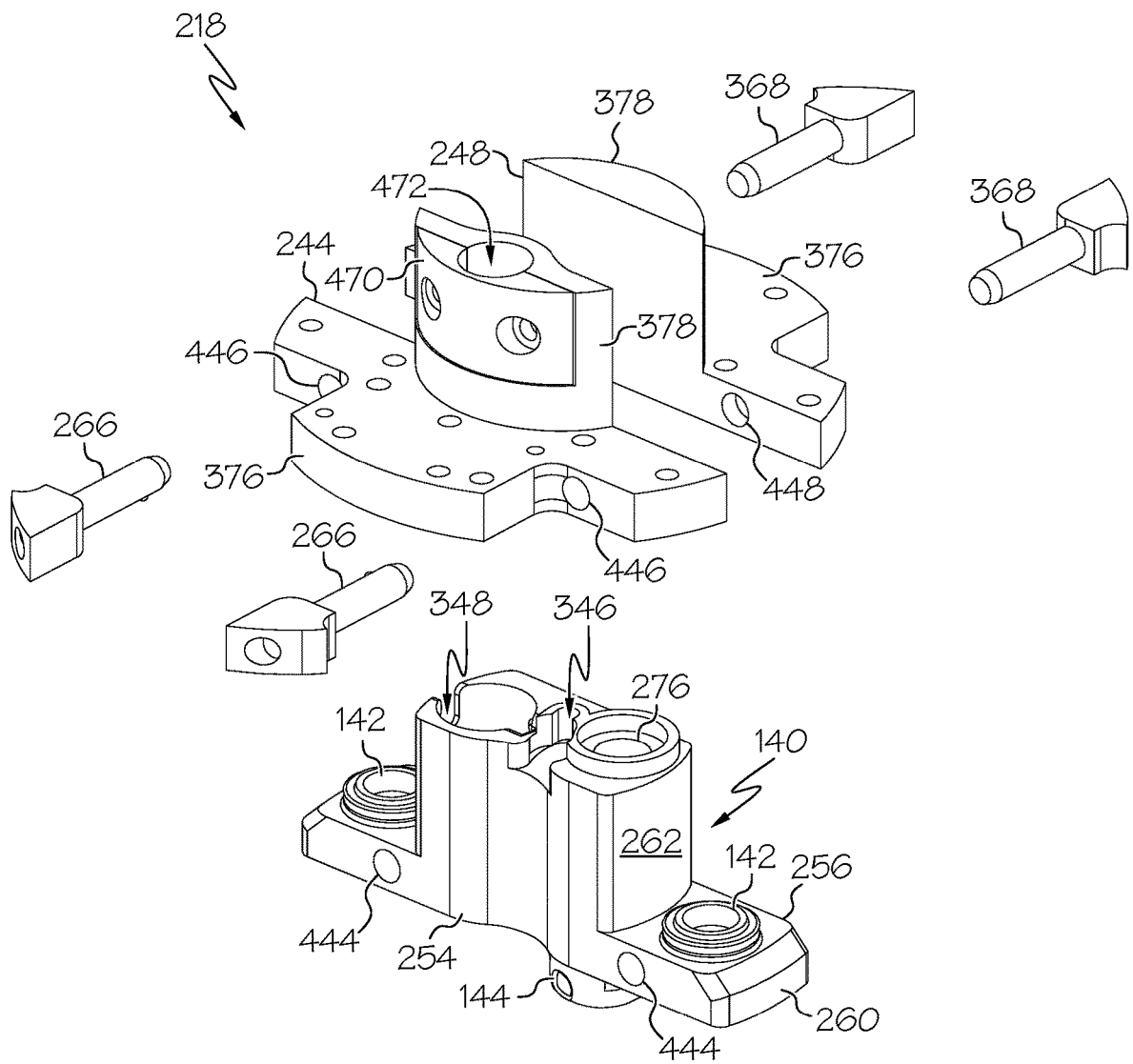
Figure 27:
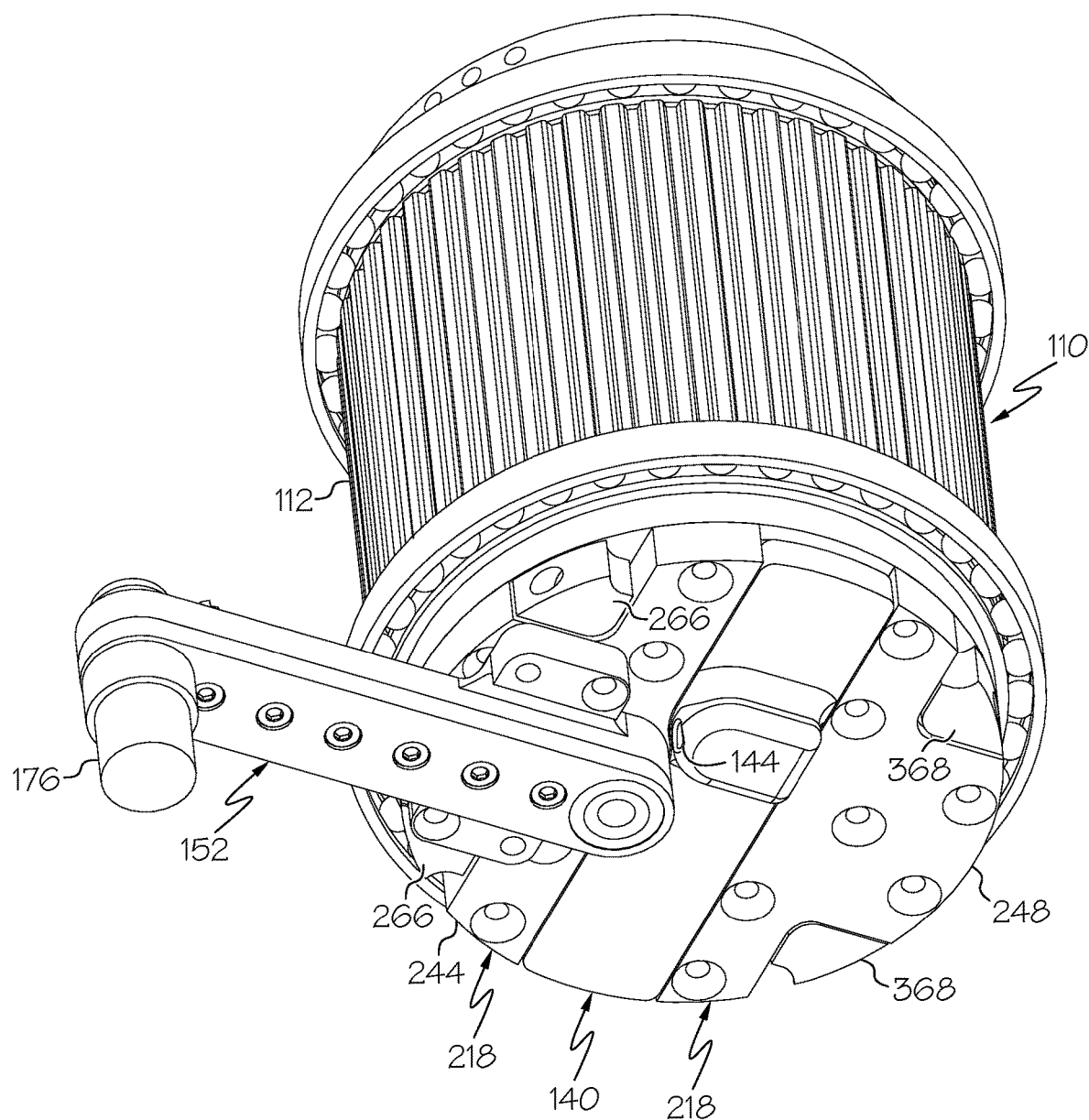
Figure 28:
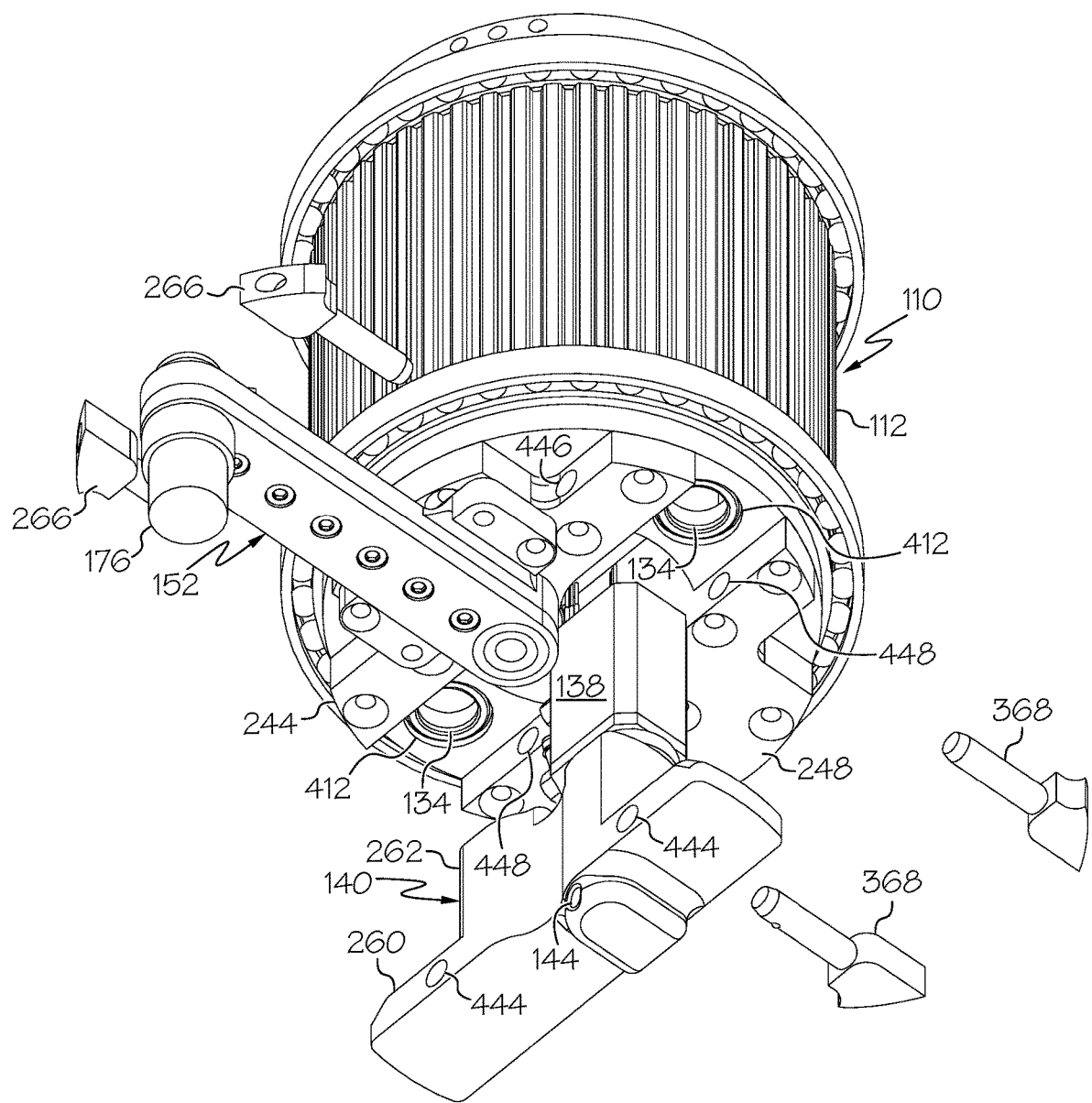
Figure 29:
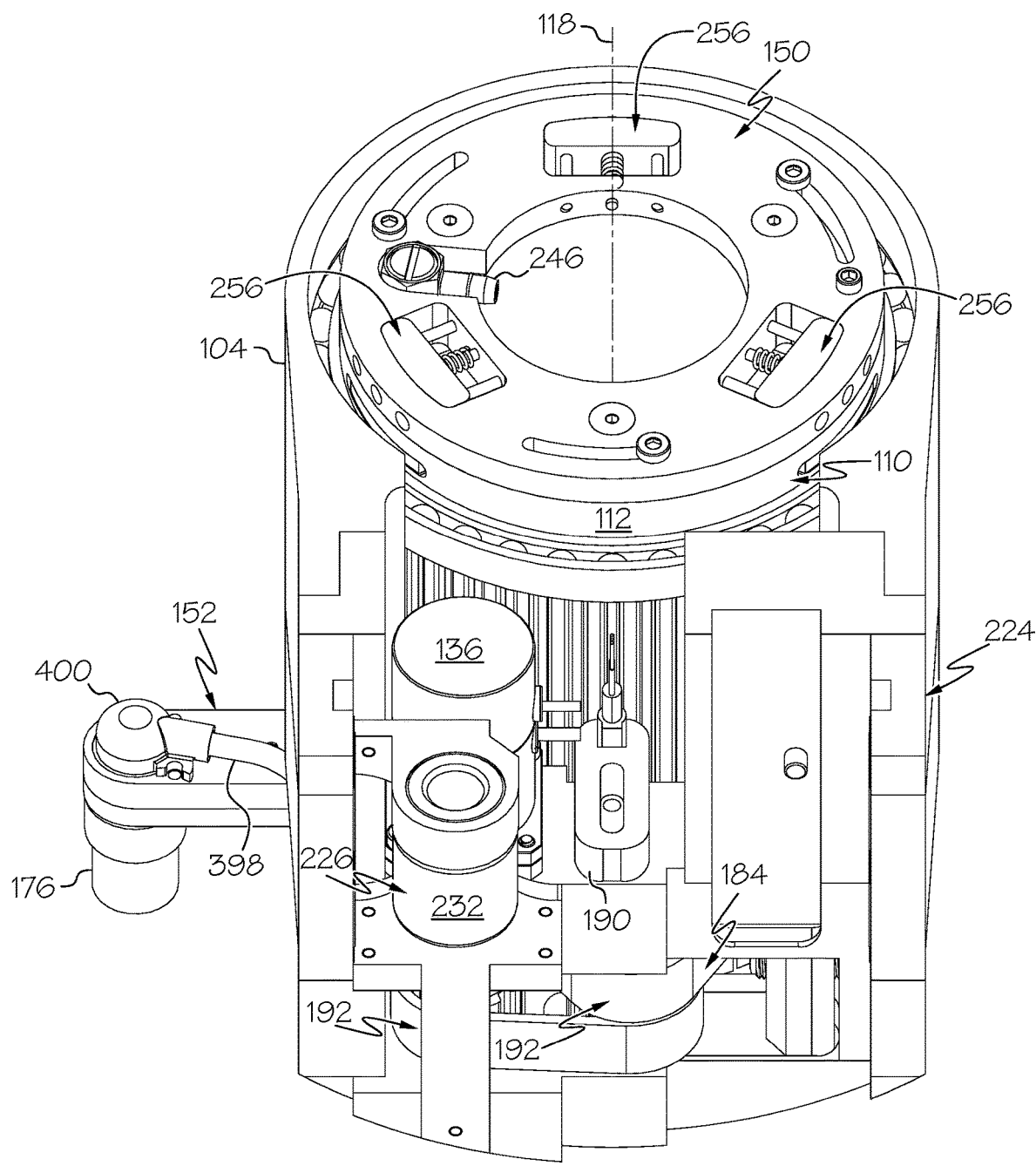
Figure 30:
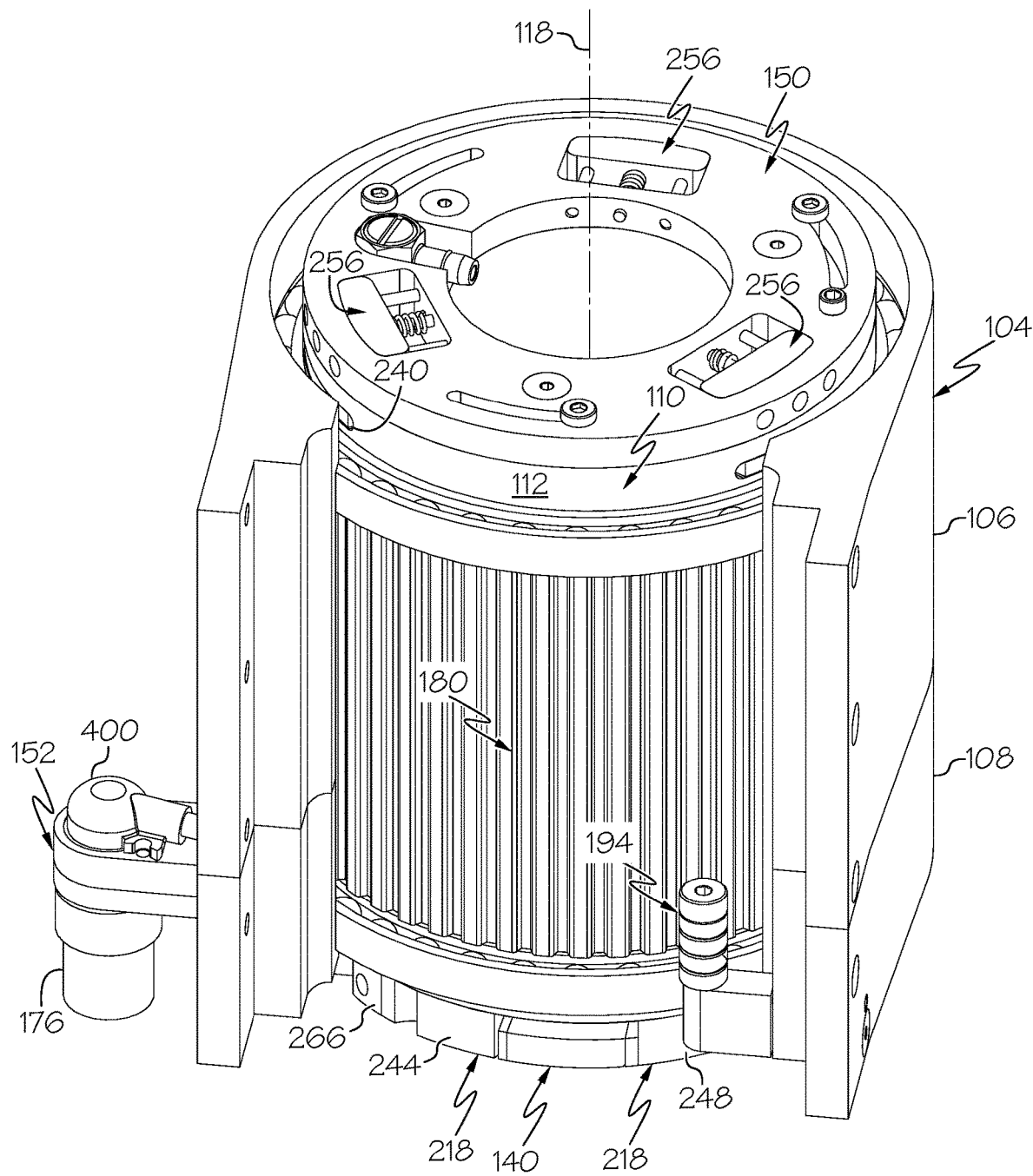
Figure 31:
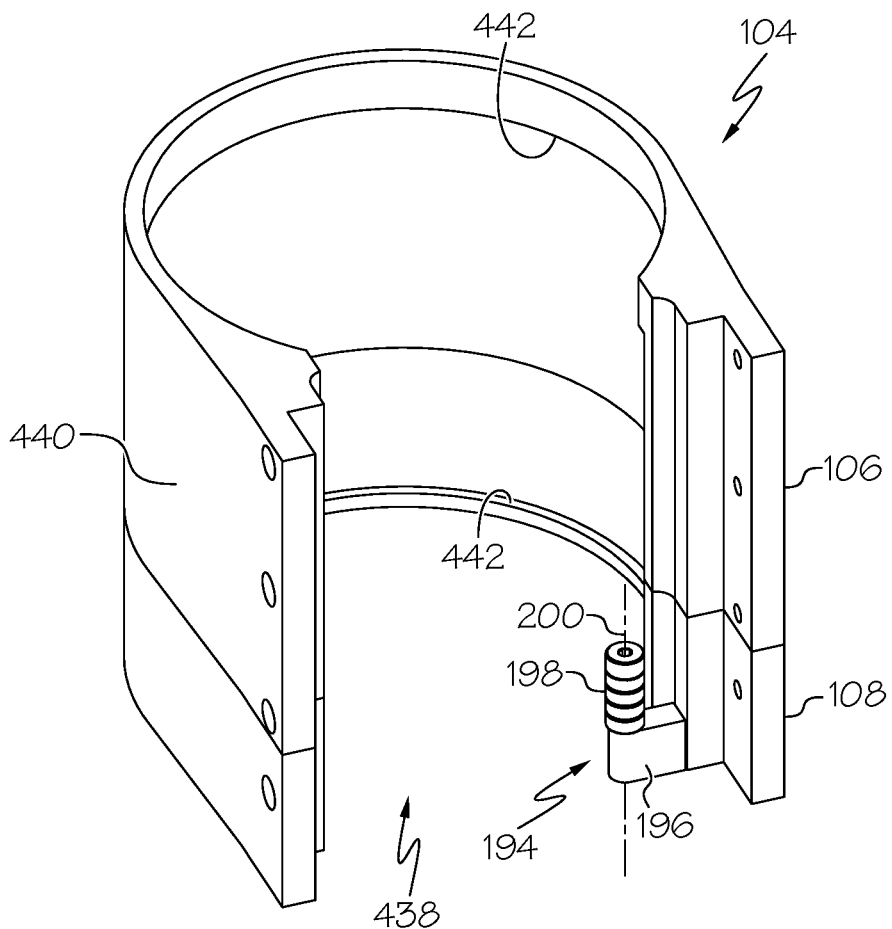
Figure 32:
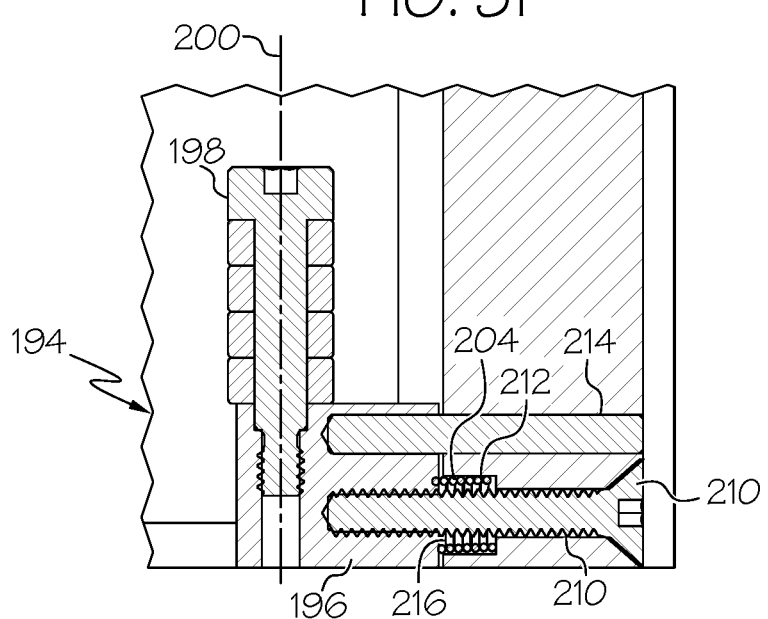
Figure 33:
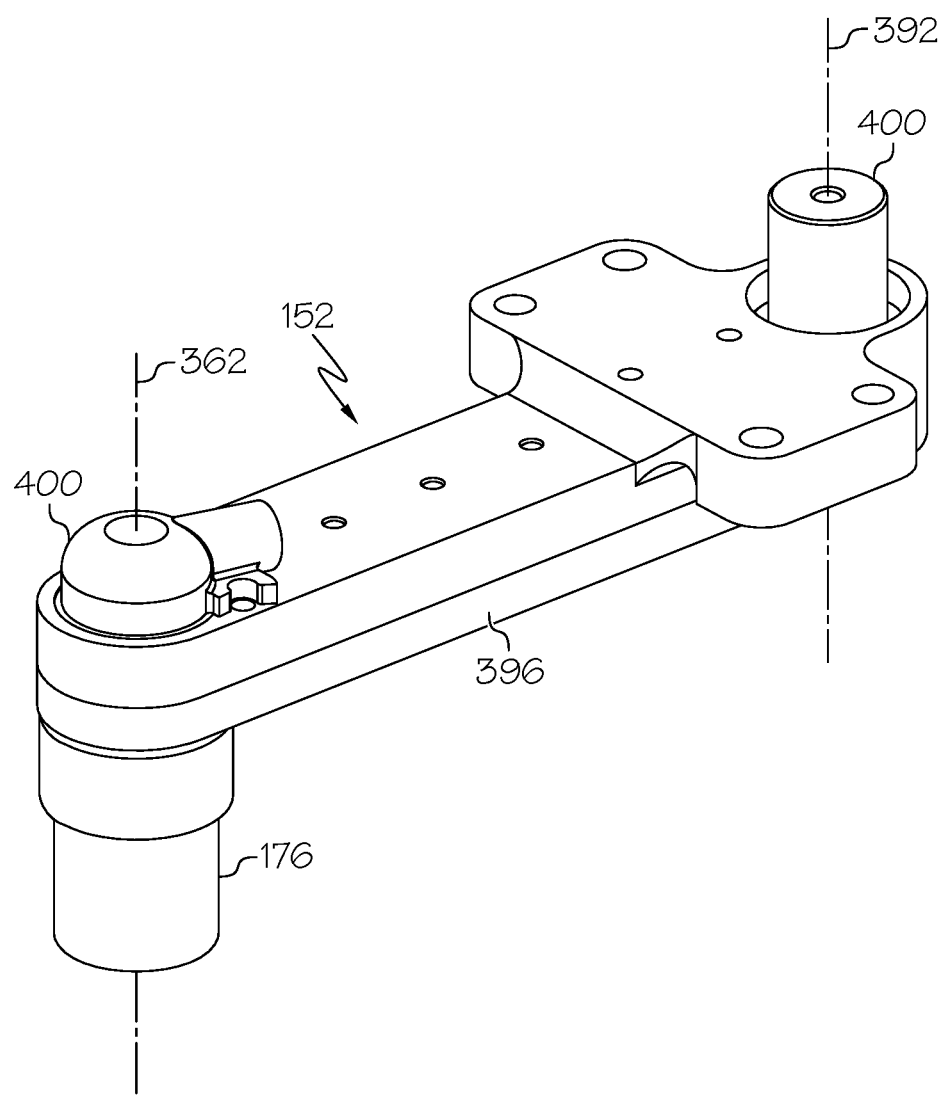
Figure 34:
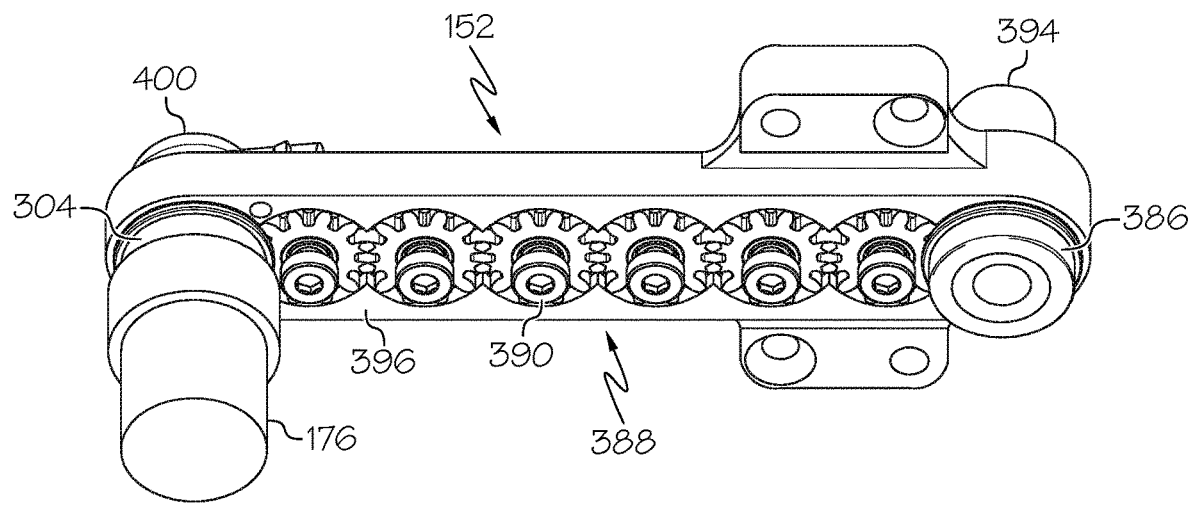
Figure 35:
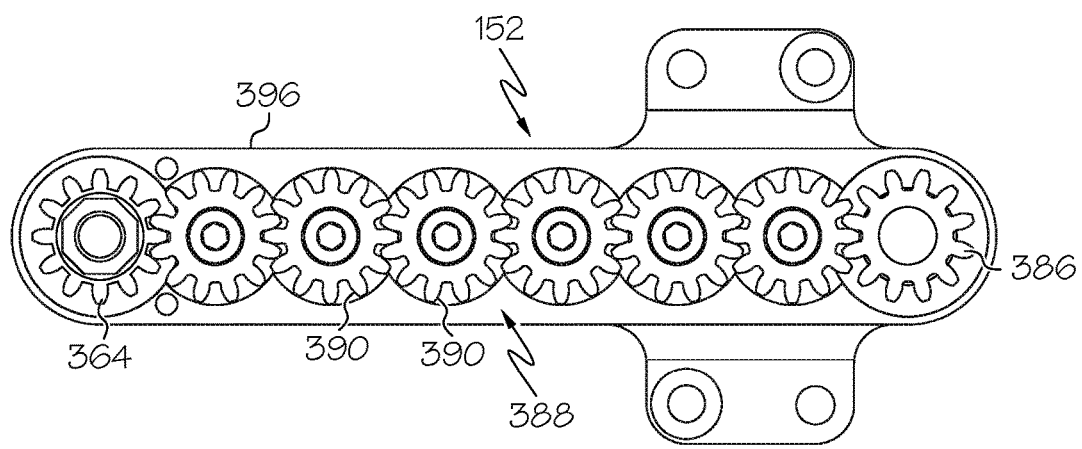
Figure 36:
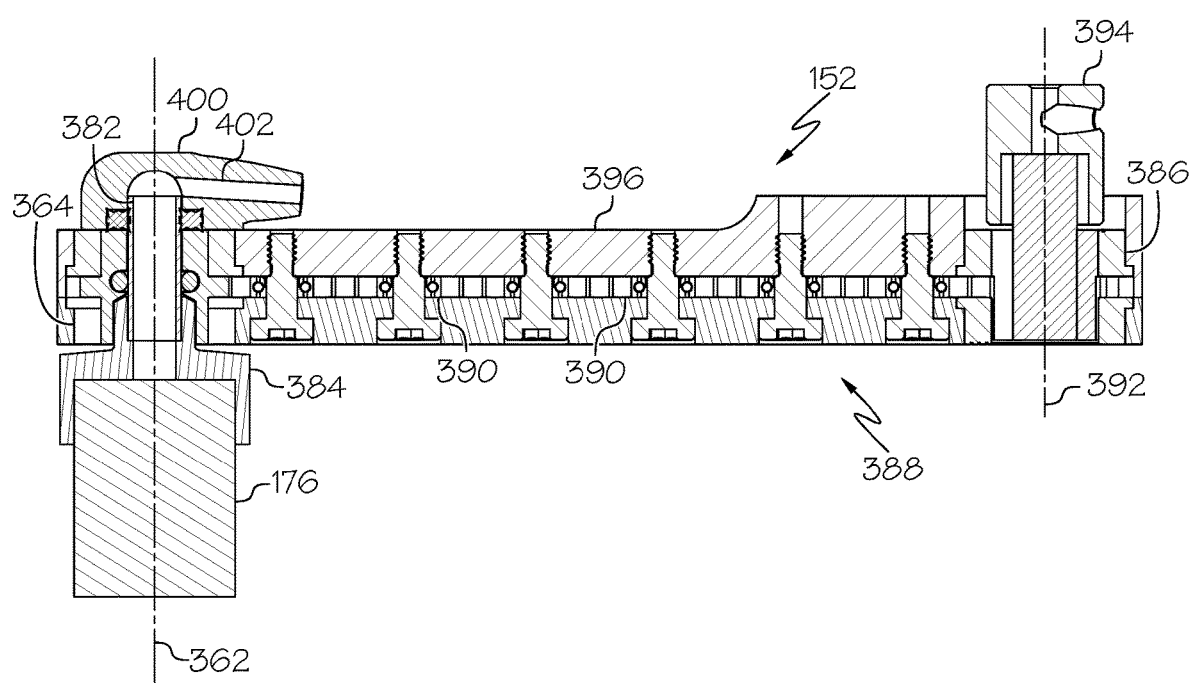
Figure 37A:
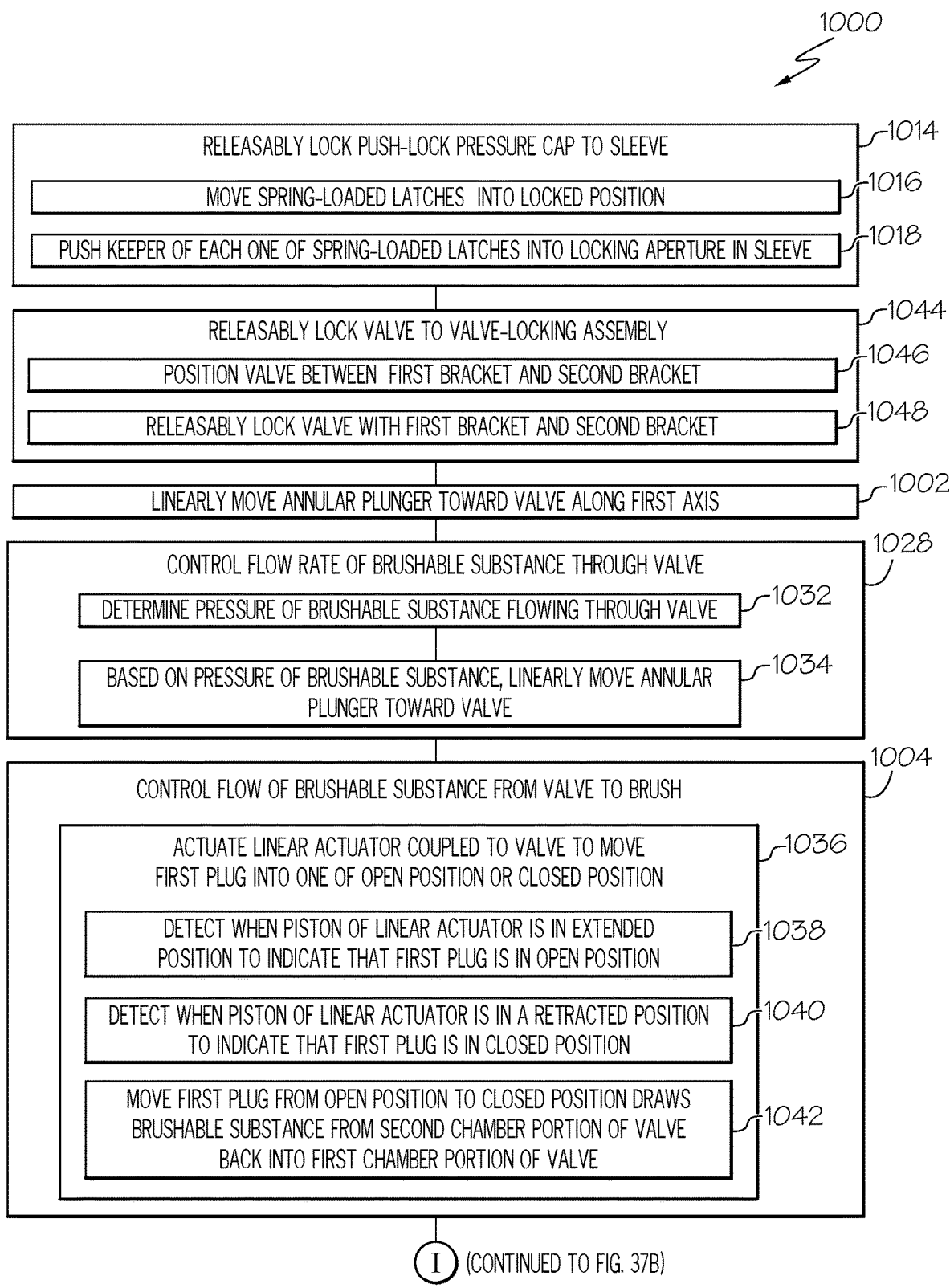
Figure 37B:
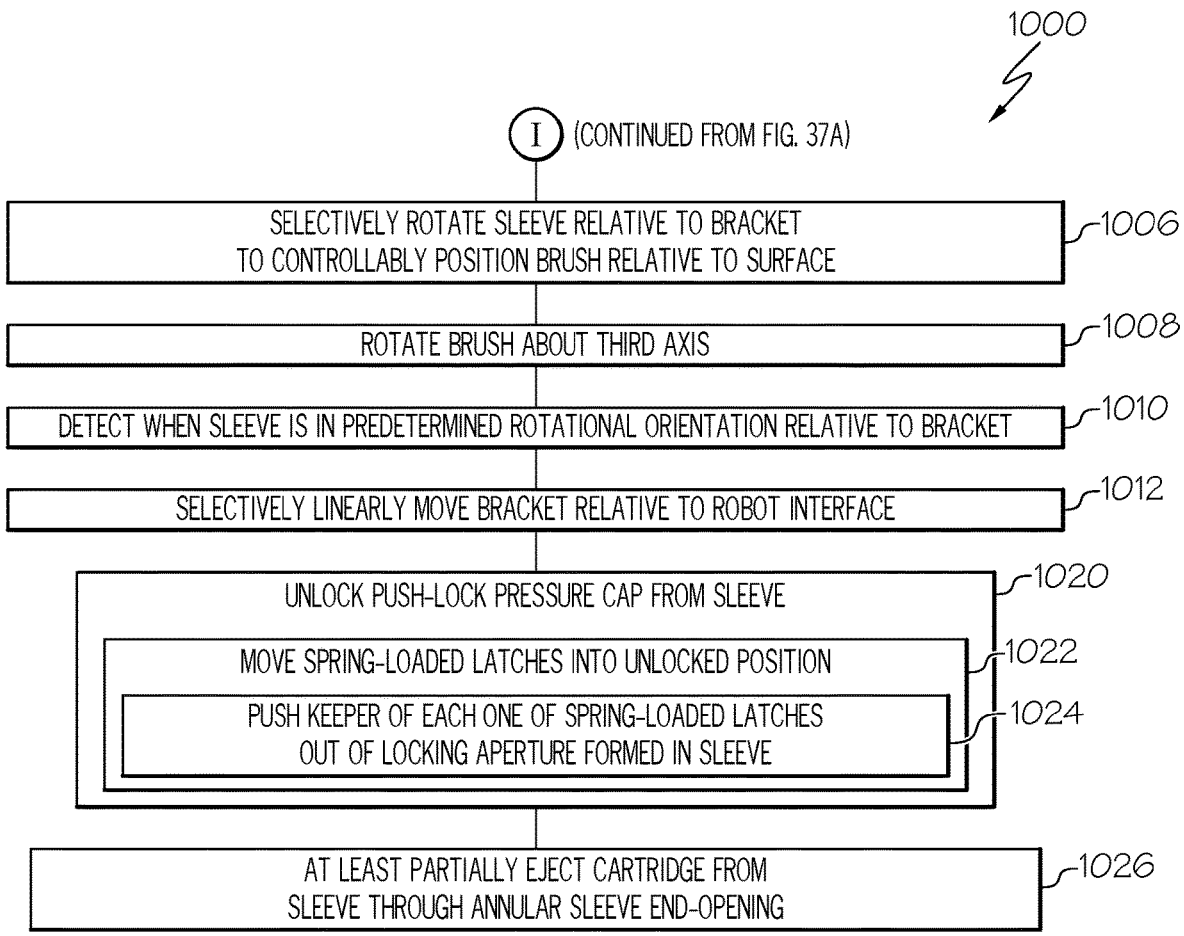
Figure 38:
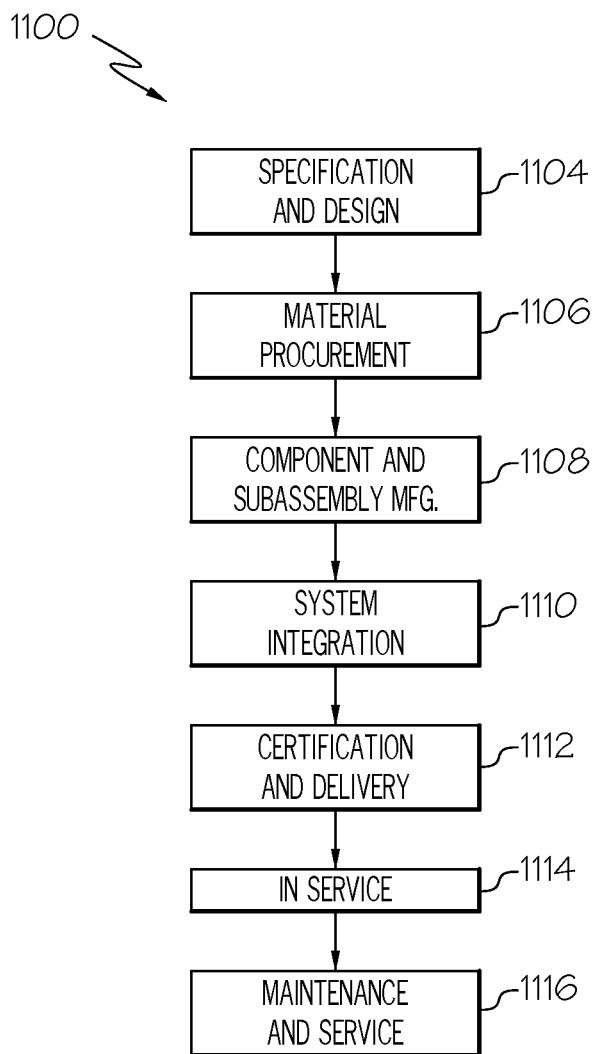

Having thus described one or more examples of the invention in general terms, reference will now be made to the accompanying drawings, which are not necessarily drawn to scale, and wherein like reference characters designate the same or similar parts throughout the several views, and wherein:

FIGS. 1A, 1B, and 1C collectively are a block diagram of an apparatus for dispensing an brushable substance, according to one or more examples of the present disclosure;

FIG. 2 is a schematic, perspective view of the apparatus of FIGS. 1A, 1B, and 1C, attached to a robot, according to one or more examples of the present disclosure;

FIG. 3 is a schematic, perspective, partial cut-away view of the apparatus of FIGS. 1A, 1B, and 1C, according to one or more examples of the present disclosure;

FIG. 4 is a schematic, perspective, exploded view of the apparatus of FIGS. 1A, 1B, and 1C, according to one or more examples of the present disclosure;

FIG. 5 is another schematic, perspective, exploded view of the apparatus of FIGS. 1A, 1B, and 1C, according to one or more examples of the present disclosure;

FIG. 6 is a schematic, perspective, sectional view of a sub-assembly of the apparatus of FIGS. 1A, 1B, and 1C, according to one or more examples of the present disclosure;

FIG. 7 is a schematic, elevation, sectional view of a sub-assembly of the apparatus of FIGS. 1A, 1B, and 1C, according to one or more examples of the present disclosure;

FIG. 8 is a schematic, elevation, sectional view of a sub-assembly of the apparatus of FIGS. 1A, 1B, and 1C, according to one or more examples of the present disclosure;

FIG. 9 is a schematic, elevation, sectional view of a sub-assembly of the apparatus of FIGS. 1A, 1B, and 1C, according to one or more examples of the present disclosure;

FIG. 10 is a schematic, perspective view of a sleeve and a cartridge of the apparatus of FIGS. 1A, 1B, and 1C, according to one or more examples of the present disclosure;

FIG. 11 is a schematic, perspective, exploded view of the sleeve and the cartridge of FIG. 10, according to one or more examples of the present disclosure;

FIG. 12 is a schematic, elevation, sectional view of a sleeve, a cartridge, and an annular plunger of the apparatus of FIGS. 1A, 1B, and 1C, according to one or more examples of the present disclosure;

FIG. 13 is a schematic, perspective view of a push-lock pressure cap of the apparatus of FIGS. 1A, 1B, and 1C, according to one or more examples of the present disclosure;

FIG. 14 is a schematic, elevation, sectional view of the push-lock pressure cap of FIG. 13, according to one or more examples of the present disclosure;

FIG. 15 is a schematic, perspective, exploded view of the push-lock pressure cap of FIG. 13, according to one or more examples of the present disclosure;

FIG. 16 is a schematic, perspective view of an annular plunger of the apparatus of FIGS. 1A, 1B, and 1C, according to one or more examples of the present disclosure;

FIG. 17 is a schematic, perspective, exploded view of the annular plunger of FIG. 16, according to one or more examples of the present disclosure;

FIG. 18 is a schematic, perspective view of a linear actuator, a valve, and a portion of a valve-locking assembly of the apparatus of FIGS. 1A, 1B, and 1C, according to one or more examples of the present disclosure;

FIG. 19 is a schematic, perspective, partially exploded view of the linear actuator, the valve, and the valve-locking assembly of FIG. 18, according to one or more examples of the present disclosure;

FIG. 20 is a schematic, elevation, sectional view of a valve of the apparatus of FIGS. 1A, 1B, and 1C, according to one or more examples of the present disclosure;

FIG. 21 is a schematic, elevation, sectional view of a linear actuator and a valve of the apparatus of FIGS. 1A, 1B, and 1C, according to one or more examples of the present disclosure;

FIG. 22 is a schematic, elevation, sectional view of a linear actuator and a valve of the apparatus of FIGS. 1A, 1B, and 1C, according to one or more examples of the present disclosure;

FIG. 23 is a schematic, perspective, sectional view of a linear actuator and a valve of the apparatus of FIGS. 1A, 1B, and 1C, according to one or more examples of the present disclosure;

FIG. 24 is a schematic, elevation view of a valve and a valve-locking assembly of the apparatus of FIGS. 1A, 1B, and 1C, according to one or more examples of the present disclosure;

FIG. 25 is a schematic, perspective view of a valve and a valve-locking assembly of the apparatus of FIGS. 1A, 1B, and 1C, according to one or more examples of the present disclosure;

FIG. 26 is a schematic, perspective, exploded view of the valve and the valve-locking assembly of FIG. 25, according to one or more examples of the present disclosure;

FIG. 27 is a schematic, perspective view of a sleeve, a valve, a valve-locking assembly, and a brush-arm assembly of the apparatus of FIGS. 1A, 1B, and 1C, according to one or more examples of the present disclosure;

FIG. 28 is a schematic, perspective, partially exploded view of the sleeve, the valve, the valve-locking assembly, and the brush-arm assembly of FIG. 27, according to one or more examples of the present disclosure;

FIG. 29 is a schematic, perspective view of a sub-assembly of the apparatus of FIGS. 1A, 1B, and 1C, according to one or more examples of the present disclosure;

FIG. 30 is a schematic, perspective view of a sub-assembly of the apparatus of FIGS. 1A, 1B, and 1C, according to one or more examples of the present disclosure;

FIG. 31 is a schematic, perspective view of a bracket of the apparatus of FIGS. 1A, 1B, and 1C, according to one or more examples of the present disclosure;

FIG. 32 is a schematic, elevation, sectional view of a tensioner of the apparatus of FIGS. 1A, 1B, and 1C, according to one or more examples of the present disclosure;

FIG. 33 is a schematic, perspective view of a brush-arm assembly of the apparatus of FIGS. 1A, 1B, and 1C, according to one or more examples of the present disclosure;

FIG. 34 is a schematic, perspective view of a brush-arm assembly of the apparatus of FIGS. 1A, 1B, and 1C, according to one or more examples of the present disclosure;

FIG. 35 is a schematic, bottom view of a brush-arm assembly of the apparatus of FIGS. 1A, 1B, and 1C, according to one or more examples of the present disclosure;

FIG. 36 is a schematic, elevation, sectional view of a brush-arm assembly of the apparatus of FIGS. 1A, 1B, and 1C, according to one or more examples of the present disclosure;

FIGS. 37A and 37B collectively are a block diagram of a method of dispensing a brushable substance onto a surface utilizing the apparatus of FIG. 1, according to one or more examples of the present disclosure;

FIG. 38 is a block diagram of aircraft production and service methodology; and

Figure 39:
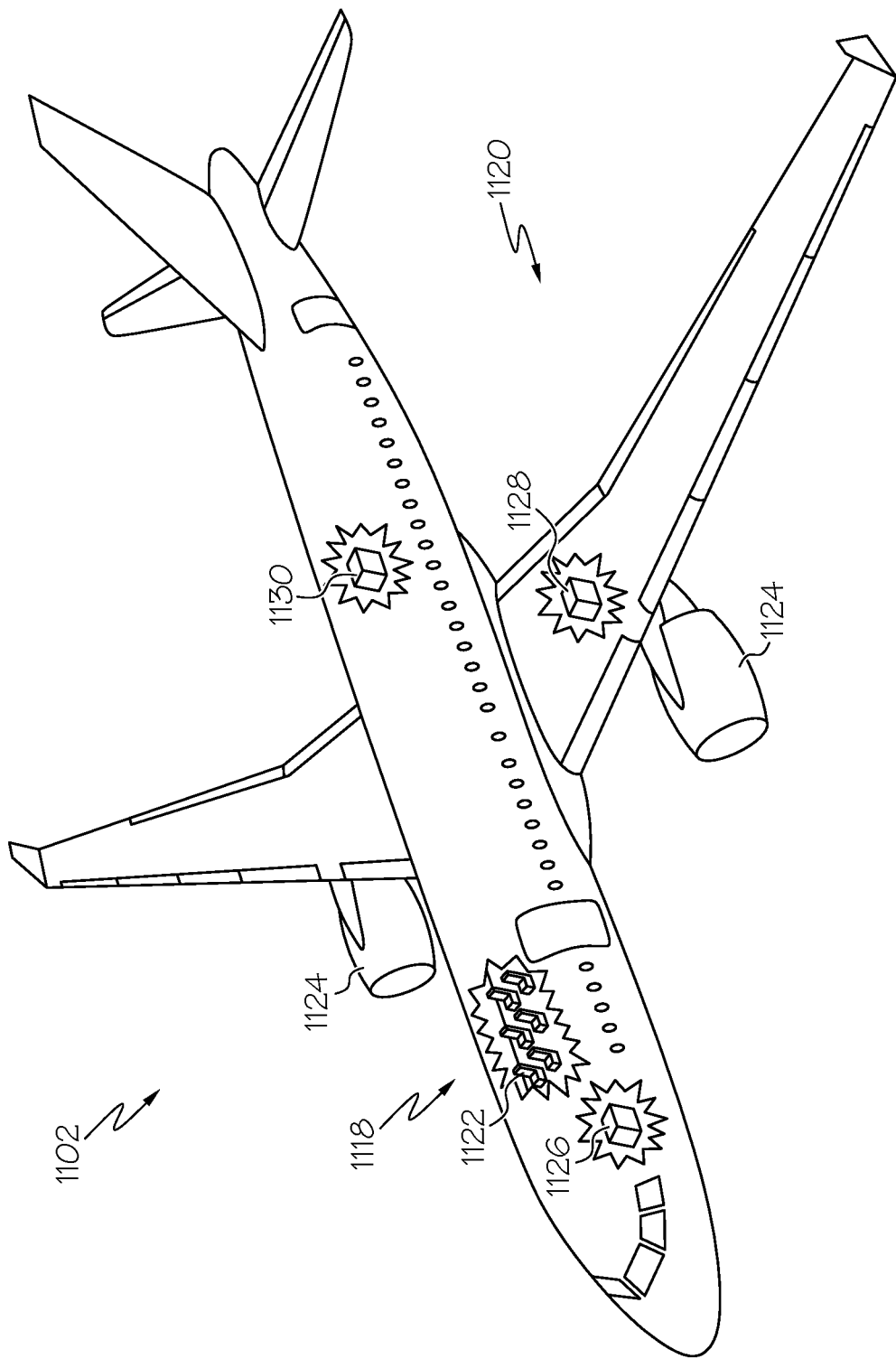

FIG. 39 is a schematic illustration of an aircraft.

DETAILED DESCRIPTION

In FIGS. 1A, 1B, and 1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

In FIGS. 37A, 37B, 37C, and 38, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 37A, 37B, 37C, and 38 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A, 1B, and 1C and particularly to, e.g., FIGS. 2-5, apparatus 100 for dispensing brushable substance 102 onto surface 154 is disclosed. Apparatus 100 comprises bracket 104, configured to be removably coupled with robot 116. Apparatus 100 further comprises sleeve 110, comprising inner tubular sleeve wall 114 and outer tubular sleeve wall 112, circumscribing inner tubular sleeve wall 114. Sleeve 110 is coupled to bracket 104 and is rotatable relative to bracket 104 about first axis 118. Apparatus 100 also comprises cartridge 124, comprising inner tubular cartridge wall 126 and outer tubular cartridge wall 128, circumscribing inner tubular cartridge wall 126. Cartridge 124 is configured to be positioned between inner tubular sleeve wall 114 and outer tubular sleeve wall 112. Apparatus 100 additionally comprises valve 140, configured to be communicatively coupled with cartridge 124. Apparatus 100 further comprises brush-arm assembly 152, coupled to sleeve 110. Apparatus 100 also comprises linear actuator 138 to control flow of brushable substance 102 from valve 140. Apparatus 100 additionally comprises annular plunger 148, positioned between inner tubular cartridge wall 126 and outer tubular cartridge wall 128 and movable along first axis 118. Apparatus 100 further comprises push-lock pressure cap 150, configured to be hermetically coupled with cartridge 124. Cartridge 124 is configured to be positioned between push-lock pressure cap 150 and valve 140. The preceding subject matter of this paragraph characterizes example 1 of the present disclosure.

Apparatus 100 provides for dispensing brushable substance 102, from cartridge 124, through brush-arm assembly 152, onto surface 154 of a workpiece, for example, located in a confined space. The configuration of sleeve 110 and cartridge 124 reduces the size requirements for storage of brushable substance 102 and enables linear actuator 138 and a portion of valve 140 to be located, or housed, within sleeve 110. Push-lock pressure cap 150 enables pressurization of an interior volume, located within cartridge 124, which drives annular plunger 148. Rotation of sleeve 110 controls an angular orientation of brush-arm assembly 152 relative to bracket 104 and surface 154 during dispensing of brushable substance 102. Valve 140 being communicatively coupled directly to cartridge 124 enables reduction of brushable substance 102 wasted, for example, during replacement of cartridge 124 and/or a purging operation.

Apparatus 100 is configured to facilitate a reduction in the labor, time, and inaccuracies associated with the application of brushable substance 102 onto surface 154 (and/or other surfaces) of the workpiece. Apparatus 100 is further configured to facilitate the automated application of brushable substance 102 within a confined space, such as within a wing box of an aircraft.

As used herein, brushable substance 102 refers to any substance or material that is capable of being brushed, wiped, polished or otherwise spread onto a surface, for example, using an implement having bristles. Examples of brushable substance 102 include, but are not limited to, paints, adhesives, protective coatings, polishes, and sealants. In some examples, brushable substance 102 is used for purposes of painting, surface protection, corrosion resistance, and/or fixation, among other purposes.

Generally, apparatus 100 functions as an automated end effector that is operably coupled with an end of robot 116 (FIG. 2) or other robotic arm mechanism and that is designed to interact with the environment by dispensing brushable substance 102 onto surface 154. Cartridge 124 of apparatus 100 provides for the containment of brushable substance 102. Sleeve 110 of apparatus 100 enables a secure coupling of cartridge 124 to apparatus 100. Push-lock pressure cap 150 enables access to sleeve 110 for insertion of cartridge 124 into sleeve 110 and removal of cartridge 124 from within sleeve 110. Push-lock pressure cap 150 also enables the application of pressure to (e.g., within) cartridge 124 for moving annular plunger 148 along first axis 118 toward valve 140. Movement of annular plunger 148 toward valve 140 urges brushable substance 102 out of cartridge 124 and into valve 140. With cartridge 124 received within sleeve 110 and push-lock pressure cap 150 in a closed and locked position, cartridge 124 is sealingly and communicatively coupled with valve 140 to enable sealed flow of brushable substance 102 from cartridge 124 to valve 140 via the application of pressure to annular plunger 148. Brush-arm assembly 152 dispenses brushable substance 102 from valve 140 to surface 154. Linear actuator 138 facilitates control of flow of brushable substance 102 from valve 140 to brush-arm assembly 152 by selectively opening and closing valve 140. In some examples, linear actuator 138 is any one of various linear actuators powered in any one of various ways, such as pneumatically, electrically, hydraulically, and the like.

With sleeve 110 coupled to bracket 104, inner tubular sleeve wall 114 of sleeve 110 circumscribes first axis 118. In some examples, each one of inner tubular sleeve wall 114 and outer tubular sleeve wall 112 of sleeve 110 has a tubular shape suitable to receive cartridge 124 and rotate relative to bracket 104. In an example, each one of inner tubular sleeve wall 114 and outer tubular sleeve wall 112 of sleeve 110 has a circular cross-sectional shape. In another example, each one of inner tubular sleeve wall 114 and outer tubular sleeve wall 112 of sleeve 110 has an elliptical cross-sectional shape. Similarly, with cartridge 124 received within sleeve 110, inner tubular cartridge wall 126 of cartridge 124 circumscribes first axis 118 and inner tubular sleeve wall 114 and outer tubular sleeve wall 112 circumscribes outer tubular cartridge wall 128. In some examples, each one of inner tubular cartridge wall 126 and outer tubular cartridge wall 128 of cartridge 124 has a tubular shape suitable to contain brushable substance 102 and fit between inner tubular sleeve wall 114 outer tubular sleeve wall 112. In an example, each one of inner tubular cartridge wall 126 and outer tubular cartridge wall 128 of cartridge 124 has a circular cross-sectional shape. In another example, each one of inner tubular cartridge wall 126 and outer tubular cartridge wall 128 of cartridge 124 has an elliptical cross-sectional shape. In some examples, first axis 118 is a central longitudinal axis of apparatus 100.

In some examples, sleeve 110 is coupled to bracket 104 in any manner suitable to enable rotation of sleeve 110 about first axis 118 relative to bracket 104. In some examples, apparatus 100 also includes one or more annular bearings 404 coupled to an exterior of outer tubular sleeve wall 112 of sleeve 110. In some examples, a first one of annular bearings 404 is located at one end of sleeve 110 and a second one of annular bearings 404 is located at the other end of sleeve 110.

Referring generally to FIGS. 1A, 1B, and 1C and particularly to, e.g., FIGS. 10-12, sleeve 110 further comprises sleeve first end 120, comprising annular sleeve end-opening 162 that separates inner tubular sleeve wall 114 and outer tubular sleeve wall 112. Sleeve 110 is configured to receive cartridge 124 through annular sleeve end-opening 162. The preceding subject matter of this paragraph characterizes example 2 of the present disclosure, wherein example 2 also includes the subject matter according to example 1, above.

Annular sleeve end-opening 162 provides an access opening into sleeve 110 and facilitates insertion of cartridge 124 into sleeve 110 and removal of cartridge 124 from within sleeve 110. Moreover, with push-lock pressure cap 150 coupled to sleeve 110, at least portion of push-lock pressure cap 150 is positioned within annular sleeve end-opening 162 to enable locking of push-lock pressure cap 150 to sleeve 110.

Referring generally to FIGS. 1A, 1B, and 1C and particularly to, e.g., FIG. 12, sleeve 110 further comprises at least a portion of cartridge-ejection system 164, selectively operable to at least partially eject cartridge 124 from sleeve 110 through annular sleeve end-opening 162. The preceding subject matter of this paragraph characterizes example 3 of the present disclosure, wherein example 3 also includes the subject matter according to example 2, above.

Cartridge-ejection system 164 enables application of an ejection force, sufficient to at least partially move cartridge 124 along first axis 118 through annular sleeve end-opening 162 for removal of cartridge 124 from within sleeve 110.

Referring generally to FIGS. 1A, 1B, and 1C and particularly to, e.g., FIG. 12, sleeve 110 further comprises sleeve second end 122, opposite sleeve first end 120, and annular sleeve end-wall 168, interconnecting inner tubular sleeve wall 114 and outer tubular sleeve wall 112 at sleeve second end 122. Cartridge-ejection system 164 comprises sleeve pressure input 166, configured to communicate pneumatic pressure through annular sleeve end-wall 168 to at least partially push cartridge 124 out of annular sleeve end-opening 162. The preceding subject matter of this paragraph characterizes example 4 of the present disclosure, wherein example 4 also includes the subject matter according to example 3, above.

Selective pneumatic operation of sleeve pressure input 166 enables application of pneumatic pressure between annular sleeve end-wall 168 and cartridge 124 to push cartridge 124 out of sleeve 110 through annular sleeve end-opening 162. Moreover, selective pneumatic operation of sleeve pressure input 166 facilitates use of automated pneumatic controls to control pneumatic operation of sleeve pressure input 166 of sleeve 110.

In some examples, sleeve pressure input 166 of cartridge-ejection system 164 includes (or is) a pneumatic fitting coupled to annular sleeve end-wall 168 and configured to communicate pneumatic pressure through annular sleeve end-wall 168. Cartridge-ejection system 164 enables application of pneumatic pressure to cartridge 124 to create the ejection force for moving cartridge 124 along first axis 118. In some examples, pneumatic pressure is applied between annular sleeve end-wall 168 and cartridge 124 to at least partially eject cartridge 124 from sleeve 110. In some examples, cartridge-ejection system 164 also includes a pressure tube (e.g., an air hose) to facilitate communication of pressure to sleeve pressure input 166. In some examples, the pressure tube communicates pressure from a source of pneumatic pressure to sleeve pressure input 166. In some examples, remaining portions of cartridge-ejection system 164 (e.g., source of pneumatic pressure, controller, pressure actuator, etc.) are located, for example, on an exterior of apparatus 100, on robot 116, etc.

Referring generally to FIGS. 1A, 1B, and 1C and particularly to, e.g., FIGS. 4, 5, and 29, apparatus 100 further comprises first drive assembly 192, configured to selectively controllably rotate sleeve 110 about first axis 118 relative to bracket 104. The preceding subject matter of this paragraph characterizes example 5 of the present disclosure, wherein example 5 also includes the subject matter according to any one of examples 1 to 4, above.

First drive assembly 192 facilitates automated, precise rotation of sleeve 110 about first axis 118 relative to bracket 104. Controlled selective rotary motion of sleeve 110 relative to bracket 104 enables selective adjustment of a rotational orientation of sleeve 110 about first axis 118 relative to bracket 104 and selective adjustment of an angular orientation of brush-arm assembly 152 relative to bracket 104 and relative to surface 154. Selective adjustability of the angular orientation of brush-arm assembly 152 relative to bracket 104 enables brush-arm assembly 152 to be positioned in any one of numerous angular orientations about first axis 118 relative to bracket 104 and surface 154. Rotational movement of brush-arm assembly 152 relative to surface 154 facilitates dispensing of brushable substance 102 onto various areas of surface 154 without having to change the position of apparatus 100, for example, via robot 116.

Referring generally to FIGS. 1A, 1B, and 1C and particularly to, e.g., FIGS. 4, 5, and 29, first drive assembly 192 comprises first motor 136 and first power-transmitting component 184, operatively coupled with first motor 136 and sleeve 110. Sleeve 110 further comprises splines 180, projecting outwardly from outer tubular sleeve wall 112. First power-transmitting component 184 comprises teeth 172, configured to mate with splines 180 of sleeve 110. The preceding subject matter of this paragraph characterizes example 6 of the present disclosure, wherein example 6 also includes the subject matter according to example 5, above.

First motor 136 being operatively coupled with first power-transmitting component 184 and sleeve 110 being operatively coupleable with first power-transmitting component 184 enables first motor 136 to controllably selectively rotate sleeve 110. Teeth 172 of first power-transmitting component 184 and splines 180 of sleeve 110 enable an interference fit between first power-transmitting component 184 and sleeve 110. Mating engagement of teeth 172 of first power-transmitting component 184 with splines 180 of sleeve 110 enables co-rotation of first power-transmitting component 184 and sleeve 110. Controlled selective rotation of first power-transmitting component 184 by first motor 136 enables rotational tracking of sleeve 110 relative to bracket 104.

In some examples, first motor 136 includes an output shaft that is rotatable by first motor 136 to produce a rotary force or torque when first motor 136 is operated. In some examples, first motor 136 is any one of various rotational motors, such as an electric motor, a hydraulic motor, a pneumatic motor, an electromagnetic motor, and the like. In some examples, first motor 136 is coupled to interface bracket 224.

First power-transmitting component 184 facilitates the transmission of power and provides an efficient and reliable mechanism to transmit power from first motor 136 to sleeve 110, such as when first axis 118 is not co-axial with a rotational axis of first motor 136. In an example, first power-transmitting component 184 is a belt operatively coupled with the output shaft of first motor 136. In other examples, first power-transmitting component 184 is any one of a chain, a gear, a gear train, and the like. Advantageously, the belt is lighter and cleaner than other implementations of first power-transmitting component 184, for example, the belt does not require lubrication for effective operation.

In some examples, first drive assembly 192 also includes one or more other transmission components configured to operatively couple first motor 136 with first power-transmitting component 184 including, but not limited to, gears, belts, sprockets, and the like.

In some examples, splines 180 project radially outwardly from the exterior of outer tubular sleeve wall 112 and are located circumferentially around outer tubular sleeve wall 112. In some examples, with sleeve 110 coupled to bracket 104, splines 180 are oriented parallel with first axis 118. In some examples, splines 180 extend from proximate to sleeve first end 120 of sleeve 110 to proximate to sleeve second end 122 of sleeve 110. In some examples, splines 180 extend between annular bearings 404, coupled to outer tubular sleeve wall 112. In some examples, splines 180 are located on only a circumferential portion of outer tubular sleeve wall 112 that is engaged by first power-transmitting component 184. Throughout the present disclosure, the term parallel refers to an orientation between items extending in approximately the same direction.

Referring generally to FIGS. 1A, 1B, and 1C and particularly to, e.g., FIGS. 30-32, bracket 104 comprises tensioner 194, configured to tension first power-transmitting component 184 with respect to first motor 136 and sleeve 110. The preceding subject matter of this paragraph characterizes example 7 of the present disclosure, wherein example 7 also includes the subject matter according to example 6, above.

Tensioner 194 facilitates application of adjustable tension to first power-transmitting component 184. With tensioner 194 engaged with and applying tension to first power-transmitting component 184, first power-transmitting component 184 maintains contact with a portion of outer tubular sleeve wall 112 so that teeth 172 of first power-transmitting component 184 remain are mated with splines 180 of sleeve 110.

Referring generally to FIGS. 1A, 1B, and 1C and particularly to, e.g., FIG. 31, tensioner 194 comprises tensioner base 196, coupled to bracket 104, and tensioner pulley 198, coupled to tensioner base 196 and rotatable relative to tensioner base 196 about second axis 200, parallel to first axis 118. Tensioner pulley 198 is configured to engage first power-transmitting component 184. The preceding subject matter of this paragraph characterizes example 8 of the present disclosure, wherein example 8 also includes the subject matter according to example 7, above.

Tensioner base 196 sets a position of tensioner pulley 198 relative to bracket 104 and in tension with first power-transmitting component 184. Rotation of tensioner pulley 198 about second axis 200 enables free rotational movement of first power-transmitting component 184.

Referring generally to FIGS. 1A, 1B, and 1C and particularly to, e.g., FIGS. 30-32, tensioner base 196 is linearly moveable relative to bracket 104. The preceding subject matter of this paragraph characterizes example 9 of the present disclosure, wherein example 9 also includes the subject matter according to example 8, above.

Linear movement of tensioner base 196 enables adjustment of a position of tensioner base 196 relative to bracket 104 and adjustment of a tension applied to first power-transmitting component 184 by tensioner pulley 198.

In some examples, tensioner base 196 is configured to move linearly away from bracket 104 and toward bracket 104. In some examples, bracket 104 includes bracket wall 440. Tensioner base 196 is coupled to an interior of bracket wall 440 and is linearly movable relative to bracket wall 440. In some examples, bracket wall 440 defines bracket opening 438. Bracket opening 438 provides access to sleeve 110 for first power-transmitting component 184, which passes through bracket opening 438. In some examples, tensioner 194 is located within bracket opening 438.

Referring generally to FIGS. 1A, 1B, and 1C and particularly to, e.g., FIGS. 30-32, tensioner base 196 is not rotatable relative to bracket 104. The preceding subject matter of this paragraph characterizes example 10 of the present disclosure, wherein example 10 also includes the subject matter according to example 9, above.

Fixing a rotational orientation of tensioner base 196 relative to bracket 104 fixes second axis 200 of tensioner pulley 198 parallel to first axis 118 and enables tensioner pulley 198 to maintain positive contact with first power-transmitting component 184.

Referring generally to FIGS. 1A, 1B, and 1C and particularly to, e.g., FIG. 32, tensioner 194 further comprises tensioner-biasing element 204, configured to bias tensioner pulley 198 against first power-transmitting component 184. The preceding subject matter of this paragraph characterizes example 11 of the present disclosure, wherein example 11 also includes the subject matter according to example 10, above.

Tensioner-biasing element 204 enables tensioner pulley 198 to remain engaged with first power-transmitting component 184. Engagement of tensioner pulley 198 with first power-transmitting component 184 facilitates constant application of tension on first power-transmitting component 184 during rotation of first power-transmitting component 184.

Referring generally to FIGS. 1A, 1B, and 1C and particularly to, e.g., FIG. 32, bracket 104 further comprises clearance hole 210 and counterbore 212, coaxial with clearance hole 210. Tensioner 194 further comprises fastener 208, passing through clearance hole 210 and through counterbore 212. Fastener 208 is threaded into tensioner base 196. The preceding subject matter of this paragraph characterizes example 12 of the present disclosure, wherein example 12 also includes the subject matter according to example 11, above.

Fastener 208 couples tensioner 194 to bracket 104. Fastener 208 also enables linear movement of tensioner base 196 relative to bracket 104. In some examples, fastener 208 is configured to control a position of tensioner base 196 relative to bracket 104. Linear movement of tensioner base 196 relative to bracket 104 facilitates adjustment of the position of tensioner pulley 198 relative to first power-transmitting component 184, for example, to reduce or increase the tension applied to first power-transmitting component 184 by tensioner pulley 198.

Referring generally to FIGS. 1A, 1B, and 1C and particularly to, e.g., FIG. 32, tensioner 194 further comprises slide pin 214, fixed relative to one of bracket 104 or tensioner base 196 and movable relative to other one of bracket 104 or tensioner base 196. The preceding subject matter of this paragraph characterizes example 13 of the present disclosure, wherein example 13 also includes the subject matter according to example 12, above.

Slide pin 214 enables linear movement of tensioner base 196 relative to bracket 104 and prohibits rotational movement of tensioner base 196 about fastener 208 relative to bracket 104. Linear movement of tensioner base 196 facilitates adjustment of the position of tensioner pulley 198 relative to first power-transmitting component 184. Non-rotation of tensioner pulley 198 maintains an orientation of first power-transmitting component 184 during co-rotation of first power-transmitting component 184 and sleeve 110.

Referring generally to FIGS. 1A, 1B, and 1C and particularly to, e.g., FIG. 32, tensioner-biasing element 204 comprises compression spring 216, positioned between bracket 104 and tensioner base 196. Compression spring 216 is located in counterbore 212. The preceding subject matter of this paragraph characterizes example 14 of the present disclosure, wherein example 14 also includes the subject matter according to example 12 or 13, above.

Compression spring 216 enables tensioner base 196 to be pushed, or biased, away from bracket 104 to position tensioner pulley 198 in tension with first power-transmitting component 184. In some examples, compression spring 216 is a helical, or coil, compression spring, located around fastener 208 with one end engaged with tensioner base 196 and the other end engaged with an interior surface of counterbore 212.

Referring generally to FIGS. 1A, 1B, and 1C and particularly to, e.g., FIGS. 2 and 3, bracket 104 is linearly moveable along first axis 118 relative to robot 116. The preceding subject matter of this paragraph characterizes example 15 of the present disclosure, wherein example 15 also includes the subject matter according to any one of examples 5 to 14, above.

Linear movement of bracket 104 relative to robot 116 enables linear movement of brush-arm assembly 152 relative to robot 116 and to surface 154. Linear movement of brush-arm assembly 152 relative to surface 154 facilitates deposition of brushable substance 102 on surface 154 having an irregular shape or on multiple other surfaces of the workpiece, for example, without having to change the position of apparatus 100 via robot 116.

Referring generally to FIGS. 1A, 1B, and 1C and particularly to, e.g., FIGS. 2-5, apparatus 100 further comprises robot interface 222, configured to be coupled to robot 116, and interface bracket 224, configured to be coupled to robot interface 222 and linearly moveable relative to robot interface 222. Bracket 104 is coupled to interface bracket 224. The preceding subject matter of this paragraph characterizes example 16 of the present disclosure, wherein example 16 also includes the subject matter according to example 15, above.

Robot interface 222 enables quick coupling of apparatus 100 with robot 116 and quick releasing of apparatus 100 from robot 116. Interface bracket 224 enables movable coupling of bracket 104 to robot interface 222. Linear movement of interface bracket 224 relative to robot interface 222 enables linear movement of bracket 104 relative to robot 116.

In some examples, robot interface 222 also facilitates quick coupling of communication lines between apparatus 100 and robot 116. In some examples, robot interface 222 enables automated coupling of apparatus 100 with robot 116 and automated releasing of apparatus 100 from robot 116. In some examples, robot interface 222 is a tool-side portion of a pneumatic quick-change mechanism and robot 116 includes a tool interface of the pneumatic quick-change mechanism.

In some examples, interface bracket 224 includes a pair of bracket arms 406. Bracket arms 406 facilitate engagement of interface bracket 224 with robot interface 222 and guide linear motion of interface bracket 224 relative to robot interface 222. In some examples, each one of bracket arms 406 includes guide channel 408 and robot interface 222 includes a pair of guide rails 410. Guide channel 408 of bracket arms 406 is configured to receive and move along an associated one of guide rails 410.

Referring generally to FIGS. 1A, 1B, and 1C and particularly to, e.g., FIGS. 4, 5, and 29, apparatus 100 further comprises proximity sensor 190, coupled to interface bracket 224 and configured to detect when sleeve 110 is in predetermined rotational orientation relative to bracket 104. Apparatus 100 also comprises homing element 186, coupled to sleeve 110 and configured to actuate proximity sensor 190 when sleeve 110 is rotated about first axis 118 to predetermined rotational orientation. The preceding subject matter of this paragraph characterizes example 17 of the present disclosure, wherein example 17 also includes the subject matter according to example 16, above.

Homing element 186 enables actuation of proximity sensor 190 when sleeve 110 is rotated to the predetermined rotational orientation relative to bracket 104 to indicate that sleeve 110 is in a home position. Use of homing element 186 and proximity sensor 190 to indicate the home position also enables use of an incremental position encoder, which is capable of determining the rotational orientation of sleeve 110 relative to bracket 104 following a power interruption, rather than an absolute position encoder, which would be unable to determine the rotational orientation of sleeve 110 relative to bracket 104 in case of a power interruption.

Referring generally to FIGS. 1A, 1B, and 1C, homing element 186 comprises magnet 188 on outer tubular sleeve wall 112. Proximity sensor 190 comprises magnetic sensor 220. The preceding subject matter of this paragraph characterizes example 18 of the present disclosure, wherein example 18 also includes the subject matter according to example 17, above.

Magnet 188 enables non-contact actuation of magnetic sensor 220 when sleeve 110 is rotated to the predetermined rotational orientation relative to bracket 104 to indicate that sleeve 110 is in the home position.

Referring generally to FIGS. 1A, 1B, and 1C and particularly to, e.g., FIGS. 2 and 3, interface bracket 224 is selectively linearly movable along first axis 118 relative to robot interface 222. The preceding subject matter of this paragraph characterizes example 19 of the present disclosure, wherein example 19 also includes the subject matter according to any one of examples 16 to 18, above.

Selective linear movement of interface bracket 224 along first axis 118 relative to robot interface 222 enables controlled, selective adjustment of the linear position of bracket 104 relative to robot 116 and controlled, selective adjustment of the linear position of brush-arm assembly 152 relative to surface 154. Controlled, selective linear movement of brush-arm assembly 152 relative to surface 154 facilitates dispensing of brushable substance 102 on surface 154 having an irregular shape or on multiple other surfaces of the workpiece.

Referring generally to FIGS. 1A, 1B, and 1C and particularly to, e.g., FIGS. 4 and 5, apparatus 100 further comprises second drive assembly 228, configured to selectively controllably translate interface bracket 224 along first axis 118 relative to robot interface 222. The preceding subject matter of this paragraph characterizes example 20 of the present disclosure, wherein example 20 also includes the subject matter according to example 19, above.

Second drive assembly 228 facilitates automated, precise linear translation of interface bracket 224 along first axis 118 relative to robot interface 222. Controlled selective linear movement of interface bracket 224 relative to robot interface 222 facilitates controlled selective adjustment of a linear position of bracket 104 along first axis 118 relative to robot interface 222 and controlled selective adjustment of a linear position of brush-arm assembly 152 relative to surface 154.

Referring generally to FIGS. 1A, 1B, and 1C and particularly to, e.g., FIGS. 4 and 5, second drive assembly 228 comprises second motor 206 and second power-transmitting component 226, operatively coupled with second motor 206 and interface bracket 224. The preceding subject matter of this paragraph characterizes example 21 of the present disclosure, wherein example 21 also includes the subject matter according to example 20, above.

Second motor 206 being operatively coupled with second power-transmitting component 226 and interface bracket 224 being operatively coupled with second power-transmitting component 226 enables second motor 206 to controllably translate interface bracket 224 relative to robot interface. Second power-transmitting component 226 enables selective linear movement of interface bracket 224 along an axis parallel to first axis 118 relative to robot interface 222. With second power-transmitting component 226 operatively coupled with interface bracket 224, operation of second power-transmitting component 226 enables selective linear movement of interface bracket 224 relative to robot interface 222. Additionally, controlled selective translation of interface bracket 224 relative to robot interface 222 enables automated linear tracking of interface bracket 224 relative to robot interface 222.

In some examples, second motor 206 includes an output shaft that is rotatable by second motor 206 to produce a rotary force or torque when second motor 206 is operated. In some examples, second motor 206 is any one of various rotational motors, such as an electric motor, a hydraulic motor, a pneumatic motor, an electromagnetic motor, and the like. In some examples, second motor 206 is coupled to robot interface 222.

Second power-transmitting component 226 facilitates the transmission of power and provides an efficient and reliable mechanism to transmit power from second motor 206 to interface bracket 224. In some examples, second power-transmitting component 226 is any one of a translation screw drive, a chain, a belt, a gear, a gear train, and the like.

In some examples, second drive assembly 228 also includes one or more other transmission components configured to operatively couple second motor 206 with second power-transmitting component 226 including, but not limited to, gears, belts, sprockets, and the like.

Referring generally to FIGS. 1A, 1B, and 1C and particularly to, e.g., FIGS. 4 and 5, second power-transmitting component 226 of second drive assembly 228 comprises ball screw 230, rotationally coupled with robot interface 222, and ball nut 232, coupled to interface bracket 224 and operatively coupled with ball screw 230. The preceding subject matter of this paragraph characterizes example 22 of the present disclosure, wherein example 22 also includes the subject matter according to example 21, above.

Ball screw 230 and ball nut 232 enable translation of rotational motion of second motor 206, via second power-transmitting component 226, to linear motion of interface bracket 224 relative to robot interface 222. Advantageously, selection of ball screw 230 and ball nut 232 enables apparatus 100 to withstand high thrust loads and enables precise control of linear movement of interface bracket 224 relative to robot interface 222.

Referring generally to FIGS. 1A, 1B, and 1C and particularly to, e.g., FIGS. 11 and 12, cartridge 124 further comprises cartridge first end 130, comprising annular cartridge end-opening 170 that separates inner tubular cartridge wall 126 and outer tubular cartridge wall 128. Cartridge 124 is configured to receive brushable substance 102 through annular cartridge end-opening 170. The preceding subject matter of this paragraph characterizes example 23 of the present disclosure, wherein example 23 also includes the subject matter according to any one of examples 1 to 22, above.

Annular cartridge end-opening 170 enables access for deposition of brushable substance 102 into cartridge 124. Moreover, when push-lock pressure cap 150 is coupled to sleeve 110, at least portion of push-lock pressure cap 150 is positioned within annular cartridge end-opening 170 to form hermetic seal between push-lock pressure cap 150 and cartridge 124.

Referring generally to FIGS. 1A, 1B, and 1C and particularly to, e.g., FIGS. 11, 12, and 28, cartridge 124 further comprises cartridge second end 132, opposite cartridge first end 130, and annular cartridge end-wall 174, interconnecting inner tubular sleeve wall 114 and outer tubular sleeve wall 112 at cartridge second end 132. Cartridge 124 also comprises cartridge outlet port 134, passing through annular cartridge end-wall 174 and configured to be communicatively coupled with valve 140. The preceding subject matter of this paragraph characterizes example 24 of the present disclosure, wherein example 24 also includes the subject matter according to example 23, above.

Cartridge outlet port 134 of cartridge 124 enables transfer of brushable substance 102 from cartridge 124 to valve 140.

In some examples, cartridge 124 includes more than one cartridge outlet port 134. Each cartridge outlet port 134 is configured to be communicatively coupled with valve 140. In some examples, cartridge outlet port 134 includes a gasket configured to form a seal between cartridge outlet port 134 and valve 140.

In some examples, sleeve 110 also includes at least one pass-through port 412 passing through annular sleeve end-wall 168. Pass-through port 412 of sleeve 110 is configured to enable cartridge outlet port 134 to be communicatively coupled with valve 140 such that brushable substance 102 can flow from cartridge 124 into valve 140.

In some examples, cartridge-ejection system 164 enables application of pneumatic pressure between annular sleeve end-wall 168 and annular cartridge end-wall 174 to at least partially eject cartridge 124 from sleeve 110.

Referring generally to FIGS. 1A, 1B, and 1C and particularly to, e.g., FIGS. 10 and 11, apparatus 100 further comprises cartridge-alignment feature 160, configured to orient cartridge 124 relative to sleeve 110 and valve 140 about first axis 118. The preceding subject matter of this paragraph characterizes example 25 of the present disclosure, wherein example 25 also includes the subject matter according to any one of examples 1 to 24, above.

Cartridge-alignment feature 160 enables proper alignment of cartridge 124 relative to valve 140 such that cartridge 124 is in communication with valve 140 upon cartridge 124 being received by sleeve 110. Setting the rotational orientation of cartridge 124 relative to sleeve 110 and, thus, relative to valve 140 facilitates cartridge 124 being in fluid communication with valve 140. Cartridge-alignment feature 160 ensures that cartridge 124 is in a proper rotational orientation relative to valve 140 in order to align and communicatively couple cartridge outlet port 134 with valve 140.

In some examples, cartridge-alignment feature 160 includes alignment protrusion 416 and alignment groove 418. Alignment and engagement of alignment protrusion 416 with alignment groove 418 facilitates proper rotational orientation of cartridge 124 relative to valve 140 with cartridge 124 in fluid communication with valve 140. In some examples, alignment protrusion 416 is located on and projects outwardly from an interior surface of inner tubular cartridge wall 126 and alignment groove 418 is located on and depends inwardly from an exterior surface of inner tubular sleeve wall 114. In some examples, alignment protrusion 416 and alignment groove 418 are located on outer tubular cartridge wall 128 and outer tubular sleeve wall 112, respectively. In some examples, the location of alignment protrusion 416 and alignment groove 418 on respective ones of inner tubular cartridge wall 126, outer tubular cartridge wall 128, inner tubular sleeve wall 114, and/or outer tubular sleeve wall 112 varies. In some examples, the configuration of alignment protrusion 416 and alignment groove 418 relative to the interior surface and/or exterior surface of inner tubular cartridge wall 126, outer tubular cartridge wall 128, inner tubular sleeve wall 114, and/or outer tubular sleeve wall 112 vary.

Referring generally to FIGS. 1A, 1B, and 1C and particularly to, e.g., FIGS. 13-15, push-lock pressure cap 150 comprises spring-loaded latches 256, moveable relative to sleeve 110 between locked position, in which spring-loaded latches 256 are engaged with sleeve 110, and unlocked position, in which spring-loaded latches 256 are disengaged from sleeve 110. The preceding subject matter of this paragraph characterizes example 26 of the present disclosure, wherein example 26 also includes the subject matter according to any one of examples 1 to 25, above.

Spring-loaded latches 256 enable push-lock pressure cap 150 to be releasably locked to sleeve 110 and sealed with cartridge 124. With spring-loaded latches 256 engaged with sleeve 110, push-lock pressure cap 150 is releasably locked to sleeve 110. With spring-loaded latches 256 disengaged from sleeve 110, push-lock pressure cap 150 is unlocked from sleeve 110. Using spring-loaded latches 256 to releasably lock push-lock pressure cap 150 in the closed position prevents disengagement between push-lock pressure cap 150 and sleeve 110 and between push-lock pressure cap 150 and cartridge 124 upon communication of pressure to cartridge 124 to move annular plunger 148 along first axis 118 toward valve 140.

Referring generally to FIGS. 1A, 1B, and 1C and particularly to, e.g., FIGS. 13-15, individual members of one pair of spring-loaded latches 256, adjacent to each other, and individual members of any other pair of spring-loaded latches 256, adjacent to each other, have equal angular separations, as observed from first axis 118. The preceding subject matter of this paragraph characterizes example 27 of the present disclosure, wherein example 27 also includes the subject matter according to example 26, above.

Equal angular separations, as observed from first axis 118, of spring-loaded latches 256 of one pair of spring-loaded latches 256 and spring-loaded latches 256 of any other pair of spring-loaded latches 256 enables equal distribution of force on push-lock pressure cap 150 when pneumatic pressure is applied within cartridge 124 between push-lock pressure cap 150 and annular plunger 148.

In some examples, each one of spring-loaded latches 256 is disposed at equally angular spaced apart location about push-lock pressure cap 150 relative to adjacent one of spring-loaded latches 256. In some examples, push-lock pressure cap 150 includes two spring-loaded latches 256 that are equally spaced apart, three spring-loaded latches 256 that are equally spaced apart, etc.

Referring generally to FIGS. 1A, 1B, and 1C and particularly to, e.g., FIG. 13, spring-loaded latches 256 are intrinsically biased in locked position. The preceding subject matter of this paragraph characterizes example 28 of the present disclosure, wherein example 28 also includes the subject matter according to example 26 or 27, above.

Spring-loaded latches 256 being intrinsically biased into the locked position enables spring-loaded latches 256 to lock push-lock pressure cap 150 to sleeve 110 until spring-loaded latches 256 are moved into the unlocked position. In other words, biasing spring-loaded latches 256 requires active engagement of spring-loaded latches 256 to unlock push-lock pressure cap 150 from sleeve 110.

Referring generally to FIGS. 1A, 1B, and 1C and particularly to, e.g., FIGS. 13-15, push-lock pressure cap 150 further comprises annular cap 250, configured to be at least partially received within sleeve 110 between inner tubular sleeve wall 114 and outer tubular sleeve wall 112. Push-lock pressure cap 150 also comprises annular cartridge interface 252, coupled to annular cap 250 and configured to be at least partially received within cartridge 124 between inner tubular cartridge wall 126 and outer tubular cartridge wall 128. The preceding subject matter of this paragraph characterizes example 29 of the present disclosure, wherein example 29 also includes the subject matter according to example 28, above.

Annular cap 250 provides a coupling interface between push-lock pressure cap 150 and sleeve 110. Annular cartridge interface 252 provides a sealing interface between push-lock pressure cap 150 and cartridge 124 to hermetically couple push-lock pressure cap 150 and cartridge 124.

In some examples, push-lock pressure cap 150 also includes inner cap gasket 420 and outer cap gasket 422. Inner cap gasket 420 is configured to form a seal between push-lock pressure cap 150 and inner tubular cartridge wall 126 when push-lock pressure cap 150 is coupled to sleeve 110. Outer cap gasket 422 is configured to form a seal between push-lock pressure cap 150 and outer tubular cartridge wall 128 when push-lock pressure cap 150 is coupled to sleeve 110. In some examples, inner cap gasket 420 is coupled to annular cartridge interface 252 to form a seal between annular cartridge interface 252 and inner tubular cartridge wall 126 when push-lock pressure cap 150 is coupled to sleeve 110. In some examples, outer cap gasket 422 is coupled to annular cartridge interface 252 to form a seal between annular cartridge interface 252 and outer tubular cartridge wall 128 when push-lock pressure cap 150 is coupled to sleeve 110. By forming a seal between push-lock pressure cap 150 and cartridge 124, inner cap gasket 420 and outer cap gasket 422 facilitate the containment of pressure within cartridge 124 to move annular plunger 148. In some examples, each one of inner cap gasket 420 and outer cap gasket 422 is an O-ring, made of a pliable or compressible material, such as rubber silicone, and plastic polymers.

Referring generally to FIGS. 1A, 1B, and 1C and particularly to, e.g., FIGS. 13-15, push-lock pressure cap 150 further comprises cam 258, rotatable about first axis 118 relative to annular cap 250. Rotation of cam 258 transitions spring-loaded latches 256 between locked position and unlocked position. The preceding subject matter of this paragraph characterizes example 30 of the present disclosure, wherein example 30 also includes the subject matter according to example 29, above.

Cam 258, being rotatable about first axis 118, enables transition (e.g., movement) of spring-loaded latches 256 between the locked position, to couple push-lock pressure cap 150 to sleeve 110, and the unlocked position, to uncouple push-lock pressure cap 150 from sleeve 110. Cam 258 enables spring-loaded latches 256 to remain biased in the locked position until selective operation of cam 258. With spring-loaded latches 256 in the locked position relative to sleeve 110, spring-loaded latches 256 interlock push-lock pressure cap 150 and sleeve 110. Selective operation of cam 258, via rotation of cam 258 about first axis 118 relative to annular cap 250, moves spring-loaded latches 256 into the unlocked position relative to sleeve 110 to unlock push-lock pressure cap 150 and sleeve 110.

In some examples, when rotated in a first rotational direction (e.g., counterclockwise) about first axis 118, cam 258 is configured to simultaneously disengage spring-loaded latches 256 such that each one of spring-loaded latches 256 concurrently transitions from the unlocked position to the locked position. In some examples, when rotated in a second rotational direction (e.g., clockwise) about first axis 118, cam 258 is configured to simultaneously engage spring-loaded latches 256 such that each one of spring-loaded latches 256 concurrently transitions from the locked position to the unlocked position. Simultaneous transition between the locked and unlocked position of spring-loaded latches 256 ensures that all of spring-loaded latches 256 are in their proper respective positions when locking and unlocking push-lock pressure cap 150 to sleeve 110.

Referring generally to FIGS. 1A, 1B, and 1C and particularly to, e.g., FIGS. 13-15, each of spring-loaded latches 256 comprises linear guide 234, coupled to annular cap 250, and keeper 236, reciprocally movable along linear guide 234. Each of spring-loaded latches 256 further comprises latch spring 238, coupled to keeper 236. With cam 258 in first rotational orientation, latch spring 238 pushes keeper 236 into locking aperture 240, formed in sleeve 110. With cam 258 in second rotational orientation, cam 258 pushes keeper 236 out of locking aperture 240, formed in sleeve 110. The preceding subject matter of this paragraph characterizes example 31 of the present disclosure, wherein example 31 also includes the subject matter according to example 30, above.

Spring-loaded latches 256 and cam 258 enable quick, easy, and effective locking and unlocking of push-lock pressure cap 150 to sleeve 110. With cam 258 rotated into a first rotational orientation, cam 258 enables linear movement of keeper 236 along linear guide 234 into a push-locked position, in which keeper 236 is inserted within locking aperture 240 to lock push-lock pressure cap 150 to sleeve 110. With cam 258 rotated into a second rotational orientation, cam 258 enables linear movement of keeper 236 into a push-unlocked position, in which keeper 236 is withdrawn from locking aperture 240 to unlock push-lock pressure cap 150 from sleeve 110.

In some examples, each of spring-loaded latches 256 is a passive lock mechanism that is simply constructed, yet effective at preventing inadvertent unlocking of push-lock pressure cap 150 from sleeve 110. In some examples, linear guide 234 includes one or more slide pins coupled to annular cap 250 of push-lock pressure cap 150. In some examples, keeper 236 is movably coupled to linear guide 234 and is configured to linearly move along linear guide 234. In some examples, latch spring 238 is a helical, or coil, compression spring coupled to keeper 236. In some examples, latch spring 238 is configured to bias keeper 236 in the push-locked position with keeper 236, located within locking aperture 240 of sleeve 110, to lock push-lock pressure cap 150 to sleeve 110. Latch spring 238 facilitates a passive and simple way to bias spring-loaded latches 256 into the locked position to lock push-lock pressure cap 150 to sleeve 110.

In some examples, keeper 236 includes bar 464 that is configured to be inserted within and withdrawn from locking aperture 240 of sleeve 110 upon movement of keeper 236 between the push-locked and push-unlocked positions. In some examples, locking aperture 240 of sleeve 110 is located proximate to sleeve first end 120 within a portion of sleeve 110 configured to receive at least a portion of annular cap 250 of push-lock pressure cap 150. In some examples, locking aperture 240 of sleeve 110 is formed through outer tubular sleeve wall 112 of sleeve 110. In some examples, with keeper 236 in the push-locked position, bar 464 projects radially outward from push-lock pressure cap 150 and into locking aperture 240 of sleeve 110. In some examples (not illustrated), locking aperture 240 of sleeve 110 is formed through inner tubular sleeve wall 114 of sleeve 110. In some examples, with keeper 236 in the push-locked position, bar 464 projects radially inward from push-lock pressure cap 150 and into locking aperture 240 of sleeve 110. In some examples, bar 464 and locking aperture 240 have complementary shapes or profiles such that bar 464 fits snuggly within locking aperture 240.

In some examples, cam 258 includes an annular or semi-annular cam body and cam surfaces 466 projecting from the cam body. In some examples, each one of cam surfaces 466 is configured to engage an associated one of spring-loaded latches 256 when cam 258 is rotated into the second rotational orientation. In some examples, keeper 236 also includes follower surface 468. In some examples, rotation of cam 258 moves each one of cam surfaces 466 into one of engagement with or disengagement from follower surface 468 of keeper 236 of each associated one of spring-loaded latches 256. As cam 258 is rotated into the second rotational orientation, cam surfaces 466 move along follower surface 468 of keeper 236 of each associated one of spring-loaded latches 256 to overcome the biasing force applied by latch spring 238 and push keeper 236 away from sleeve 110 to remove bar 464 from within locking aperture 240. As cam 258 is rotated back into the first rotational orientation, cam surfaces 466 move away from follower surface 468 of keeper 236 of each associated one of spring-loaded latches 256 to enable latch spring 238 to push keeper 236 toward sleeve 110 to insert bar 464 within locking aperture 240.

Referring generally to FIGS. 1A, 1B, and 1C and particularly to, e.g., FIGS. 13-15, push-lock pressure cap 150 further comprises cam lock 178, configured to releasably lock cam 258 in at least first rotational orientation. The preceding subject matter of this paragraph characterizes example 32 of the present disclosure, wherein example 32 also includes the subject matter according to example 31, above.

Cam lock 178 enables quick, easy, and effective locking and unlocking of cam 258 relative to annular cap 250. Releasably locking cam 258 with cam lock 178 prevents inadvertent rotation of cam 258 relative to annular cap 250.

In some examples, cam lock 178 is a spring-biased locking mechanism. In some examples, cam lock 178 includes plunger 424 that is moveably coupled to annular cap 250. In some examples, an end of plunger 424 is configured to be inserted within and withdrawn from locking aperture 426 formed in a body of cam 258. In some examples, cam lock 178 also includes lock spring 428 coupled to plunger 424 and configured to bias plunger 424 into engagement within locking aperture 426 of cam 258. With the end of plunger 424 of cam lock 178 inserted within locking aperture 426 of cam 258, cam lock 178 restricts rotational movement of cam 258. In some examples, cam lock 178 also includes a grip element, located at the opposing end of plunger 424, for example, on an exterior of annular cap 250, to enable an operator to manually withdraw plunger 424 from locking aperture 426 of cam 258. Once plunger 424 of cam lock 178 is removed from locking aperture 426 of cam 258, cam 258 is capable of being rotated. In some examples, cam 258 includes one locking aperture 426 appropriately located to engage cam lock 178 when cam 258 in the first rotational orientation to prevent inadvertent rotation of cam 258 into the second rotation orientation and movement of spring-loaded latches 256 into the unlocked position. In some examples, cam 258 also includes another locking aperture 426 appropriately located to engage cam lock 178 when cam 258 in the second rotational orientation to prevent inadvertent rotation of cam 258 into the first rotation orientation and movement of spring-loaded latches 256 into the locked position.

Referring generally to FIGS. 1A, 1B, and 1C and particularly to, e.g., FIGS. 13-15, spring-loaded latches 256 and cam 258 are sandwiched between annular cap 250 and annular cartridge interface 252. The preceding subject matter of this paragraph characterizes example 33 of the present disclosure, wherein example 33 also includes the subject matter according to example 31 or 32, above.

Annular cap 250 and annular cartridge interface 252 sandwich spring-loaded latches 256 and cam 258 such that cam 258 is rotatable about first axis 118 relative to annular cap 250 and spring-loaded latches 256 are moveable relative to sleeve 110 between the locked position and the unlocked position.

In some examples, annular cap 250 includes cap openings 430. In some examples, each one of cap openings 430 is configured to at least partially receive keeper 236 of an associated one of spring-loaded latches 256. In some examples, linear guide 234 of each one of spring-loaded latches 256 is coupled to annular cap 250 within an associated one of cap openings 430. In some examples, latch spring 238 of each one of spring-loaded latches 256 is located within the associated one of cap openings 430 such that movement of keeper 236 into the push-unlocked position within the associated one of cap openings 430 compresses latch spring 238 against annular cap 250. In some examples, latch spring 238 is located around linear guide 234 and is coupled at one end to keeper 236 and is coupled at the other end to annular cap 250. In some examples, annular cartridge interface 252 includes cap recesses 432. In some examples, each one of cap recesses 432 is configured to at least partially receive keeper 236 of an associated one of spring-loaded latches 256. In some examples, cap openings 430 and cap recesses 432, in combination, retain keeper 236 of the associated one of spring-loaded latches 256 and enable reciprocal movement of spring-loaded latches 256 relative to annular cap 250 and annular cartridge interface 252.

In some examples, cam 258 is movably coupled with annular cap 250. In some examples, fasteners 434 couple cam 258 to annular cap 250 in such a way that cam 258 is capable of rotational movement relative to annular cap 250. In some examples, annular cap 250 includes guide slots 436.

In some examples, fasteners 434 are located within and move along guide slots 436 as cam 258 rotates relative to annular cap 250. In some examples, each one of fasteners 434 also includes a grip element that enables an operator to manually rotate cam 258 by moving fasteners 434 along guide slots 436.

Referring generally to FIGS. 1A, 1B, and 1C and particularly to, e.g., FIGS. 13-15, push-lock pressure cap 150 further comprises cap pressure input 246, configured to communicate pneumatic pressure within cartridge 124 to push annular plunger 148 along first axis 118 toward valve 140. The preceding subject matter of this paragraph characterizes example 34 of the present disclosure, wherein example 34 also includes the subject matter according to any one of examples 30 to 33, above.

Cap pressure input 246 enables communication of pneumatic pressure through annular cap 250 and annular cartridge interface 252 for application of a driving force to move annular plunger 148 along first axis 118 within cartridge 124, which in turn urges brushable substance 102 from cartridge 124 into valve 140.

In some examples, apparatus 100 also includes a pressure tube (not illustrated) to facilitate communication of pressure to push-lock pressure cap 150. In some examples, the pressure tube communicates pressure to cap pressure input 246 to facilitate pressurization of cartridge 124 and to control operation of annular plunger 148, such as linearly moving annular plunger 148 along first axis 118 toward valve 140. In some examples, cap pressure input 246 is a pneumatic fitting.

Selective pneumatic operation of cap pressure input 246 of push-lock pressure cap 150 enables precise application of pneumatic pressure to brushable substance 102 in cartridge 124 to precisely control the flow of brushable substance 102 out of cartridge 124 and into valve 140. Additionally, selective pneumatic operation of cap pressure input 246 facilitates the use of automated pneumatic controls to control the pneumatic operation of cap pressure input 246.

Referring generally to FIGS. 1A, 1B, and 1C and particularly to, e.g., FIGS. 16 and 17, annular plunger 148 comprises annular plunger body 282. Annular plunger 148 further comprises annular inner seal 284, coupled to annular plunger body 282 and located between annular plunger body 282 and inner tubular cartridge wall 126. Annular plunger 148 also comprises annular outer seal 286, coupled to annular plunger body 282 and located between annular plunger body 282 and outer tubular cartridge wall 128. Annular plunger 148 additionally comprises annular seal retainer 288, coupled to annular plunger body 282. Annular inner seal 284 and annular outer seal 286 are sandwiched between annular plunger body 282 and annular seal retainer 288. The preceding subject matter of this paragraph characterizes example 35 of the present disclosure, wherein example 35 also includes the subject matter according to any one of examples 1 to 34, above.

A two-member seal of annular plunger 148 enables annular plunger 148 to react to pneumatic pressure applied within cartridge 124, between push-lock pressure cap 150 and annular plunger 148, to move annular plunger 148 along first axis 118 toward valve 140. Annular inner seal 284 forms an inner seal between annular plunger body 282 and inner tubular cartridge wall 126. Annular outer seal 286 forms an outer seal between annular plunger body 282 and outer tubular cartridge wall 128. Annular plunger body 282 facilitates containment of pressure between push-lock pressure cap 150 and annular plunger 148. Annular seal retainer 288 being coupled to annular plunger body 282 retains annular inner seal 284 and annular outer seal 286.

Referring generally to FIGS. 1A, 1B, and 1C and particularly to, e.g., FIGS. 30 and 31, bracket 104 comprises first bracket portion 106 and second bracket portion 108, removably coupled to first bracket portion 106. Sleeve 110 is capable of being separated from bracket 104 along first axis 118 when second bracket portion 108 is removed from first bracket portion 106. The preceding subject matter of this paragraph characterizes example 36 of the present disclosure, wherein example 36 also includes the subject matter according to any one of examples 1 to 35, above.

Bracket 104 that has two portions enables removal of sleeve 110, and other components of apparatus 100 coupled to sleeve 110, without completely removing bracket 104 from interface bracket 224. In some examples, upon removal of second bracket portion 108 of bracket 104 from first bracket portion 106 of bracket 104, sleeve 110 is capable of being withdrawn from within first bracket portion 106 of bracket 104 along first axis 118.

In some examples, at least one of first bracket portion 106 and second bracket portion 108 of bracket 104 is removably coupled with interface bracket 224 such that first power-transmitting component 184 is capable of entering bracket 104 through bracket opening 438. In some examples, bracket 104 includes shoulders 442 that project inward from bracket wall 440. In some examples, bracket 104 is configured to capture and retain sleeve 110 between shoulders 442 upon second bracket portion 108 of bracket 104 being coupled to first bracket portion 106 of bracket 104 and to interface bracket 224. In some examples, a first one of shoulders 442 engages the first one of annular bearings 404 coupled to sleeve 110 and a second one of shoulders 442 engages the second one of annular bearings 404 coupled to sleeve 110.

Referring generally to FIGS. 1A, 1B, and 1C and particularly to, e.g., FIGS. 18, 19, and 25-28, apparatus 100 further comprises valve-locking assembly 218, configured to releasably couple valve 140 with sleeve 110. The preceding subject matter of this paragraph characterizes example 37 of the present disclosure, wherein example 37 also includes the subject matter according to any one of examples 1 to 36, above.

Valve-locking assembly 218 enables quick, easy, and effective locking and unlocking of valve 140 to sleeve 110. Locking valve 140 to sleeve 110 facilitates retention of valve 140 in fluid communication with cartridge 124. Unlocking valve 140 from sleeve 110 facilitates removal of valve 140, for example, for purposes of repair and/or replacement of valve 140 or other components of apparatus 100.

Referring generally to FIGS. 1A, 1B, and 1C and particularly to, e.g., FIGS. 18, 19, and 25-28, valve-locking assembly 218 comprises first bracket 244, coupled to sleeve 110, and second bracket 248, coupled to sleeve 110 and spaced away from first bracket 244. Valve 140 is configured to fit between first bracket 244 and second bracket 248 and is configured to be coupled to first bracket 244 and second bracket 248. The preceding subject matter of this paragraph characterizes example 38 of the present disclosure, wherein example 38 also includes the subject matter according to example 37, above.

First bracket 244 and second bracket 248 enable valve 140 to be releasably locked to valve-locking assembly 218 by facilitating valve 140 being securely retained between first bracket 244 and second bracket 248 with valve 140 in fluid communication with cartridge 124.

In some examples, first bracket 244 is coupled to sleeve second end 122 of sleeve 110 and projects from sleeve 110 along an axis, parallel with first axis 118. In some examples, second bracket 248 is coupled to sleeve second end 122 of sleeve 110 and projects from sleeve 110 along an axis, parallel with first axis 118. In some examples, first bracket 244 and second bracket 248 are laterally spaced apart to define an opening, configured to receive valve 140. In some examples, first bracket 244 and second bracket 248 are sufficiently, laterally spaced apart to facilitate an interference fit of valve 140 between first bracket 244 and second bracket 248. In some examples, with valve 140 positioned within the opening, formed between first bracket 244 and second bracket 248, valve-locking assembly 218 captures valve 140 between first bracket 244 and second bracket 248. Engagement of valve 140 between first bracket 244 and second bracket 248 facilitates proper orientation of valve 140 relative to cartridge 124 and positions valve 140 in fluid communication with cartridge outlet port 134.

Referring generally to FIGS. 1A, 1B, and 1C and particularly to, e.g., FIGS. 25-28, valve-locking assembly 218 further comprises first locking pins 266, configured to be removably coupled with first bracket 244 and valve 140. Valve-locking assembly 218 further comprises second locking pins 368, configured to be removably coupled with second bracket 248 and valve 140. The preceding subject matter of this paragraph characterizes example 39 of the present disclosure, wherein example 39 also includes the subject matter according to example 38, above.

First locking pins 266 and second locking pins 368 enable valve 140 to be removably coupled to first bracket 244 and second bracket 248 in fluid communication with cartridge 124. With valve 140 positioned between first bracket 244 and second bracket 248, first locking pins 266 and second locking pins 368 being removably coupled to first bracket 244 and second bracket 248, respectively, facilitates retention of valve 140 between first bracket 244 and second bracket 248.

Referring generally to FIGS. 1A, 1B, and 1C and particularly to, e.g., FIGS. 25-28, first locking pins 266 are configured to pass through first bracket 244 along axes, perpendicular to first axis 118. Second locking pins 368 are configured to pass through second bracket 248 along axes, perpendicular to first axis 118. The preceding subject matter of this paragraph characterizes example 40 of the present disclosure, wherein example 40 also includes the subject matter according to example 39, above.

First locking pins 266 and second locking pins 368 being oriented perpendicular to first axis 118 fixes a position of valve 140 along first axis 118 relative to valve-locking assembly 218. With valve 140 positioned between first bracket 244 and second bracket 248, first locking pins 266 and second locking pins 368 being removably coupled with first bracket 244 and second bracket 248, respectively, facilitates prevention of linear movement of valve 140 along first axis 118.

In some examples, first bracket 244 includes first bracket pass-through passages 446 that extend entirely through a body of first bracket 244 along an axis, perpendicular to first axis 118. First bracket pass-through passages 446 are configured to receive first locking pins 266 when first locking pins 266 are coupled to first bracket 244. Similarly, in some examples, second bracket 248 includes second bracket pass-through passages 448 that extend entirely through a body of second bracket 248 along an axis, perpendicular to first axis 118. Second bracket pass-through passages 448 are configured to receive second locking pins 368 when second locking pins 368 are coupled to second bracket 248. In some examples, valve 140 includes valve pass-through passages 444 that extend entirely through a body of valve 140 along an axis, perpendicular to first axis 118. First ends of valve pass-through passages 444 are configured to receive first locking pins 266 when first locking pins 266 are removably coupled with first bracket 244. Second ends of valve pass-through passages 444 are configured to receive second locking pins 368 when second locking pins 368 are removably coupled with second bracket 248. With valve 140 positioned between first bracket 244 and second bracket 248, first locking pins 266 extend through first bracket 244 and into valve 140 along the axis, perpendicular to first axis 118, and second locking pins 368 extend through second bracket 248 and into valve 140 along the axis, perpendicular to first axis 118. Engagement of first locking pins 266 and second locking pins 368 with first bracket 244 and second bracket 248, respectively, fixes a linear position of first locking pins 266 and second locking pins 368 along first axis 118 relative to first bracket 244 and second bracket 248, respectively. Engagement of first locking pins 266 and second locking pins 368 with valve 140 fixes a linear position of valve 140 along first axis 118 relative to first bracket 244 and second bracket 248.

Referring generally to FIGS. 1A, 1B, and 1C and particularly to, e.g., FIGS. 25-28, first locking pins 266 and second locking pins 368 are configured to releasably engage valve 140. The preceding subject matter of this paragraph characterizes example 41 of the present disclosure, wherein example 41 also includes the subject matter according to example 40, above.

First locking pins 266 and second locking pins 368 being engaged to valve 140 enables a reliable interlock between valve 140 and valve-locking assembly 218. Releasably engaging first locking pins 266 and second locking pins 368 to valve 140 facilitates prevention of inadvertent movement relative to first bracket 244, second bracket 248, and valve 140.

In some examples, each one of first locking pins 266 and second locking pins 368 includes a detent having a projection (e.g., ball or pin) biased, via a biasing element (e.g., spring), into a position projecting outward from an end of a body of an associated one of first locking pins 266 and second locking pins 368. With valve 140 positioned between first bracket 244 and second bracket 248 and first locking pins 266 coupled to first bracket 244, ends of first locking pins 266 extend into valve pass-through passages 444. Similarly, with valve 140 positioned between first bracket 244 and second bracket 248 and second locking pins 368 coupled to second bracket 248, ends of second locking pins 368 extend into valve pass-through passages 444. In an outwardly biased position, the detents of first locking pins 266 and second locking pins 368 engage apertures, formed in the body of valve 140 along valve pass-through passages 444, and prevent removal of first locking pins 266 and second locking pins 368 from valve pass-through passages 444.

Referring generally to FIGS. 1A, 1B, and 1C and particularly to, e.g., FIGS. 6-9, 20, and 25-28, valve 140 comprises first valve-body portion 260 and second valve-body portion 262, coupled to first valve-body portion 260. With valve 140 releasably locked to valve-locking assembly 218, first valve-body portion 260 is positioned between first bracket 244 and second bracket 248 and second valve-body portion 262 is positioned within inner tubular sleeve wall 114. The preceding subject matter of this paragraph characterizes example 42 of the present disclosure, wherein example 42 also includes the subject matter according to any one of examples 38 to 41, above.

When valve 140 is locked to valve-locking assembly 218, the configuration of valve 140 facilitates a reduction in the overall size of apparatus 100 by positioning second valve-body portion 262 of valve 140 within sleeve 110 and first valve-body portion 260 of valve 140 between first bracket 244 and second bracket 248 for coupling of first locking pins 266 and second locking pins 368.

Referring generally to FIGS. 1A, 1B, and 1C and particularly to, e.g., FIG. 26, valve 140 further comprises first side 254 and second side 264, opposite first side 254. First bracket 244 is configured to engage first side 254 of valve 140. Second bracket 248 is configured to engage second side 264 of valve 140. The preceding subject matter of this paragraph characterizes example 43 of the present disclosure, wherein example 43 also includes the subject matter according to example 42, above.

Engagement of first side 254 of valve 140 with first bracket 244 of valve-locking assembly 218 and engagement of second side 264 of valve 140 with second bracket 248 of valve-locking assembly 218 enables precise locating of valve 140 and a reliable interlock between valve 140 and valve-locking assembly 218. Valve 140 being positioned between first bracket 244 and second bracket 248 with second valve-body portion 262 within sleeve 110 facilitates the reduction in size of apparatus 100 and places valve 140 into direct fluid communication with cartridge 124. Direct communicative coupling of valve 140 with cartridge 124 reduces the amount of brushable substance 102 wasted due to a purging operation, for example, when cartridge 124 is replaced.

In some examples, first bracket 244 is configured to engage and mate with first side 254 of valve 140 and second bracket 248 is configured to engage and mate with second side 264 of valve 140. In some examples, first locking pins 266 extend through first bracket 244 and into valve pass-through passages 444, located in first valve-body portion 260 of valve 140, and second locking pins 368 extend through second bracket 248 and into valve pass-through passages 444, located in first valve-body portion 260 of valve 140. In some examples, first side 254 of valve 140 and first bracket 244 are geometrically complementary to facilitate mating engagement between valve 140 and first bracket 244. Similarly, in some examples, second side 264 of valve 140 and second bracket 248 are geometrically complementary to facilitate mating engagement between valve 140 and second bracket 248.

Referring generally to FIGS. 1A, 1B, and 1C and particularly to, e.g., FIGS. 7, 8, 25, and 26, each of first bracket 244 and second bracket 248 comprises first bracket-body portion 376, coupled to sleeve 110, and second bracket-body portion 378, extending from first bracket-body portion 376 and positioned within inner tubular sleeve wall 114. With valve 140 releasably locked to valve-locking assembly 218, first valve-body portion 260 is positioned between first bracket-body portion 376 of first bracket 244 and second bracket 248 and second valve-body portion 262 is positioned between second bracket-body portion 378 of first bracket 244 and second bracket 248. The preceding subject matter of this paragraph characterizes example 44 of the present disclosure, wherein example 44 also includes the subject matter according to example 43, above.

First bracket-body portion 376 and second bracket-body portion 378 of first bracket 244 and second bracket 248 enables complete and reliable engagement of first bracket 244 and second bracket 248 with first side 254 and second side 264 of valve 140. First bracket-body portion 376 of first bracket 244 and second bracket 248 facilitates positioning of first valve-body portion 260 of valve 140 relative to cartridge 124 to place valve 140 into direct fluid communication with cartridge 124. Second bracket-body portion 378 of first bracket 244 and second bracket 248 facilitates positioning of second valve-body portion 262 of valve 140 within inner tubular sleeve wall 114 of sleeve 110 to reduce the size of apparatus 100.

Referring generally to FIGS. 1A, 1B, and 1C and particularly to, e.g., FIGS. 20-22, valve 140 further comprises valve chamber 274 and valve passage 276, extending through valve 140 along axis parallel to first axis 118. Valve 140 also comprises valve-inlet port 142, located radially outward of valve chamber 274. Valve 140 additionally comprises valve-outlet orifice 144, extending through valve 140 into valve chamber 274. Valve passage 276 opens into valve chamber 274. Valve-inlet port 142 is communicatively coupled with valve chamber 274 and is configured to be communicatively coupled with cartridge 124. Valve-outlet orifice 144 is configured to be communicatively coupled with brush-arm assembly 152. The preceding subject matter of this paragraph characterizes example 45 of the present disclosure, wherein example 45 also includes the subject matter according to any one of examples 42 to 44, above.

Valve-inlet port 142, valve chamber 274, and valve-outlet orifice 144 define a flow path for brushable substance 102 through valve 140. Forming valve-inlet port 142 in first valve-body portion 260 at a location radially outward of valve chamber 274 facilitates alignment and sealing engagement of valve-inlet port 142 with cartridge outlet port 134 of cartridge 124. Valve-outlet orifice 144 being formed in first valve-body portion 260 facilitates communicative coupling of valve 140 with brush-arm assembly 152. Valve passage 276 being formed in second valve-body portion 262 facilitates access of linear actuator 138 with valve chamber 274.

In some examples, valve 140 includes more than one valve-inlet port 142. Each valve-inlet port 142 is configured to be communicatively coupled with one cartridge outlet port 134 of cartridge 124. In some examples, valve-inlet port 142 also includes a gasket configured to form a seal between valve-inlet port 142 and cartridge outlet port 134.

Referring generally to FIGS. 1A, 1B, and 1C and particularly to, e.g., FIGS. 8, 9, and 20-22, valve 140 further comprises valve channel 280. Valve chamber 274 comprises first chamber portion 370 and second chamber portion 372, communicatively coupled with first chamber portion 370. Valve-inlet port 142 is communicatively coupled with first chamber portion 370 by valve channel 280. Valve channel 280 is circumferentially closed and extends between valve-inlet port 142 and first chamber portion 370 so that brushable substance 102 is able to move from valve-inlet port 142 through valve channel 280 to first chamber portion 370. Valve-outlet orifice 144 extends through valve 140 into second chamber portion 372. Valve 140 further comprises valve seat 380 between first chamber portion 370 and second chamber portion 372. Linear actuator 138 is configured to selectively seal valve seat 380. The preceding subject matter of this paragraph characterizes example 46 of the present disclosure, wherein example 46 also includes the subject matter according to example 45, above.

Valve channel 280 enables fluid coupling of valve-inlet port 142, which has a flow direction parallel with first axis 118, with valve chamber 274, which has a flow direction parallel with first axis 118. Valve seat 380 provides a sealable interface between first chamber portion 370 and second chamber portion 372 for selective sealing engagement by linear actuator 138 to segregate first chamber portion 370 from second chamber portion 372 and block the flow path of brushable substance 102 from valve-inlet port 142 to valve-outlet orifice 144 through valve chamber 274.

Referring generally to FIGS. 1A, 1B, and 1C and particularly to, e.g., FIGS. 8, 9, 21, and 22, linear actuator 138 comprises barrel 292, removably coupled with second valve-body portion 262, and piston 294, movable along first axis 118 within barrel 292 between extended position and retracted position. Linear actuator 138 further comprises actuator rod 146, coupled to piston 294 and extending through valve passage 276, and first plug 296, coupled to actuator rod 146 opposite piston 294. With piston 294 in extended position, first plug 296 is entirely in second chamber portion 372 and does not sealingly engage valve seat 380 between first chamber portion 370 and second chamber portion 372. With piston 294 in retracted position, first plug 296 sealingly engages valve seat 380 between first chamber portion 370 and second chamber portion 372. The preceding subject matter of this paragraph characterizes example 47 of the present disclosure, wherein example 47 also includes the subject matter according to example 46, above.

Linear actuator 138 enables precise control of the flow rate of brushable substance 102 out of valve 140 and into brush-arm assembly 152. Linear actuator 138 facilitates flow of brushable substance 102 from valve-outlet orifice 144 by positioning first plug 296 in an open position, in which first plug 296 is positioned entirely within second chamber portion 372 and is not sealingly engaged with valve seat 380, when piston 294 is moved to the extended position (FIG. 22). Linear actuator 138 also facilitates restriction of flow of brushable substance 102 from valve-outlet orifice 144 by positioning first plug 296 in a closed position, in which first plug 296 is positioned within valve seat 380 and is sealingly engaged with valve seat 380, when piston 294 is moved to the retracted position (FIG. 21).

Referring generally to FIGS. 1A, 1B, and 1C and particularly to, e.g., FIGS. 8, 9, 21, and 22, linear actuator 138 further comprises second plug 298, spaced away from first plug 296 along actuator rod 146 and positioned within valve passage 276. The preceding subject matter of this paragraph characterizes example 48 of the present disclosure, wherein example 48 also includes the subject matter according to example 47, above.

Second plug 298 enables restriction of flow of brushable substance 102 from valve chamber 274 into valve passage 276. In other words, second plug 298 being positioned within valve passage 276 facilitates prevention of a backflow of brushable substance 102 from valve chamber 274 into valve passage 276 as brushable substance 102 flows through valve 140 and during actuation of linear actuator 138.

In some examples, actuator rod 146 also includes a first rod body, coupled to piston 294. In some examples, second plug 298 is coupled to the first rod body. In some examples, actuator rod 146 also includes a second rod body, coupled to second plug 298. In some examples, first plug 296 is coupled to the second rod body, opposite second plug 298.

Referring generally to FIGS. 1A, 1B, and 1C and particularly to, e.g., FIG. 23, linear actuator 138 further comprises first actuator pressure input 324, configured to communicate pneumatic pressure to move piston 294 in first direction into extended position and second actuator pressure input 326, configured to communicate pneumatic pressure to move piston 294 in second direction, opposite first direction, into retracted position. The preceding subject matter of this paragraph characterizes example 49 of the present disclosure, wherein example 49 also includes the subject matter according to example 47 or 48, above.

First actuator pressure input 324 and second actuator pressure input 326 enable double-action of linear actuator 138 and delivery of the pneumatic pressure driving force for movement of piston 294 relative to barrel 292.

In some examples, apparatus 100 also includes pressure tubes (not illustrated) to facilitate communication of pressure to and from linear actuator 138. In some examples, the pressure tubes communicate pressure to and from first actuator pressure input 324 and second actuator pressure input 326 to facilitate pressurization of internal cylinder 450 of barrel 292 and application of pneumatic pressure to piston 294 to control operation of linear actuator 138, such as to move first plug 296 relative to valve 140 to control flow of brushable substance 102 from valve 140 to brush 176. In some examples, each one of first actuator pressure input 324 and second actuator pressure input 326 is a pneumatic fitting.

Selective pneumatic operation of first actuator pressure input 324 and second actuator pressure input 326 of linear actuator 138 enables precise application of pneumatic pressure to piston 294 to precisely control the flow of brushable substance 102 out of valve 140 and to brush 176. Additionally, selective pneumatic operation of first actuator pressure input 324 and second actuator pressure input 326 facilitates the use of automated pneumatic controls to control the pneumatic operation of first actuator pressure input 324 and second actuator pressure input 326.

Referring generally to FIGS. 1A, 1B, and 1C and particularly to, e.g., FIGS. 18-23, apparatus 100 further comprises first position sensor 328, configured to detect when piston 294 is in extended position, and second position sensor 330, configured to detect when piston 294 is in retracted position. Apparatus 100 also comprises positioning element 332, located on piston 294. Positioning element 332 is configured to actuate first position sensor 328 when piston 294 is in extended position and is configured to actuate second position sensor 330 when piston 294 is in retracted position. The preceding subject matter of this paragraph characterizes example 50 of the present disclosure, wherein example 50 also includes the subject matter according to any one of examples 47 to 49, above.

First position sensor 328 and second position sensor 330 enable detection of whether first plug 296 is in the open position or the closed position based on the position of piston 294. Positioning element 332 enables actuation of first position sensor 328 when piston 294 is in the extended position to indicate valve 140 is open. Positioning element 332 also enables actuation of second position sensor 330 when piston 294 is in the retracted position to indicate valve 140 is closed.

Referring generally to FIGS. 1A, 1B, and 1C and particularly to, e.g., FIGS. 21 and 22, positioning element 332 comprises magnet 312, coupled to piston 294. First position sensor 328 comprises first magnetic sensor 334, proximate to one end of barrel 292. Second position sensor 330 comprises second magnetic sensor 336, proximate to another end of barrel 292. The preceding subject matter of this paragraph characterizes example 51 of the present disclosure, wherein example 51 also includes the subject matter according to example 50, above.

Magnet 312 enables non-contact actuation of first magnetic sensor 334 and second magnetic sensor 336 in response to movement of piston 294 relative to barrel 292.

Referring generally to FIGS. 1A, 1B, and 1C and particularly to, e.g., FIGS. 21 and 22, piston 294 comprises first annular piston portion 308, coupled to actuator rod 146, and second annular piston portion 310, coupled to actuator rod 146 and spaced away from first annular piston portion 308. Magnet 312 is an annular magnet, coupled to actuator rod 146 between first annular piston portion 308 and second annular piston portion 310. The preceding subject matter of this paragraph characterizes example 52 of the present disclosure, wherein example 52 also includes the subject matter according to example 51, above.

Magnet 312 being an annular magnet enables positioning of first magnetic sensor 334 and second magnetic sensor 336 at any location around an exterior of barrel 292 relative to piston 294.

Referring generally to FIGS. 1A, 1B, and 1C and particularly to, e.g., FIGS. 19-23, 25, and 26, second valve-body portion 262 further comprises first twist-lock interface 346, configured to releasably lock barrel 292 of linear actuator 138 to valve 140. The preceding subject matter of this paragraph characterizes example 53 of the present disclosure, wherein example 53 also includes the subject matter according to any one of examples 45 to 52, above.

First twist-lock interface 346 enables simple, easy, and effective coupling of linear actuator 138 to valve 140. First twist-lock interface 346 facilitates releasable locking of linear actuator 138 to valve 140 with actuator rod 146 extending through valve passage 276 and into valve chamber 274 via a twisting action of linear actuator 138 relative to second valve-body portion 262 of valve 140.

In some examples, linear actuator 138 includes at least one twist-lock retainer 452 coupled to barrel 292 and extending along an axis, parallel with first axis 118. In some examples, first twist-lock interface 346 of second valve-body portion 262 of valve 140 includes at least one twist-lock clamp 454. In some examples, twist-lock clamp 454 is cross-sectionally complementary to twist-lock retainer 452 and is configured to receive and releasably retain twist-lock retainer 452 upon insertion of twist-lock retainer 452 into twist-lock clamp 454 and twisting action of linear actuator 138 relative to valve 140. In some examples, twist-lock retainer 452 includes a shaft, projecting outward from barrel 292 of linear actuator 138, and a disk-like head, located on an end of the shaft. In some examples, twist-lock retainer 452 is a shoulder bolt, coupled to barrel 292 of linear actuator 138. First twist-lock interface 346 ensures linear actuator 138 is securely coupled to valve 140 with actuator rod 146 partially positioned within valve chamber 274.

Referring generally to FIGS. 1A, 1B, and 1C and particularly to, e.g., FIGS. 9, 19, and 24, apparatus 100 further comprises pressure sensor 340, configured to be in communication with brushable substance 102 when brushable substance 102 is introduced into valve chamber 274. The preceding subject matter of this paragraph characterizes example 54 of the present disclosure, wherein example 54 also includes the subject matter according to any one of examples 45 to 53, above.

Pressure sensor 340 enables detection of pressure of brushable substance 102 within valve 140. In some examples, the pressure of brushable substance 102 within valve 140 that is detected by pressure sensor 340 is used to control the rate at which brushable substance 102 flows from cartridge 124 to valve 140. Additionally, in some examples, the pressure of brushable substance 102 within valve 140 that is detected by pressure sensor 340 is used to control the actuation of linear actuator 138 to regulate the rate at which brushable substance 102 flows from valve 140 to brush-arm assembly 152. In some examples, pressure sensor 340 is configured to be removably coupled to valve 140.

In some examples, valve 140 includes pressure sensor port 456 that is in communication with brushable substance 102 within valve 140. In some examples, pressure sensor port 456 is located in second valve-body portion 262 of valve 140 and extends from an exterior of valve 140 into communication with valve channel 280. In some examples, pressure sensor 340 is at least partially located within pressure sensor port 456 such that pressure sensor 340 is in communication with brushable substance 102, located within or flowing through, valve channel 280 of valve 140, for example, as brushable substance 102 is being introduced to valve chamber 274.

Referring generally to FIGS. 1A, 1B, and 1C and particularly to, e.g., FIGS. 9, 19, and 24, apparatus 100 further comprises pressure-sensor housing 344, configured to house pressure sensor 340. Second valve-body portion 262 of valve 140 further comprises second twist-lock interface 348, configured to releasably lock pressure-sensor housing 344 to valve 140. The preceding subject matter of this paragraph characterizes example 55 of the present disclosure, wherein example 55 also includes the subject matter according to example 54, above.

Pressure-sensor housing 344 and second twist-lock interface 348 enable simple, easy, and effective coupling of pressure sensor 340 to valve 140 in communication with brushable substance 102 within valve 140. Pressure-sensor housing 344 facilitates pressure sensor 340 being releasably locked to valve 140 such that pressure sensor 340 is in communication with (e.g., is in contact with) brushable substance 102, located within valve 140, such as brushable substance 102, located within valve channel 280.

In some examples, pressure-sensor housing 344 includes at least one twist-lock retainer 458. In some examples, second twist-lock interface 348 of second valve-body portion 262 of valve 140 includes pressure-sensor receptacle 460 and at least one twist-lock groove 462. In some examples, pressure-sensor receptacle 460 is cross-sectionally complementary to pressure-sensor housing 344. In some examples, pressure-sensor receptacle 460 opens into pressure sensor port 456 such that pressure sensor 340 extends into valve 140 in communication with brushable substance 102 when pressure-sensor housing 344 is inserted into pressure-sensor receptacle 460. In some examples, twist-lock groove 462 is configured to receive and retain twist-lock retainer 458 upon insertion of pressure-sensor housing 344 into pressure-sensor receptacle 460 and twisting action of pressure-sensor housing 344 relative to valve 140. Pressure-sensor housing 344 and second twist-lock interface 348 ensure pressure sensor 340 is securely coupled to valve 140 in communication with brushable substance 102 within valve 140.

Referring generally to FIGS. 1A, 1B, and 1C, apparatus 100 further comprises pressure-signal conditioner 342, electrically coupled to pressure sensor 340. The preceding subject matter of this paragraph characterizes example 56 of the present disclosure, wherein example 56 also includes the subject matter according to example 54 or 55, above.

Pressure-signal conditioner 342 enables communication of pressure-related information from pressure sensor 340 to an electronic controller in a format usable by the electronic controller. In some examples, pressure-signal conditioner 342 provides data format conversion functionality on-board apparatus 100, rather than at the electronic controller.

Referring generally to FIGS. 1A, 1B, and 1C, apparatus 100 further comprises pressure source 360 and controller 322, operatively coupled with pressure source 360 and with pressure sensor 340 to control, based on signals, obtained from pressure sensor 340, flow rate of brushable substance 102 through valve 140. The preceding subject matter of this paragraph characterizes example 57 of the present disclosure, wherein example 57 also includes the subject matter according to example 56, above.

Use of pressure sensor 340 to control the flow rate of brushable substance 102 through valve 140 enables precise and predictable flow of brushable substance.

In some examples, pressure source 360 is operatively coupled to cap pressure input 246 of push-lock pressure cap 150 to communicate pressure to cartridge 124 and drive movement of annular plunger 148. Pressure source 360 is also operatively coupled to first actuator pressure input 324 and second actuator pressure input 326 of linear actuator 138 to communicate pressure to linear actuator 138 and drive movement of piston 294.

In some examples, controller 322 includes (or is) at least one electronic controller (e.g., a programmable processor) and at least one control valve that is pneumatically coupled to pressure source 360 and at least one of push-lock pressure cap 150 and linear actuator 138. Controller 322 is configured to control application of pneumatic pressure from pressure source 360 to at least one of cap pressure input 246 of push-lock pressure cap 150 and first actuator pressure input 324 and second actuator pressure input 326 of linear actuator 138. In some examples, the control valve is a two-way valve. In some examples, the control valve is an electromechanically operated solenoid valve.

Referring generally to FIGS. 1A, 1B, and 1C, apparatus 100 further comprises input/output connector 358, communicatively coupling pressure-signal conditioner 342 with controller 322. The preceding subject matter of this paragraph characterizes example 58 of the present disclosure, wherein example 58 also includes the subject matter according to example 57, above.

Input/output connector 358 enables electrical communication between controller 322 and pressure-signal conditioner 342. Input/output connector 358 facilitates a convenient and reliable electrical connection between controller 322 and pressure-signal conditioner 342.

Referring generally to FIGS. 1A, 1B, and 1C and particularly to, e.g., FIGS. 6-8 and 33-36, apparatus 100 further comprises brush 176, configured to be communicatively coupled with valve 140. Brush-arm assembly 152 is configured to retain brush 176 and is capable of spinning brush 176 about third axis 362, parallel to first axis 118. The preceding subject matter of this paragraph characterizes example 59 of the present disclosure, wherein example 59 also includes the subject matter according to any one of examples 45 to 58, above.

Brush 176 enables dispensing of brushable substance 102 onto surface 154. Rotation of brush 176 about third axis 362 facilitates spreading or application of brushable substance 102 onto surface 154. When pressure is applied to brushable substance 102 in cartridge 124, selective operation of linear actuator 138 enables brushable substance 102 to flow from cartridge 124, through valve 140, to brush 176, at least when brush-arm assembly 152 spins (e.g., rotates) brush 176 about third axis 362.

Referring generally to FIGS. 1A, 1B, and 1C and particularly to, e.g., FIGS. 7, 8, 18, and 19, apparatus 100 further comprises third motor 366, operatively coupled to brush-arm assembly 152 and selectively operable to rotate brush 176 about third axis 362. The preceding subject matter of this paragraph characterizes example 60 of the present disclosure, wherein example 60 also includes the subject matter according to example 59, above.

Third motor 366 being operatively coupled with brush-arm assembly 152 enables third motor 366 to selectively rotate brush 176.

In some examples, third motor 366 includes an output shaft that is rotatable by third motor 366 to produce a rotary force or torque when third motor 366 is operated. In some examples, third motor 366 is any one of various rotational motors, such as electric motors, hydraulic motors, pneumatic motors, electromagnetic motors, and the like. In some examples, third motor 366 is coupled to valve-locking assembly 218 with the output shaft operatively coupled to brush-arm assembly 152 to selectively rotate brush 176. In some examples, valve-locking assembly 218 also includes bracket plate 470, removably coupled to first bracket 244. In some examples, with bracket plate 470 coupled to first bracket 244, first bracket 244 and bracket plate 470, in combination, define motor receptacle 472, configured to receive and retain a portion of third motor 366.

Referring generally to FIGS. 1A, 1B, and 1C and particularly to, e.g., FIGS. 7, 8, 33, and 36, brush-arm assembly 152 comprises first drive component 364, rotatable about third axis 362. Third motor 366 is operatively coupled with first drive component 364 and selectively operable to rotate first drive component 364 about third axis 362. Brush 176 is configured to be coupled with first drive component 364. The preceding subject matter of this paragraph characterizes example 61 of the present disclosure, wherein example 61 also includes the subject matter according to example 60, above.

Third motor 366 being operatively coupled with first drive component 364 and brush 176 being co-rotatably coupleable with first drive component 364 enables third motor 366 to selectively rotate brush 176. In some examples, third axis 362 is laterally spaced away from and parallel to an axis of rotation of third motor 366 and first axis 118. Configuring third axis 362 to be parallel to the axis of rotation of third motor 366 facilitates reduced complexity and improved reliability of the operative coupling between third motor 366 and first drive component 364. Configuring third axis 362 to be laterally spaced away from first axis 118 facilitates positioning of brush 176 laterally outward of first axis 118.

Referring generally to FIGS. 1A, 1B, and 1C and particularly to, e.g., FIG. 36, first drive component 364 comprises brush receptacle 382, configured to releasably retain brush 176. The preceding subject matter of this paragraph characterizes example 62 of the present disclosure, wherein example 62 also includes the subject matter according to example 61, above.

Brush receptacle 382 enables brush 176 to be quickly and easily retained by first drive component 364 and removed from first drive component 364.

Referring generally to FIGS. 1A, 1B, and 1C and particularly to, e.g., FIG. 36, brush 176 comprises engagement portion 384. Brush receptacle 382 is configured to form an interference fit with engagement portion 384 of brush 176. The preceding subject matter of this paragraph characterizes example 63 of the present disclosure, wherein example 63 also includes the subject matter according to example 62, above.

Interference fit between brush receptacle 382 engagement portion 384 of brush 176 promotes a secure retention of brush 176 by brush receptacle 382 and facilitates co-rotation of brush 176 and first drive component 364. Additionally, interference fit between brush receptacle 382 and engagement portion 384 of brush 176 enables brush receptacle 382 to retain brush 176 by simply inserting engagement portion 384 of brush 176 into brush receptacle 382 without the need for additional fasteners. In some examples, brush receptacle 382 includes a hex socket and engagement portion 384 of brush 176 includes a hex head configured to fit within an opening of the hex socket of brush receptacle 382. In some examples, brush receptacle 382 also includes a gasket (e.g., an O-ring) configured to facilitate the interference fit between brush receptacle 382 and engagement portion 384 of brush 176.

Referring generally to FIGS. 1A, 1B, and 1C and particularly to, e.g., FIGS. 34-36, brush-arm assembly 152 further comprises second drive component 386, operatively coupled with third motor 366, and third power-transmitting component 388, operatively coupled with second drive component 386 and first drive component 364. Third motor 366 is selectively operable to rotate second drive component 386 about fourth axis 392 of third motor 366. The preceding subject matter of this paragraph characterizes example 64 of the present disclosure, wherein example 64 also includes the subject matter according to any one of examples 61 to 63, above.

Third motor 366 being operatively coupled with second drive component 386 and second drive component 386 being operatively coupled with first drive component 364 enables third motor 366 to selectively rotate first drive component 364. In other words, second drive component 386 and third power-transmitting component 388 facilitate transmission of power from third motor 366 to first drive component 364, which rotates brush 176. In some examples, fourth axis 392 of third motor 366 is the axis of rotation of third motor 366.

Referring generally to FIGS. 1A, 1B, and 1C and particularly to, e.g., FIGS. 34-36, third power-transmitting component 388 comprises gear train 390. The preceding subject matter of this paragraph characterizes example 65 of the present disclosure, wherein example 65 also includes the subject matter according to example 64, above.

Gear train 390 provides an efficient and reliable mechanism to transmit power from third motor 366 to first drive component 364, such as when first drive component 364 is not co-axial with fourth axis 392 of third motor 366 (e.g., when third axis 362 of brush 176 is laterally offset from fourth axis 392 of third motor 366). Alternatively, in some examples, third power-transmitting component 388 is a belt or a chain Referring generally to FIGS. 1A, 1B, and 1C and particularly to, e.g., FIGS. 7 and 33-36, brush-arm assembly 152 further comprises union coupling 394, operatively coupling third motor 366 with second drive component 386. The preceding subject matter of this paragraph characterizes example 66 of the present disclosure, wherein example 66 also includes the subject matter according to example 64 or 65, above.

Union coupling 394 facilitates transmission of power from third motor 366 to second drive component 386. In some examples, union coupling 394 is rotary union that is co-rotatably coupled to the output shaft of third motor 366, at one end of union coupling 394, and co-rotatably coupled to an input shaft of second drive component 386, at opposite end of union coupling 394.

Referring generally to FIGS. 1A, 1B, and 1C and particularly to, e.g., FIGS. 33-36, brush-arm assembly 152 further comprises drive-component housing 396, at least partially enclosing first drive component 364, second drive component 386, and third power-transmitting component 388. Drive-component housing 396 is coupled to one of first bracket 244 or second bracket 248. The preceding subject matter of this paragraph characterizes example 67 of the present disclosure, wherein example 67 also includes the subject matter according to any one of examples 64 to 66, above.

Drive-component housing 396 enables secure retention of first drive component 364, second drive component 386, and third power-transmitting component 388. Drive-component housing 396 also facilitates the protection of first drive component 364, second drive component 386, and third power-transmitting component 388 from impacts and/or contaminants. In some examples, drive-component housing 396 includes bearings that facilitate low-friction rotation of first drive component 364, second drive component 386, and third power-transmitting component 388. In some examples, bearings are any one of various types of bearings, such as radial ball bearings.

Referring generally to FIGS. 1A, 1B, and 1C and particularly to, e.g., FIGS. 3, 6, 27, and 28, drive-component housing 396 is fixed relative to sleeve 110. An angular orientation of brush-arm assembly 152 is selectively adjustable about first axis 118 relative to bracket 104 in response to rotation of sleeve 110. The preceding subject matter of this paragraph characterizes example 68 of the present disclosure, wherein example 68 also includes the subject matter according to example 67, above.

Drive-component housing 396 being fixed relative to sleeve 110 enables co-rotation of brush-arm assembly 152 and sleeve 110 about first axis 118 relative to bracket 104. Controlled selective rotary motion of sleeve 110 about first axis 118 relative to bracket 104 facilitates automated, precise rotation of brush-arm assembly 152 about first axis 118. Selective adjustability of the angular orientation of drive-component housing 396 facilitates controlled, selective adjustment of an angular orientation of brush 176 relative to surface 154. In some examples, drive-component housing 396 of brush-arm assembly 152 is coupled to first bracket 244.

Referring generally to FIGS. 1A, 1B, and 1C and particularly to, e.g., FIGS. 7 and 8, apparatus 100 further comprises brushable-substance delivery tube 398, communicatively coupling valve 140 with brush 176. The preceding subject matter of this paragraph characterizes example 69 of the present disclosure, wherein example 69 also includes the subject matter according to any one of examples 59 to 68, above.

Brushable-substance delivery tube 398 enables the delivery of brushable substance 102 from valve 140 to brush 176. Selective pressurization of cartridge 124 and selective operation of linear actuator 138 to open and close valve 140 facilitates flow of brushable substance 102 from valve 140 to brush 176 through brushable-substance delivery tube 398, at least when brush 176 is releasably retained by brush-arm assembly 152 and brush-arm assembly 152 rotates brush 176. In some examples, brushable-substance delivery tube 398 also enables the delivery of brushable substance 102 from valve 140 to brush 176 along a path external to drive-component housing 396 of brush-arm assembly 152 to facilitate simplification and efficiency of transmitting power from third motor 366 to first drive component 364.

Referring generally to FIGS. 1A, 1B, and 1C and particularly to, e.g., FIGS. 7 and 8, apparatus 100 further comprises cap 400, configured to be relasably coupled with brush-arm assembly 152. Cap 400 is configured to direct brushable substance 102 from brushable-substance delivery tube 398 to brush 176 when brush 176 is releasably retained by brush-arm assembly 152 and when brush-arm assembly 152 rotates brush 176. The preceding subject matter of this paragraph characterizes example 70 of the present disclosure, wherein example 70 also includes the subject matter according to example 69, above.

Cap 400 enables brushable substance 102 to flow from brushable-substance delivery tube 398 to brush 176, for example, while brush 176 is rotating. In some examples, cap 400 enables leak-free delivery of brushable substance 102 from brushable-substance delivery tube 398 to brush 176, for example, while brush 176 is rotating.

Referring generally to FIGS. 1A, 1B, and 1C and particularly to, e.g., FIGS. 7, 8, and 36, cap 400 comprises cap channel 402, extending through cap 400. Cap channel 402 is circumferentially closed. Brushable substance 102 moves from brushable-substance delivery tube 398 through cap channel 402 of cap 400 to brush 176 when brush 176 is releasably retained by brush-arm assembly 152 and when brush-arm assembly 152 rotates brush 176. The preceding subject matter of this paragraph characterizes example 71 of the present disclosure, wherein example 71 also includes the subject matter according to example 70, above.

Cap channel 402 of cap 400, being circumferentially closed, enables containment of brushable substance 102 as brushable substance 102 moves from brushable-substance delivery tube 398 to brush 176. In some examples, brushable-substance delivery tube 398 is communicatively coupled to valve-outlet orifice 144 and to cap channel 402 of cap 400. In some examples, brush 176 includes a hollow shaft communicatively coupled with cap channel 402. In some examples, cap 400 includes a cap receptacle communicatively coupled with cap channel 402 and configured to receive the hollow shaft of brush 176. In some examples, cap 400 also includes a gasket configured to form a seal between the hollow shaft of brush 176 and cap 400. In some examples, the hollow shaft of brush 176 is rotatable relative to the cap receptacle of cap 400.

Referring generally to FIGS. 1A, 1B, 1C, and 2-9 and particularly to, e.g., FIGS. 37A and 37B, method 1000 of dispensing brushable substance 102 onto surface 154 is disclosed. Method 1000 comprises, (block 1002) with cartridge 124 positioned inside sleeve 110 between inner tubular sleeve wall 114 and outer tubular sleeve wall 112, circumscribing inner tubular sleeve wall 114, and also positioned between push-lock pressure cap 150, hermetically coupled with cartridge 124, and valve 140, communicatively coupled with cartridge 124, linearly moving annular plunger 148, received between inner tubular cartridge wall 126 and outer tubular cartridge wall 128, circumscribing inner tubular cartridge wall 126, toward valve 140 along first axis 118 to urge brushable substance 102 from cartridge 124, through valve 140, and to brush 176 that is communicatively coupled to valve 140 and (block 1004) controlling flow of brushable substance 102 from valve 140 to brush 176. The preceding subject matter of this paragraph characterizes example 72 of the present disclosure.

Method 1000 provides for dispensing brushable substance 102, from cartridge 124, through brush-arm assembly 152, to surface 154 of a workpiece, for example, located in a confined space. The configuration of sleeve 110 and cartridge 124 reduces the size requirements for storage of brushable substance 102 and allows linear actuator 138 and a portion of valve 140 to be located within sleeve 110. Push-lock pressure cap 150 enables pressurization of an internal volume, located within cartridge 124, which drives annular plunger 148. Rotation of sleeve 110 controls an angular orientation of brush-arm assembly 152 relative to bracket 104 and surface 154. Valve 140 being communicatively coupled directly to cartridge 124 enables a reduction of brushable substance 102 wasted, for example, during replacement of the cartridge 124 and/or a purging operation.

Referring generally to FIGS. 1A, 1B, 1C, and 2-9 and particularly to, e.g., FIGS. 37A and 37B, method 1000 further comprises, (block 1006) with sleeve 110 coupled to bracket 104, selectively rotating sleeve 110 relative to bracket 104 about first axis 118 to controllably position of brush 176 relative to surface 154. The preceding subject matter of this paragraph characterizes example 73 of the present disclosure, wherein example 73 also includes the subject matter according to example 72, above.

Selectively rotating sleeve 110 relative to bracket 104 enables positioning of brush-arm assembly 152 relative to surface 154 for dispensing brushable substance 102.

Referring generally to FIGS. 1A, 1B, 1C, and 2-9 and particularly to, e.g., FIGS. 37A and 37B, method 1000 further comprises, (block 1008) with brush 176 releasably retained by brush-arm assembly 152, coupled with sleeve 110, rotating brush 176 about third axis 362, parallel to first axis 118. The preceding subject matter of this paragraph characterizes example 74 of the present disclosure, wherein example 74 also includes the subject matter according to example 73, above.

Rotating brush 176 facilitates spreading of brushable substance 102 onto surface 154.

Referring generally to FIGS. 1A, 1B, 1C, 5, and 29 and particularly to, e.g., FIGS. 37A and 37B, method 1000 further comprises (block 1010) detecting when sleeve 110 is in predetermined rotational orientation relative to bracket 104 by actuating proximity sensor 190, located proximate to sleeve 110, with homing element 186, located on sleeve 110. The preceding subject matter of this paragraph characterizes example 75 of the present disclosure, wherein example 75 also includes the subject matter according to example 73 or 74, above.

Detecting the rotational orientation of sleeve 110 relative to bracket 104 enables actuation of proximity sensor 190 when sleeve 110 is rotated to the predetermined rotational orientation relative to bracket 104 to indicate sleeve 110 is in the home position. Detecting the rotational orientation of sleeve 110 also enables use of an incremental, rather than an absolute, position encoder, which would be unable to determine the rotational orientation of sleeve 110 relative to bracket 104 in the case of a power interruption.

Referring generally to FIGS. 1A, 1B, 1C, and 2-5 and particularly to, e.g., FIGS. 37A and 37B, method 1000 further comprises, (block 1012) with bracket 104 coupled to robot interface 222 that is coupled to robot 116, selectively linearly moving bracket 104 relative to robot interface 222 along first axis 118. The preceding subject matter of this paragraph characterizes example 76 of the present disclosure, wherein example 76 also includes the subject matter according to any one of examples 73 to 75, above.

Linearly movement of bracket 104 relative to robot interface 222 enables linear movement of bracket 104 relative to robot 116 and linear movement of brush-arm assembly 152 relative to surface 154.

Referring generally to FIGS. 1A, 1B, 1C, and 6-8 and particularly to, e.g., FIGS. 37A and 37B, method 1000 further comprises (block 1014) releasably locking push-lock pressure cap 150 to sleeve 110. The preceding subject matter of this paragraph characterizes example 77 of the present disclosure, wherein example 77 also includes the subject matter according to any one of examples 72 to 76, above.

Releasably locking push-lock pressure cap 150 to sleeve 110 hermetically couples push-lock pressure cap 150 with cartridge 124 and enables use of pneumatic pressure to move annular plunger 148 along first axis 118 within cartridge 124 toward valve 140, which urges brushable substance 102 from cartridge 124 into valve 140.

Referring generally to FIGS. 1A, 1B, 1C, 6-8, and 13-15 and particularly to, e.g., FIGS. 37A and 37B, according to method 1000, (block 1014) releasably locking push-lock pressure cap 150 to sleeve 110 comprises (block 1016) moving spring-loaded latches 256 of push-lock pressure cap 150 relative to sleeve 110 into locked position, in which spring-loaded latches 256 are engaged with sleeve 110. The preceding subject matter of this paragraph characterizes example 78 of the present disclosure, wherein example 78 also includes the subject matter according to example 77, above.

Moving spring-loaded latches 256 of push-lock pressure cap 150 relative to sleeve 110 into locked position enables push-lock pressure cap 150 to be releasably locked to sleeve 110 and facilitates push-lock pressure cap 150 being sealed with cartridge 124.

Referring generally to FIGS. 1A, 1B, 1C, 6-8, and 13-15 and particularly to, e.g., FIGS. 37A and 37B, according to method 1000, (block 1014) moving spring-loaded latches 256 into locked position comprises (block 1018) pushing keeper 236 of each one of spring-loaded latches 256 into locking aperture 240 in sleeve 110 with latch spring 238, coupled to keeper 236. The preceding subject matter of this paragraph characterizes example 79 of the present disclosure, wherein example 79 also includes the subject matter according to example 78, above.

Pushing keeper 236 of each one of spring-loaded latches 256 into locking aperture 240 in sleeve 110 enables quick, easy, and effective locking of push-lock pressure cap 150 to sleeve 110. With cam 258 of push-lock pressure cap 150 rotated about first axis 118 into the first rotational orientation, spring-loaded latches 256 automatically return to the locked position. In some examples, cam 258 is annular. In some examples, cam 258 is semi-annular.

Referring generally to FIGS. 1A, 1B, 1C, and 6-8 and particularly to, e.g., FIGS. 37A and 37B, method 1000 further comprises (block 1020) unlocking push-lock pressure cap 150 from sleeve 110. The preceding subject matter of this paragraph characterizes example 80 of the present disclosure, wherein example 80 also includes the subject matter according to example 79, above.

Unlocking push-lock pressure cap 150 from sleeve 110 facilitates removal of push-lock pressure cap 150 from sleeve 110. Removal of push-lock pressure cap 150 from sleeve 110 facilitates removal of cartridge 124 from within sleeve 110.

Referring generally to FIGS. 1A, 1B, 1C, 6-8, and 13-15 and particularly to, e.g., FIGS. 37A and 37B, according to method 1000, (block 1020) unlocking push-lock pressure cap 150 from sleeve 110 comprises (block 1022) moving spring-loaded latches 256 of push-lock pressure cap 150 relative to sleeve 110 into unlocked position, in which spring-loaded latches 256 are disengaged from sleeve 110. The preceding subject matter of this paragraph characterizes example 81 of the present disclosure, wherein example 81 also includes the subject matter according to example 80, above.

Moving spring-loaded latches 256 of push-lock pressure cap 150 relative to sleeve 110 into unlocked position enables unlocking of push-lock pressure cap 150 from sleeve 110 is a simple, single motion.

Referring generally to FIGS. 1A, 1B, 1C, 6-8, and 13-15 and particularly to, e.g., FIGS. 37A and 37B, according to method 1000, (block 1022) moving spring-loaded latches 256 into unlocked position comprises (block 1024) pushing keeper 236 of each one of spring-loaded latches 256 out of locking aperture 240, formed in sleeve 110, by rotating cam 258 about first axis 118. The preceding subject matter of this paragraph characterizes example 82 of the present disclosure, wherein example 82 also includes the subject matter according to example 81, above.

Pushing keeper 236 of each one of spring-loaded latches 256 out of locking aperture 240 enables quick, easy, and effective unlocking of push-lock pressure cap 150 from sleeve 110. Rotating cam 258 about first axis 118 into the second rotational orientation moves spring-loaded latches 256 into the unlocked position.

Referring generally to FIGS. 1A, 1B, 1C, and 12 and particularly to, e.g., FIGS. 37A and 37B, method 1000 further comprises, (block 1026) with push-lock pressure cap 150 removed from sleeve 110, at least partially ejecting cartridge 124 from sleeve 110 through annular sleeve end-opening 162 that separates inner tubular sleeve wall 114 and outer tubular sleeve wall 112. The preceding subject matter of this paragraph characterizes example 83 of the present disclosure, wherein example 83 also includes the subject matter according to example 82, above.

At least partially ejecting cartridge 124 from sleeve 110 facilitates removal of cartridge 124 from within sleeve 110. In an example, ejecting cartridge 124 from sleeve 110 through annular sleeve end-opening 162 is achieved by communicating pneumatic pressure to push cartridge 124 out of annular sleeve end-opening 162.

Referring generally to FIGS. 1A, 1B, and 1C, 6 and particularly to, e.g., FIGS. 37A and 37B, method 1000 further comprises, (block 1028) with push-lock pressure cap 150 releasably locked to sleeve 110, controlling flow rate of brushable substance 102 through valve 140. The preceding subject matter of this paragraph characterizes example 84 of the present disclosure, wherein example 84 also includes the subject matter according to any one of examples 78 to 83, above.

Pressure applied to annular plunger 148 enables annular plunger 148 to move along first axis 118 toward valve 140, which urges brushable substance 102 from cartridge 124 and into valve 140. Control of the pneumatic pressure communicated to annular plunger 148 facilitates control the flow rate of brushable substance 102 through valve 140.

Referring generally to FIGS. 1A, 1B, and 1C and particularly to, e.g., FIGS. 37A and 37B, according to method 1000, (block 1028) controlling flow rate of brushable substance 102 through valve 140 is based, at least in part, on pressure of brushable substance 102, located within valve 140. The preceding subject matter of this paragraph characterizes example 85 of the present disclosure, wherein example 85 also includes the subject matter according to example 84, above.

Controlling flow rate of brushable substance 102 based on pressure of brushable substance 102 enables precise and predictable flow of brushable substance 102. Monitoring parameters of brushable substance 102, such as pressure of brushable substance 102, located within valve 140, as brushable substance 102 flows through valve 140 to brush 176, enables a consistent and/or desired amount of brushable substance 102 to be dispensed or applied onto surface 154 by brush 176. In an example, controller 322 is operatively coupled to pressure sensor 340 to process a pressure value of brushable substance 102 within valve 140. Controller 322 controls the pneumatic pressure applied to annular plunger 148 and controls a position of first plug 296 relative to valve 140 based on the processed values to control the flow rate of brushable substance 102 through valve 140.

Referring generally to FIGS. 1A, 1B, and 1C and particularly to, e.g., FIGS. 37A and 37B, method 1000 further comprises, (block 1032) determining pressure of brushable substance 102, flowing through valve 140. Method 1000 also comprises, (block 1034) based on pressure of brushable substance 102, linearly moving annular plunger 148 along first axis 118 toward valve 140 to control flow rate of brushable substance 102 through valve 140. The preceding subject matter of this paragraph characterizes example 86 of the present disclosure, wherein example 86 also includes the subject matter according to example 85, above.

Controlling flow rate of brushable substance 102 based on pressure of brushable substance 102 enables precise and predictable flow of brushable substance 102. Monitoring pressure of brushable substance 102, located within valve 140, as brushable substance 102 flows through valve 140 and out from brush 176, enables a consistent and/or desired amount of brushable substance 102 to be dispensed or applied onto surface 154.

Referring generally to FIGS. 1A, 1B, 1C, 21, and 22 and particularly to, e.g., FIGS. 37A and 37B, according to method 1000, (block 1004) controlling flow of brushable substance 102 from valve 140 to brush 176 comprises (block 1036) actuating linear actuator 138, coupled to valve 140, to move first plug 296 of linear actuator 138 into one of open position, in which first plug 296 does not sealingly engage valve seat 380 of valve 140, or closed position, in which first plug 296 sealingly engages valve seat 380 of valve 140. The preceding subject matter of this paragraph characterizes example 87 of the present disclosure, wherein example 87 also includes the subject matter according to any one of examples 72 to 86, above.

Actuation of linear actuator 138 enables precise control of the flow of brushable substance 102 from valve 140 into brush 176 via brushable-substance delivery tube 398. In an example, controller 322 is operatively coupled to linear actuator 138 and controls the position of first plug 296 relative to valve seat 380 of valve 140 to control the flow rate of brushable substance 102 through valve 140.

Referring generally to FIGS. 1A, 1B, 1C, 21, and 22 and particularly to, e.g., FIGS. 37A and 37B, method 1000 further comprises (block 1038) detecting when piston 294 of linear actuator 138 is in extended position to indicate that first plug 296 is in open position and (block 1040) detecting when piston 294 of linear actuator 138 is in retracted position to indicate that first plug 296 is in closed position. The preceding subject matter of this paragraph characterizes example 88 of the present disclosure, wherein example 88 also includes the subject matter according to example 87, above.

Detecting when piston 294 is in the extended and retracted positions enables precise control of flow of brushable substance 102 from valve 140 to brush 176 by controlling the relative position of first plug 296 between the open and closed positions. Moving first plug 296 to the open position at which first plug 296 does not sealingly engage valve seat 380 enables flow of brushable substance 102 out of valve-outlet orifice 144 and into brushable-substance delivery tube 398 for delivery to brush 176. Moving first plug 296 into the closed position at which first plug 296 sealingly engages valve seat, prevents flow of brushable substance 102 out of valve-outlet orifice 144.

Referring generally to FIGS. 1A, 1B, 1C, 21, and 22 and particularly to, e.g., FIGS. 37A and 37B, according to method 1000, (block 1042) when first plug 296 is moved from open position to closed position, brushable substance 102 is drawn from second chamber portion 372 of valve 140 back into first chamber portion 370 of valve 140. The preceding subject matter of this paragraph characterizes example 89 of the present disclosure, wherein example 89 also includes the subject matter according to example 87, above.

Movement of first plug 296 from the open position to the closed position pulls brushable substance 102 back into valve 140 to prevent excess amounts of brushable substance 102 from passing through valve-outlet orifice 144 and into brushable-substance delivery tube 398 during linear movement of first plug 296.

Referring generally to FIGS. 1A, 1B, 1C, and 25-27 and particularly to, e.g., FIGS. 37A and 37B, method 1000 further comprises (block 1044) releasably locking valve 140 to valve-locking assembly 218, which is coupled to sleeve 110, so that valve-inlet port 142 of first valve-body portion 260 of valve 140 is communicatively coupled with cartridge outlet port 134 of cartridge 124 and second valve-body portion 262 of valve 140 is positioned within inner tubular sleeve wall 114. The preceding subject matter of this paragraph characterizes example 90 of the present disclosure, wherein example 90 also includes the subject matter according to any one of examples 72 to 89, above.

Positioning second valve-body portion 262 of valve 140 within inner tubular sleeve wall 114 of sleeve 110, when valve 140 is locked to valve-locking assembly 218 and valve-inlet port 142 is sealingly engaged with cartridge outlet port 134, facilitates a reduction in the overall size of apparatus 100.

Referring generally to FIGS. 1A, 1B, 1C, and 25-28 and particularly to, e.g., FIGS. 37A and 37B, according to method 1000, (block 1044) releasably locking valve 140 to valve-locking assembly 218 comprises (block 1046) positioning valve 140 between first bracket 244, coupled to sleeve 110, and second bracket 248, coupled to sleeve 110 and (block 1048) releasably locking valve 140 with first bracket 244 and second bracket 248. The preceding subject matter of this paragraph characterizes example 91 of the present disclosure, wherein example 91 also includes the subject matter according to example 90, above.

Positioning valve 140 between and releasably locking valve to first bracket 244 and second bracket 248 enables valve 140 to be releasably locked to valve-locking assembly 218 in fluid communication with cartridge 124.

Examples of the present disclosure may be described in the context of aircraft manufacturing and service method 1100 as shown in FIG. 38 and aircraft 1102 as shown in FIG. 39. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 39, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for dispensing a brushable substance onto a surface, the apparatus comprising:
a bracket, configured to be removably coupled with a robot;
a sleeve, comprising an inner tubular sleeve wall and an outer tubular sleeve wall, circumscribing the inner tubular sleeve wall, wherein the sleeve is coupled to the bracket and is rotatable relative to the bracket about a first axis;
a first drive assembly, configured to selectively controllably rotate the sleeve about the first axis relative to the bracket;
a cartridge, comprising an inner tubular cartridge wall and an outer tubular cartridge wall, circumscribing the inner tubular cartridge wall, wherein the cartridge is configured to be positioned between the inner tubular sleeve wall and the outer tubular sleeve wall;
a valve, configured to be communicatively coupled with the cartridge;
a brush-arm assembly, coupled to the sleeve;
a linear actuator to control flow of the brushable substance from the valve;
an annular plunger, positioned between the inner tubular cartridge wall and the outer tubular cartridge wall and movable along the first axis; and
a push-lock pressure cap, configured to be hermetically coupled with the cartridge; and
wherein the cartridge is configured to be positioned between the push-lock pressure cap and the valve.

2. The apparatus according to claim 1, wherein:
the sleeve further comprises a sleeve first end, comprising an annular sleeve end-opening that separates the inner tubular sleeve wall and the outer tubular sleeve wall; and
the sleeve is configured to receive the cartridge through the annular sleeve end-opening.

3. The apparatus according to claim 2, wherein the sleeve further comprises at least a portion of a cartridge-ejection system, selectively operable to at least partially eject the cartridge from the sleeve through the annular sleeve end-opening.

4. The apparatus according to claim 3, wherein:
the sleeve further comprises:
a sleeve second end, opposite the sleeve first end; and
an annular sleeve end-wall, interconnecting the inner tubular sleeve wall and the outer tubular sleeve wall at the sleeve second end; and
the cartridge-ejection system comprises a sleeve pressure input, configured to communicate pneumatic pressure through the annular sleeve end-wall to at least partially push the cartridge out of the annular sleeve end-opening.

5. The apparatus according to claim 1, wherein:
the cartridge further comprises a cartridge first end, comprising an annular cartridge end-opening that separates the inner tubular cartridge wall and the outer tubular cartridge wall; and
the cartridge is configured to receive the brushable substance through the annular cartridge end-opening.

6. The apparatus according to claim 1, wherein the push-lock pressure cap comprises spring-loaded latches, moveable relative to the sleeve between a locked position, in which the spring-loaded latches are engaged with the sleeve, and an unlocked position, in which the spring-loaded latches are disengaged from the sleeve.

7. The apparatus according to claim 1, wherein:
the annular plunger comprises:
an annular plunger body;
an annular inner seal, coupled to the annular plunger body and located between the annular plunger body and the inner tubular cartridge wall;

an annular outer seal, coupled to the annular plunger body and located between the annular plunger body and the outer tubular cartridge wall; and an annular seal retainer, coupled to the annular plunger body; and the annular inner seal and the annular outer seal are sandwiched between the annular plunger body and the annular seal retainer.

8. The apparatus according to claim 1, further comprising a valve-locking assembly, configured to releasably couple the valve with the sleeve.

9. The apparatus according to claim 8, wherein:
the valve-locking assembly comprises:
a first bracket, coupled to the sleeve; and
a second bracket, coupled to the sleeve and spaced away from the first bracket; and
the valve is configured to fit between the first bracket and the second bracket and is configured to be coupled to the first bracket and the second bracket.

10. The apparatus according to claim 9, wherein:
the valve comprises:
a first valve-body portion; and
a second valve-body portion, coupled to the first valve-body portion; and
with the valve releasably locked to the valve-locking assembly, the first valve-body portion is positioned between the first bracket and the second bracket and the second valve-body portion is positioned within the inner tubular sleeve wall.

11. The apparatus according to claim 1, wherein:
the first drive assembly comprises:
a first motor; and
a first power-transmitting component, operatively coupled with the first motor and the sleeve;
the sleeve further comprises splines, projecting outwardly from the outer tubular sleeve wall; and
the first power-transmitting component comprises teeth, configured to mate with the splines of the sleeve.

12. The apparatus according to claim 11, wherein the bracket comprises a tensioner, configured to tension the first power-transmitting component with respect to the first motor and the sleeve.

13. The apparatus according to claim 12, wherein:
the tensioner comprises:
a tensioner base, coupled to the bracket; and
a tensioner pulley, coupled to the tensioner base and rotatable relative to the tensioner base about a second axis, parallel to the first axis; and
the tensioner pulley is configured to engage the first power-transmitting component.

14. The apparatus according to claim 13, wherein the tensioner base is linearly moveable relative to the bracket.

15. The apparatus according to claim 14, wherein the tensioner base is not rotatable relative to the bracket.

16. The apparatus according to claim 15, wherein the tensioner further comprises a tensioner-biasing element, configured to bias the tensioner pulley against the first power-transmitting component.

17. The apparatus according to claim 16, wherein:
the bracket further comprises a clearance hole and a counterbore, coaxial with the clearance hole;
the tensioner further comprises a fastener, passing through the clearance hole and through the counterbore; and
the fastener is threaded into the tensioner base.

18. The apparatus according to claim 17, wherein the tensioner further comprises a slide pin, fixed relative to one of the bracket or the tensioner base and movable relative to the other one of the bracket or the tensioner base.

19. The apparatus according to claim 17, wherein:
the tensioner-biasing element comprises a compression spring, positioned between the bracket and the tensioner base; and
the compression spring is located in the counterbore.

20. The apparatus according to claim 1, wherein the bracket is linearly moveable along the first axis relative to the robot.

* * * * *